INVENTOR.
JOSEPH NUNN

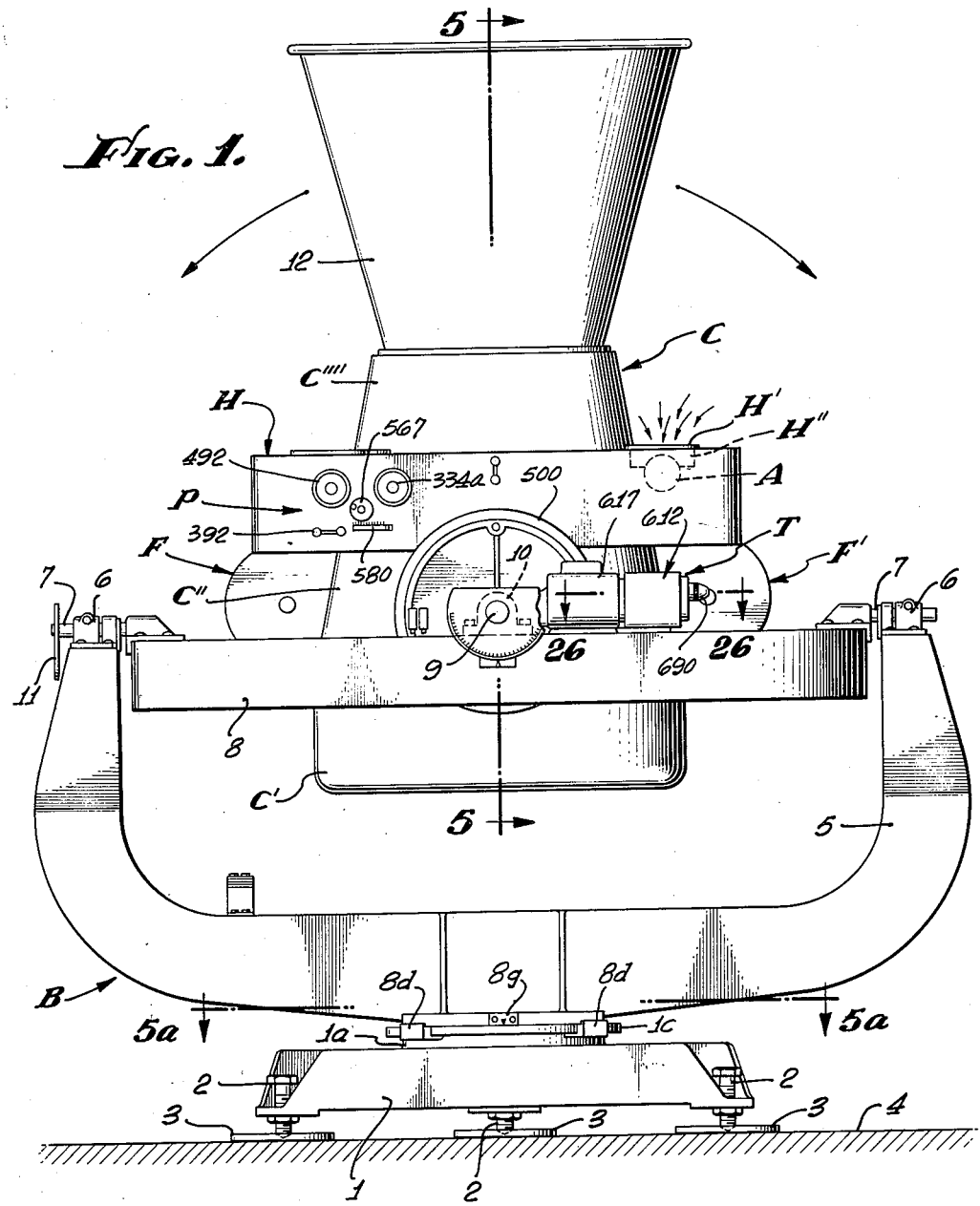

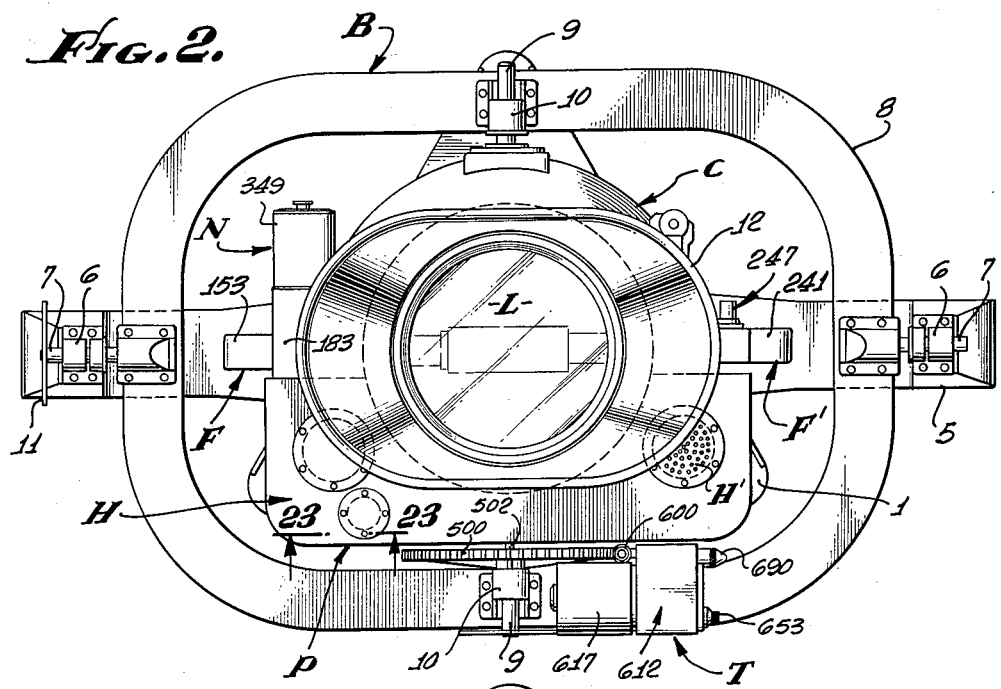
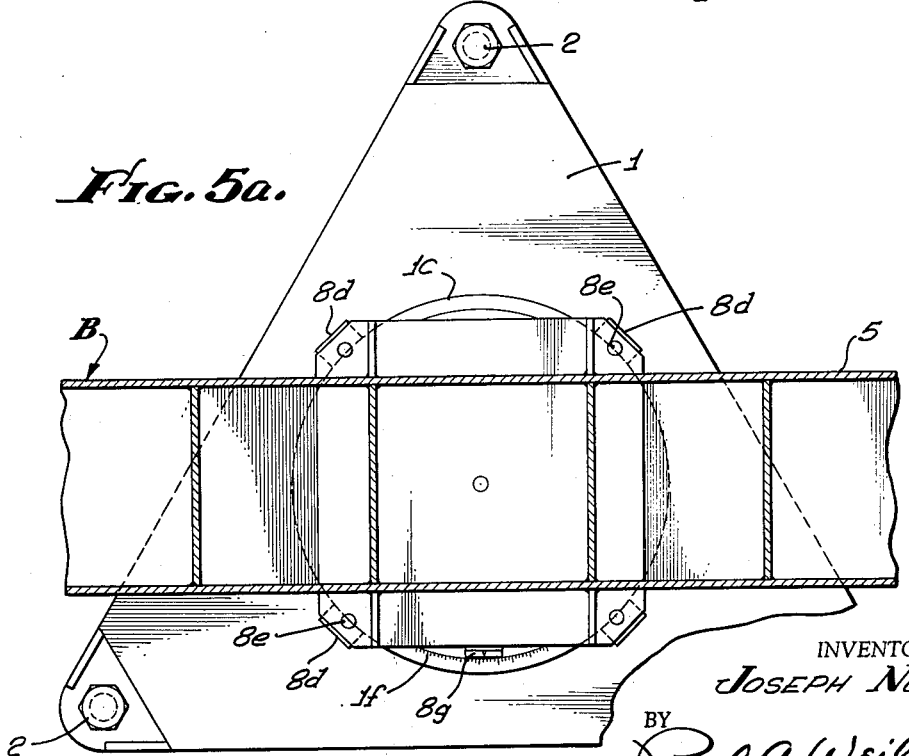

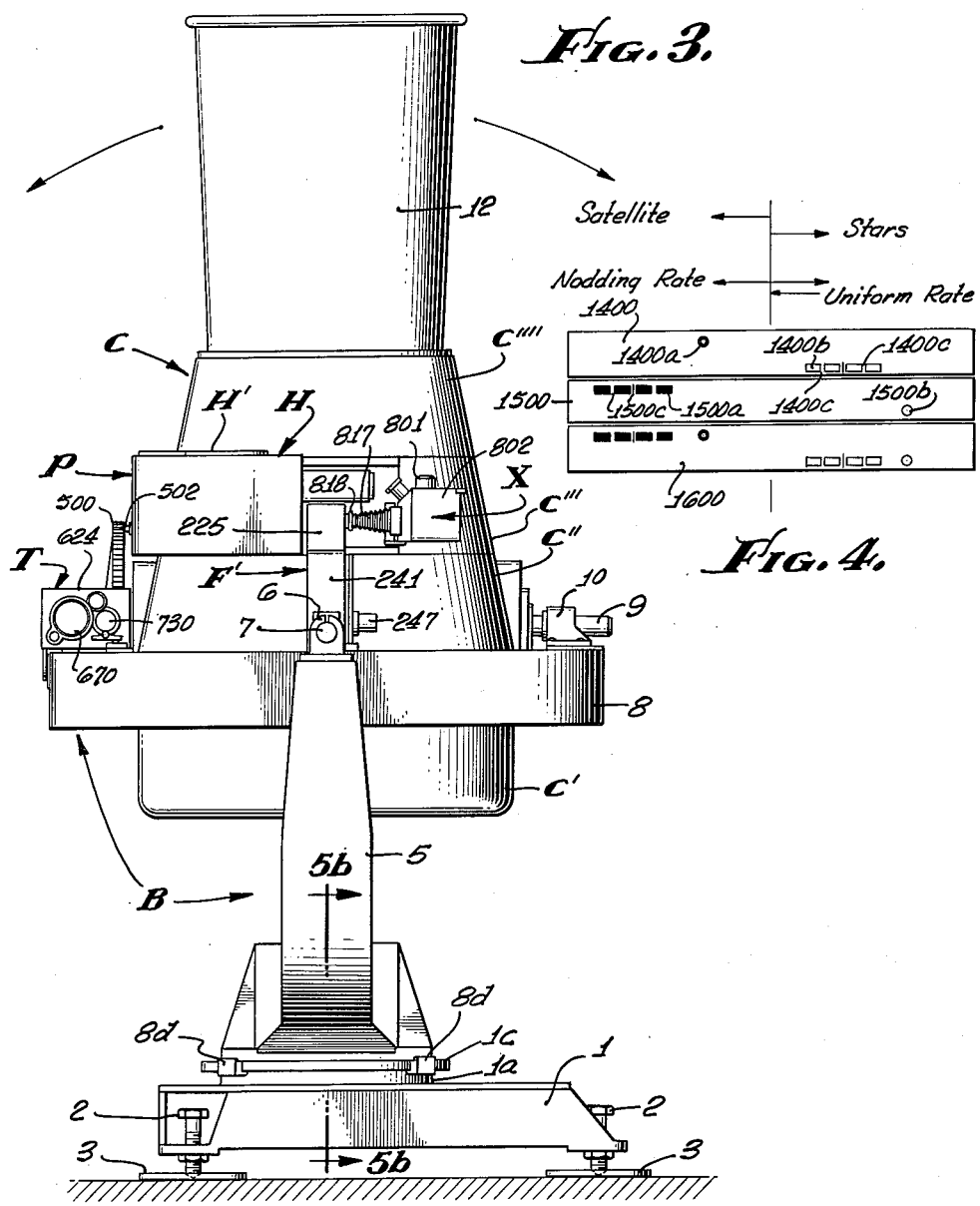

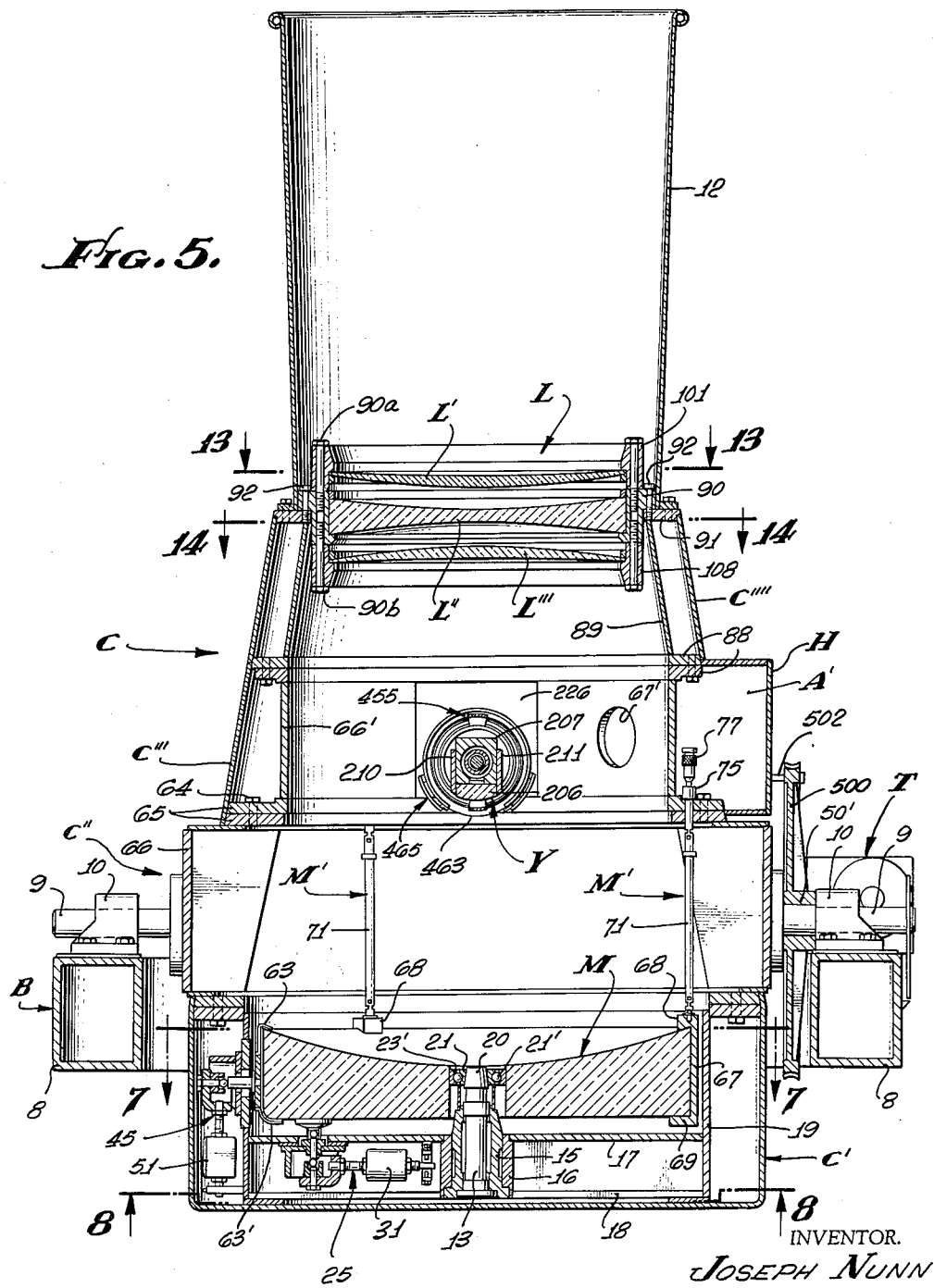

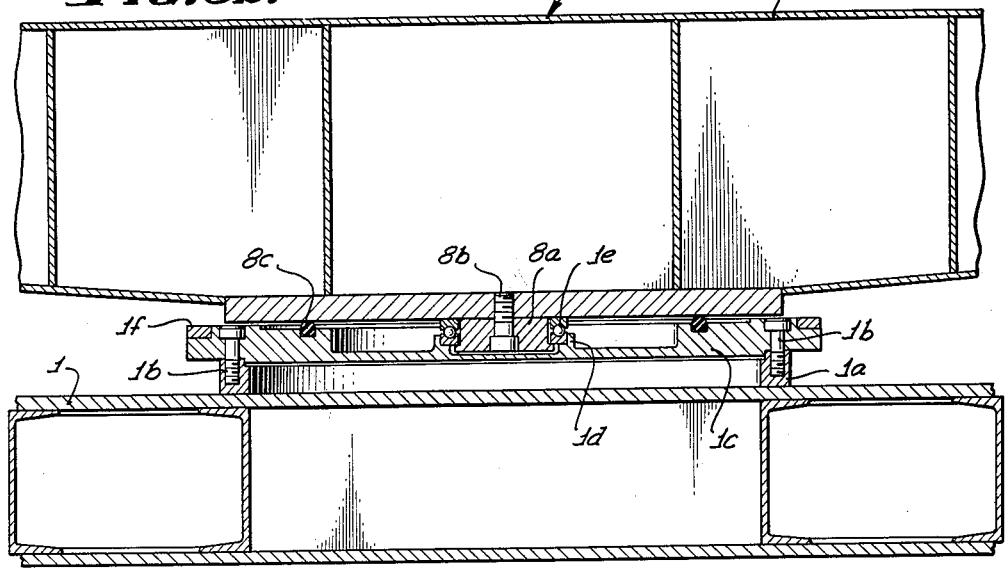
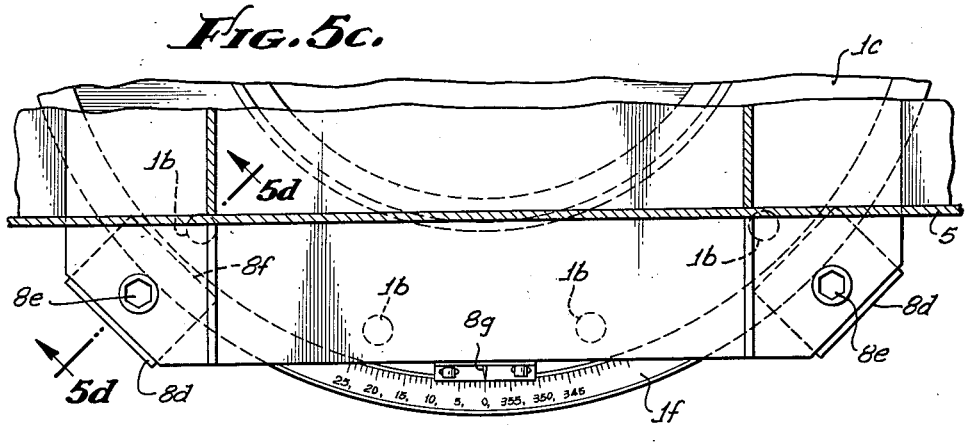
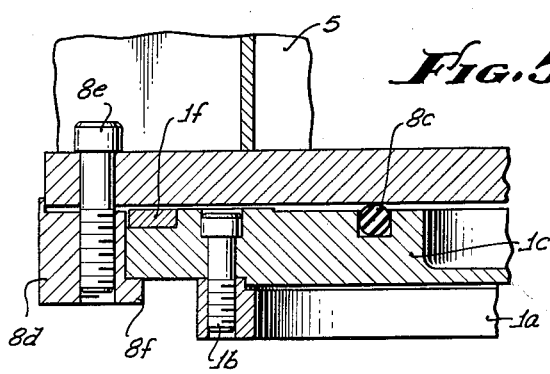

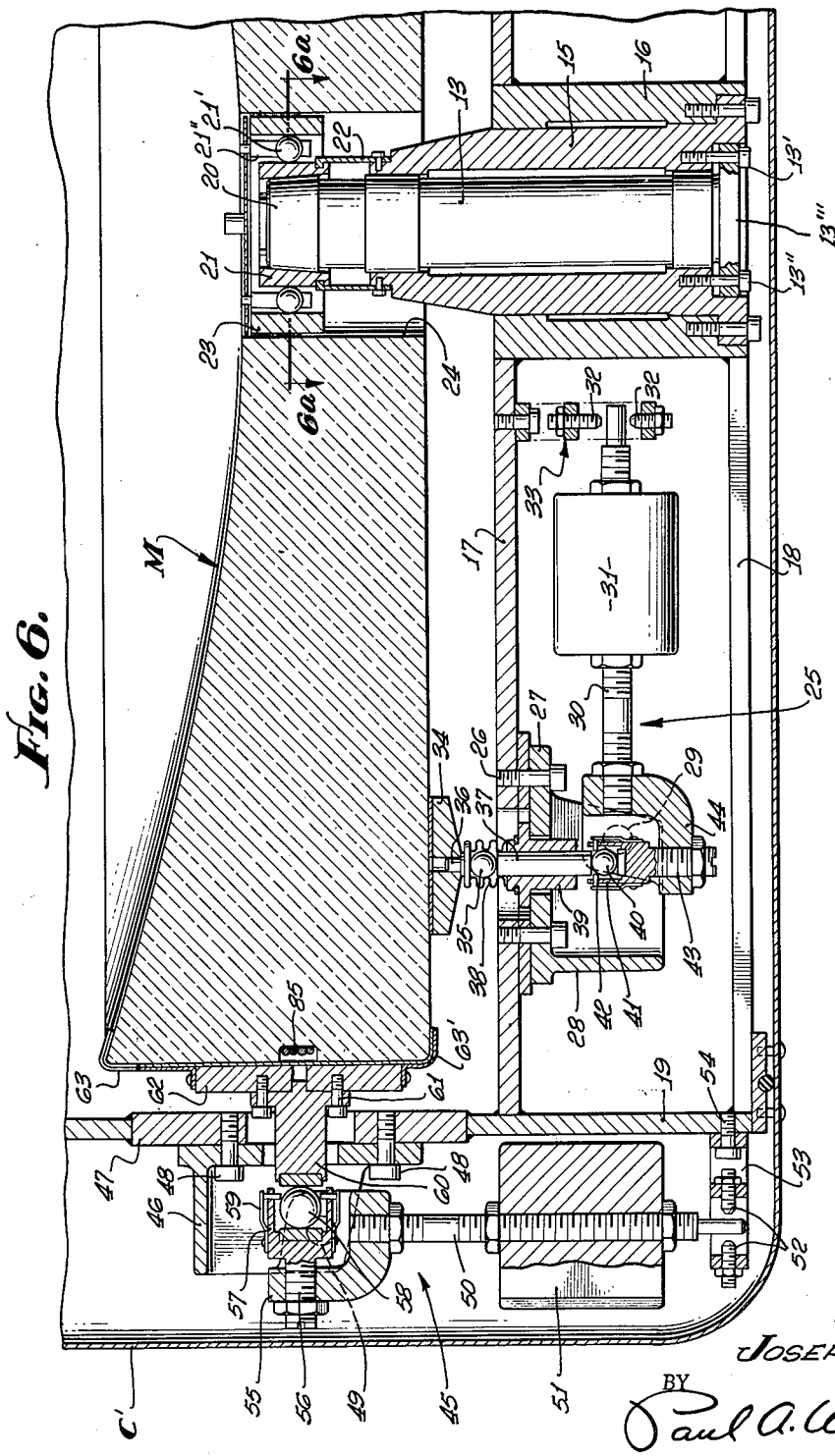

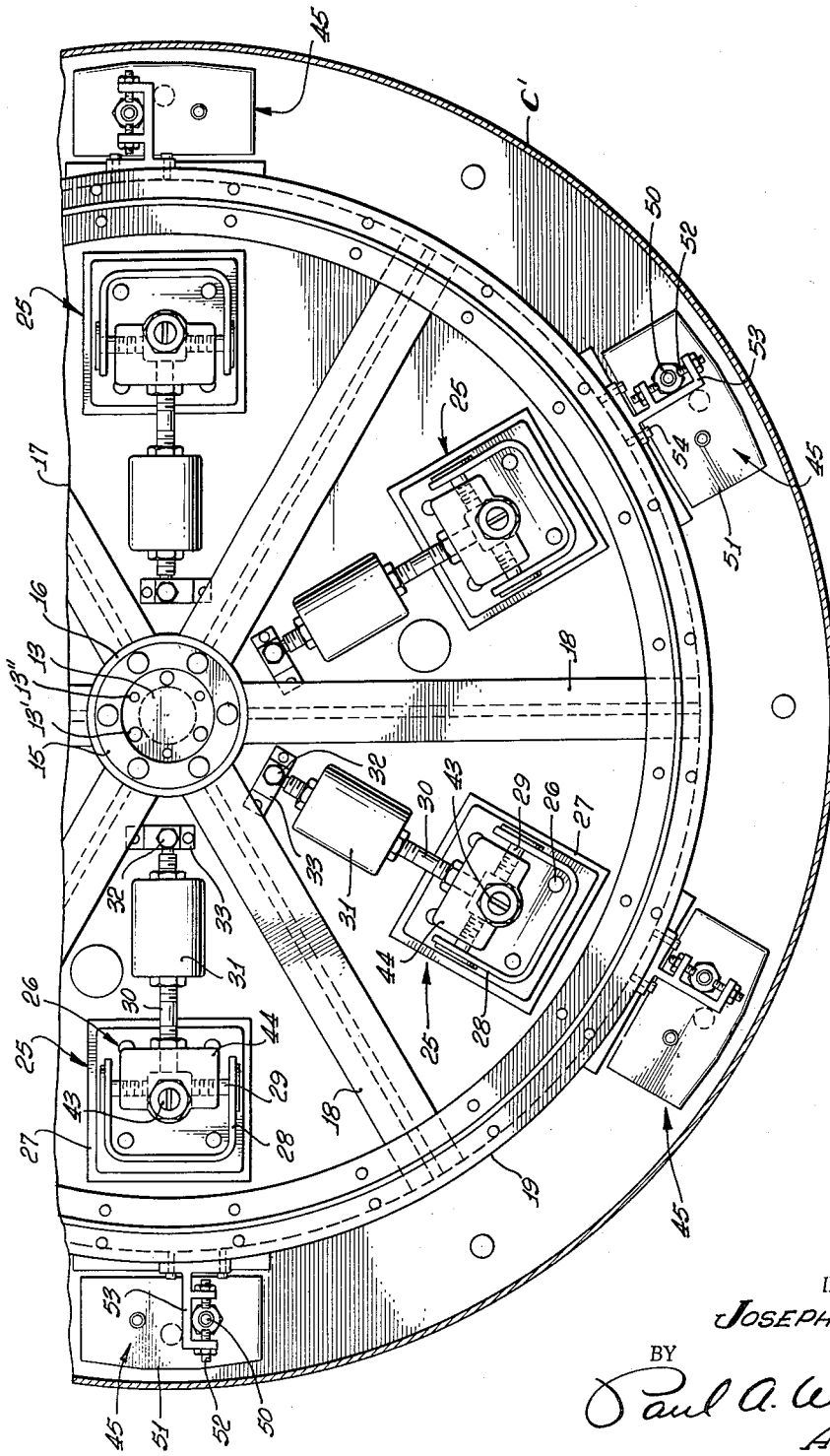

Feb. 18, 1964  J. NUNN  3,121,605
TRACKING AND PHOTOGRAPHIC APPARATUS
Filed Sept. 22, 1958  31 Sheets-Sheet 9
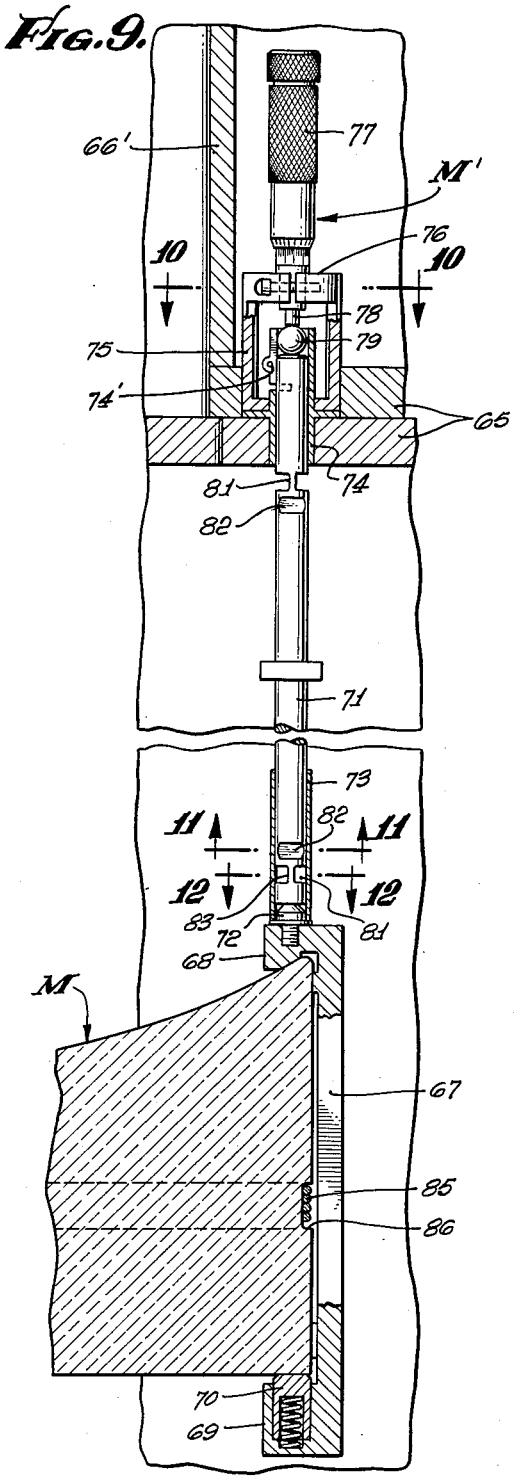
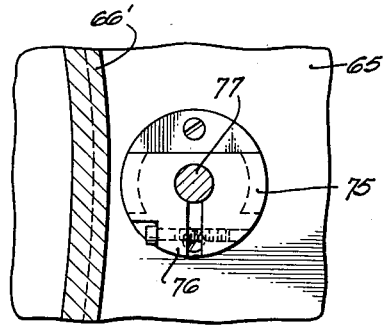
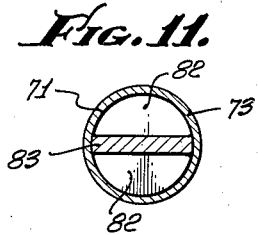
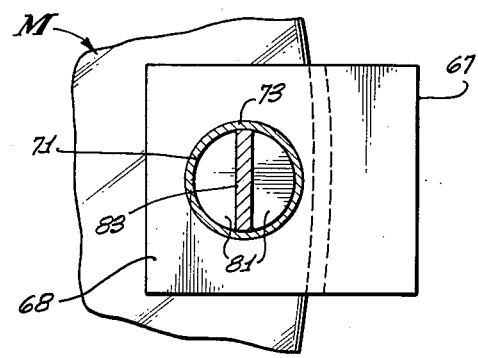
INVENTOR.
JOSEPH NUNN
BY
Paul A. Weilein
ATTORNEY.

INVENTOR.
JOSEPH NUNN
BY Paul A. Weilein
ATTORNEY.

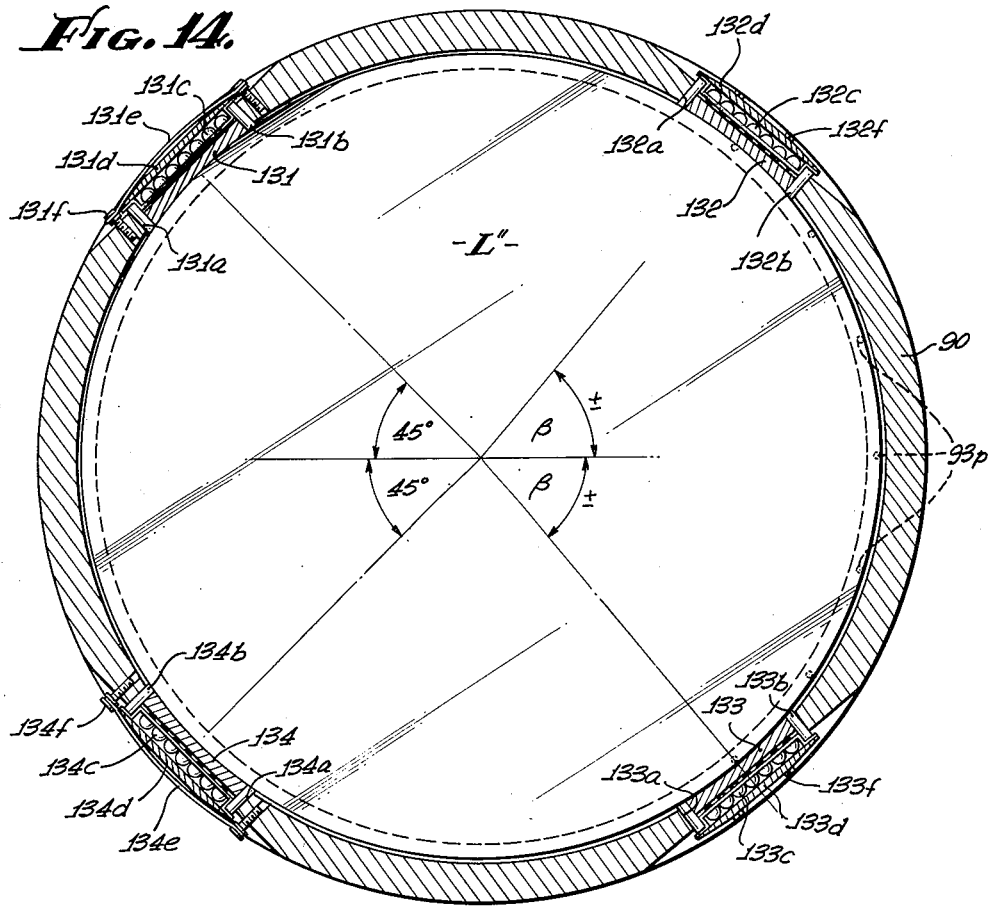

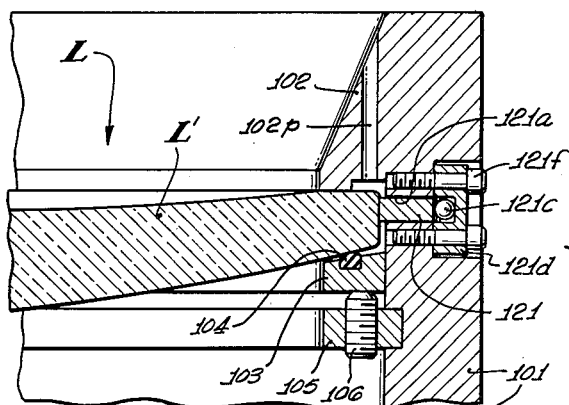
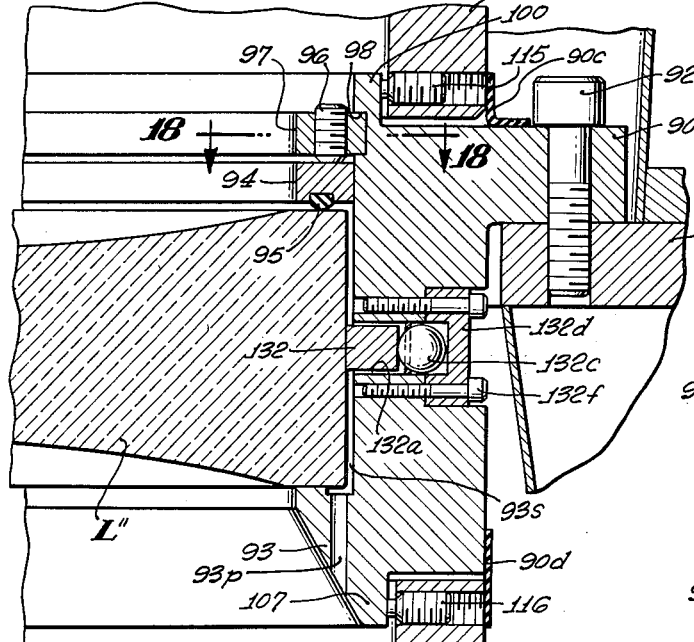
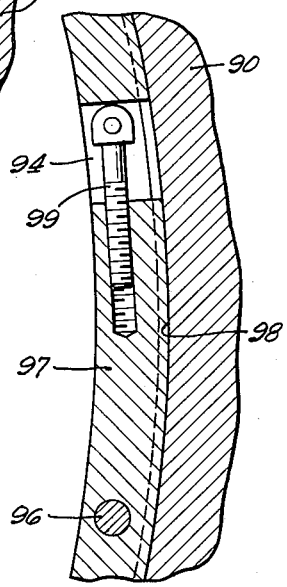

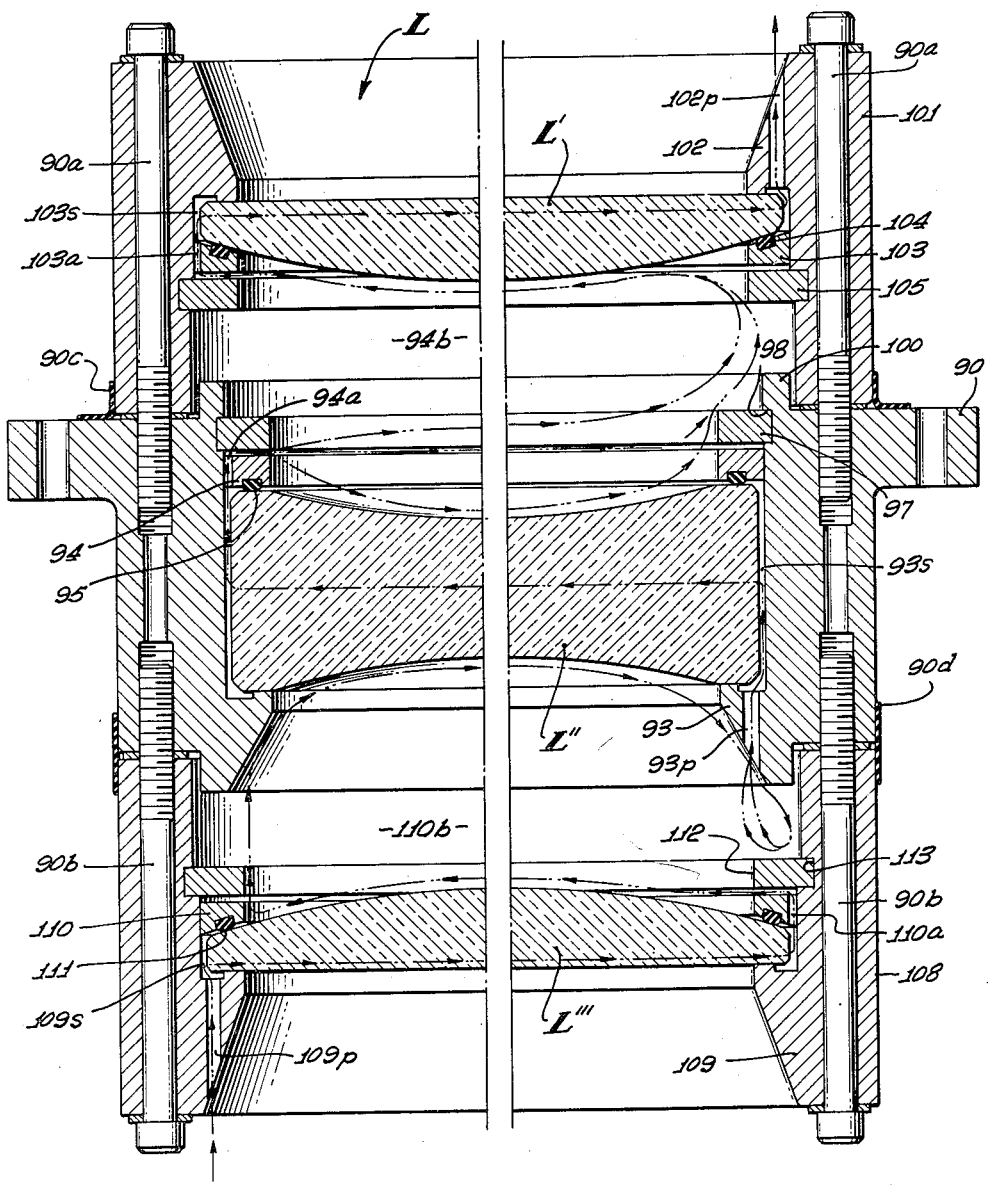

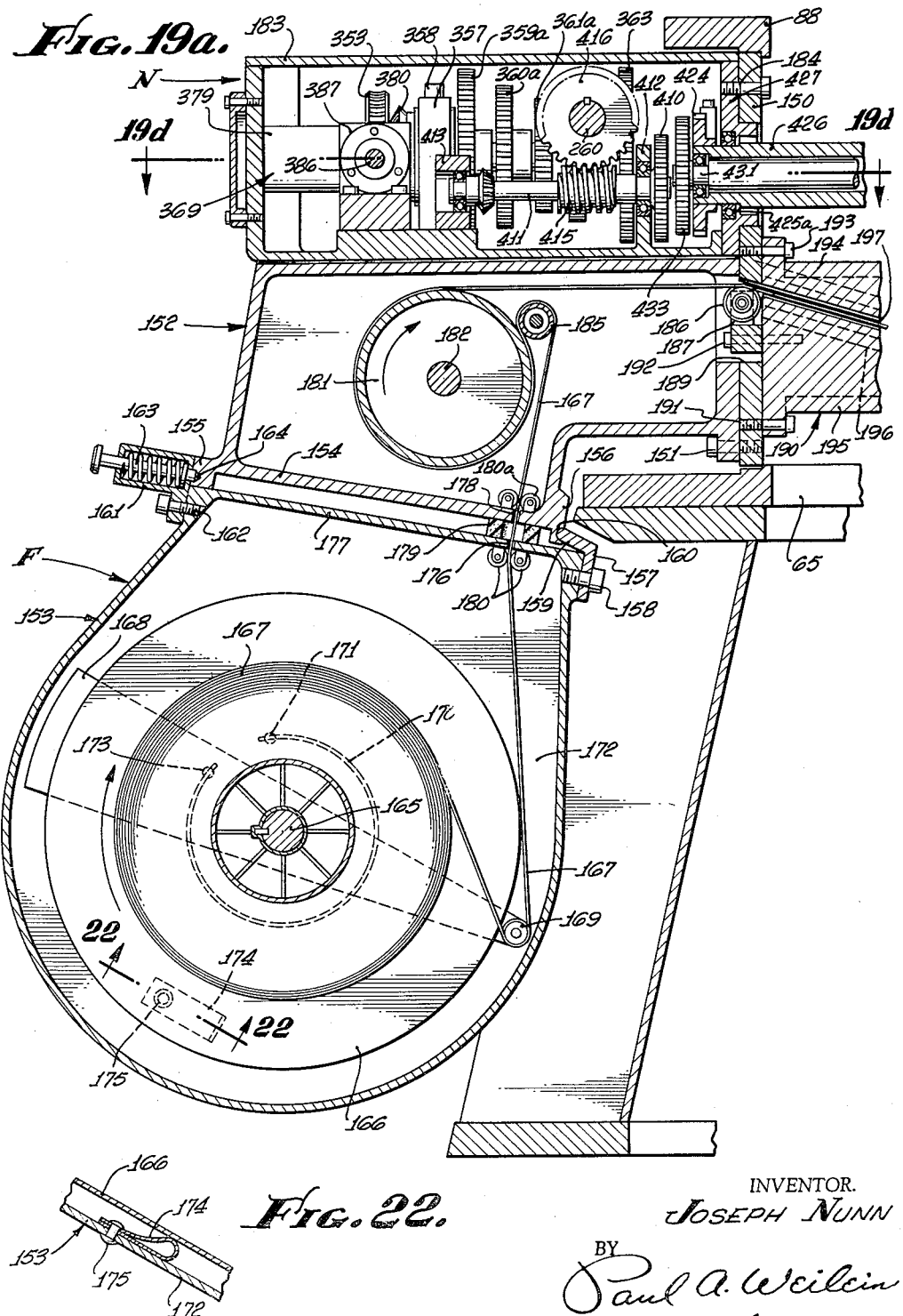

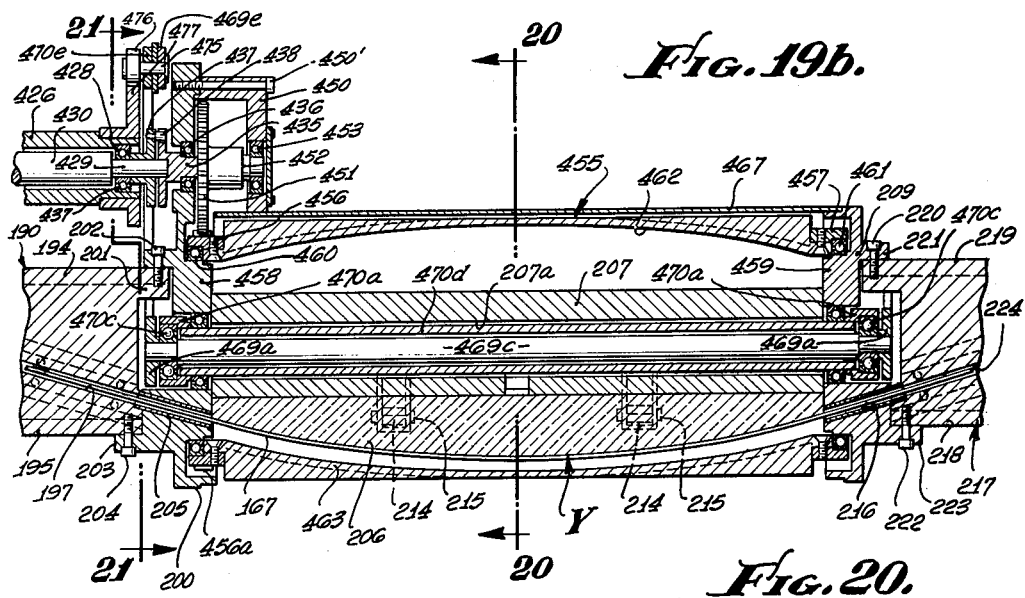

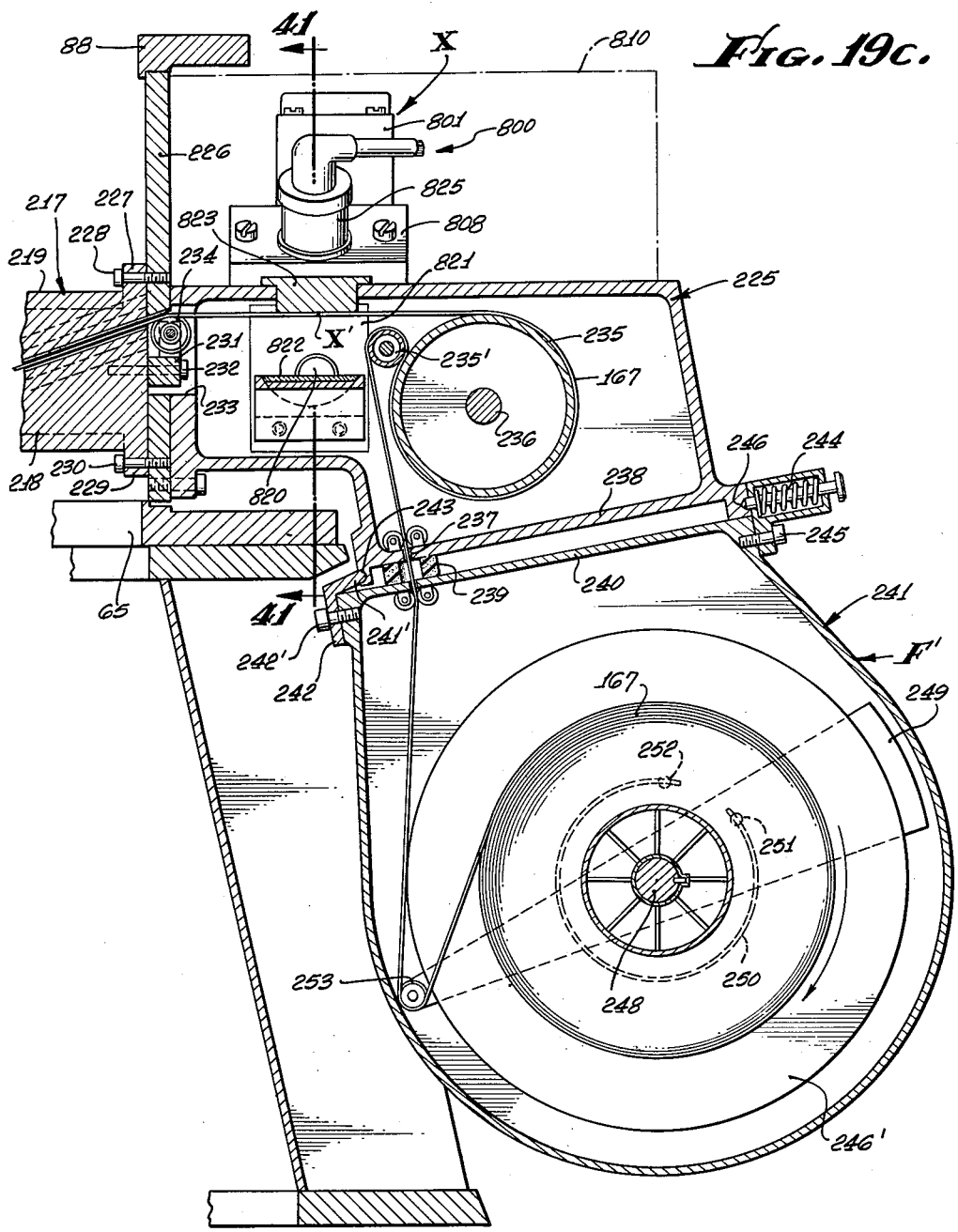

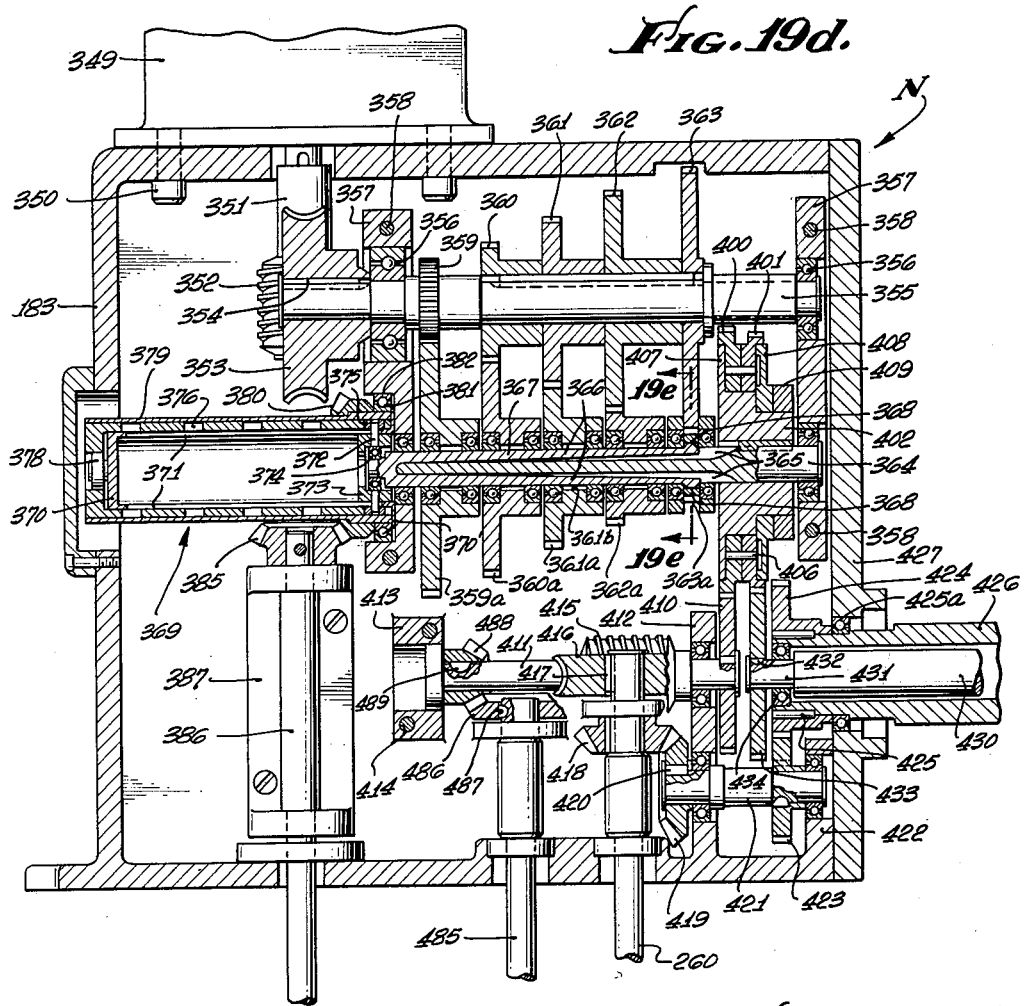
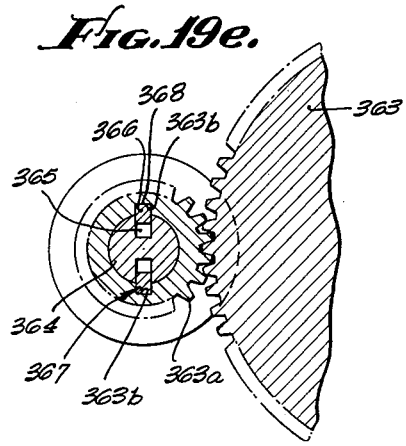
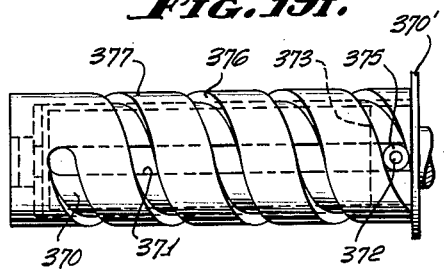

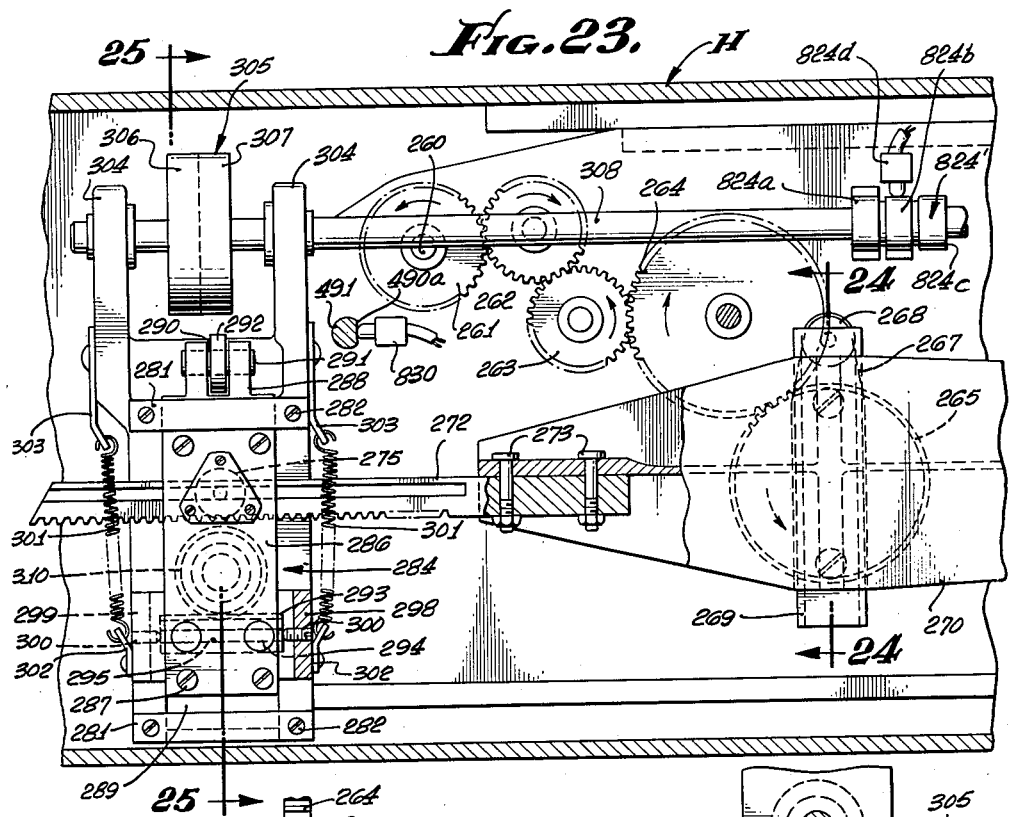
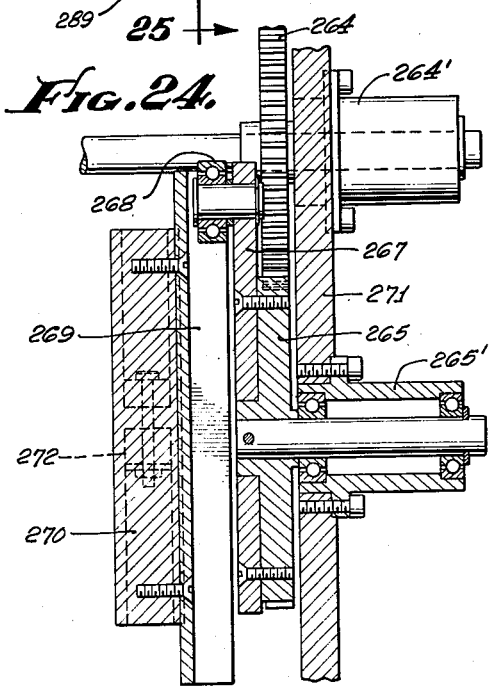
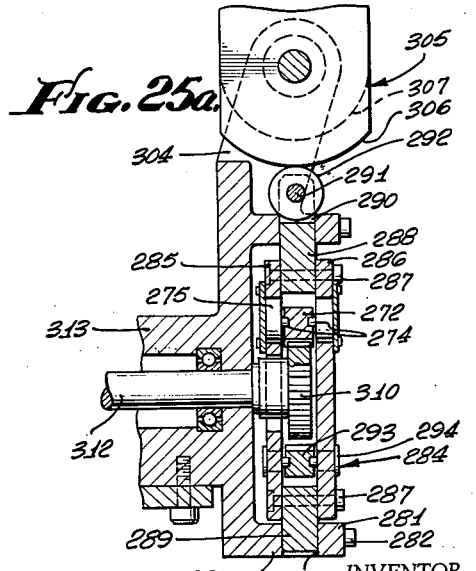

INVENTOR.
JOSEPH NUNN
BY
Paul A. Weilein
ATTORNEY.

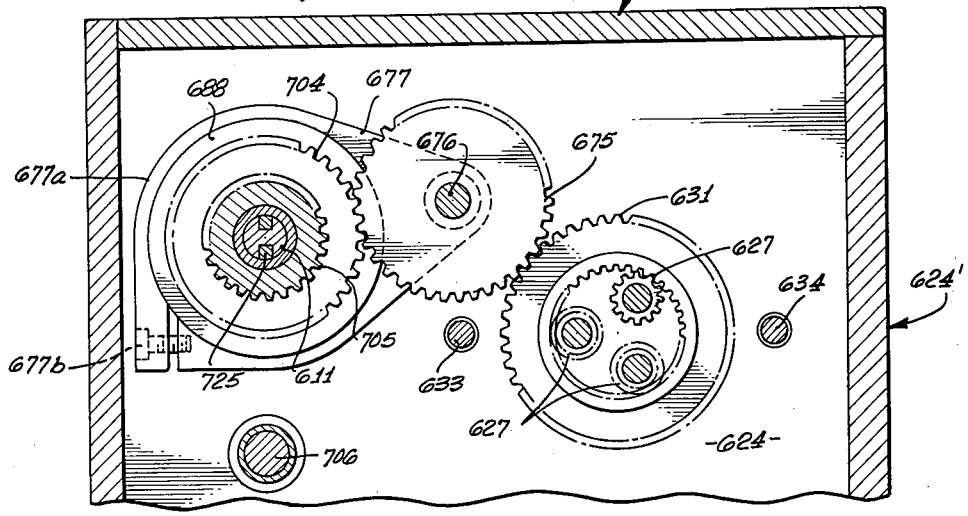
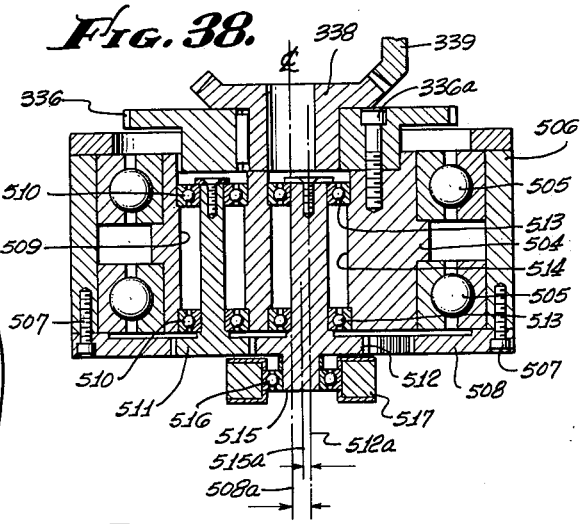
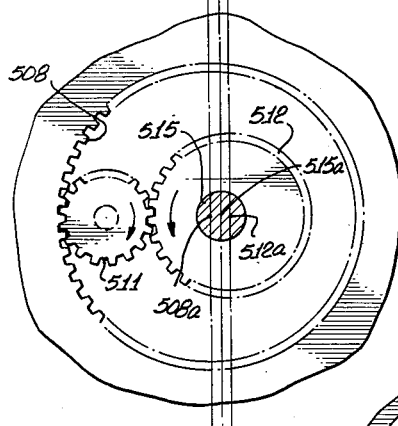
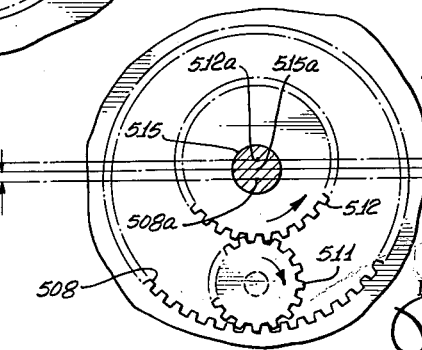

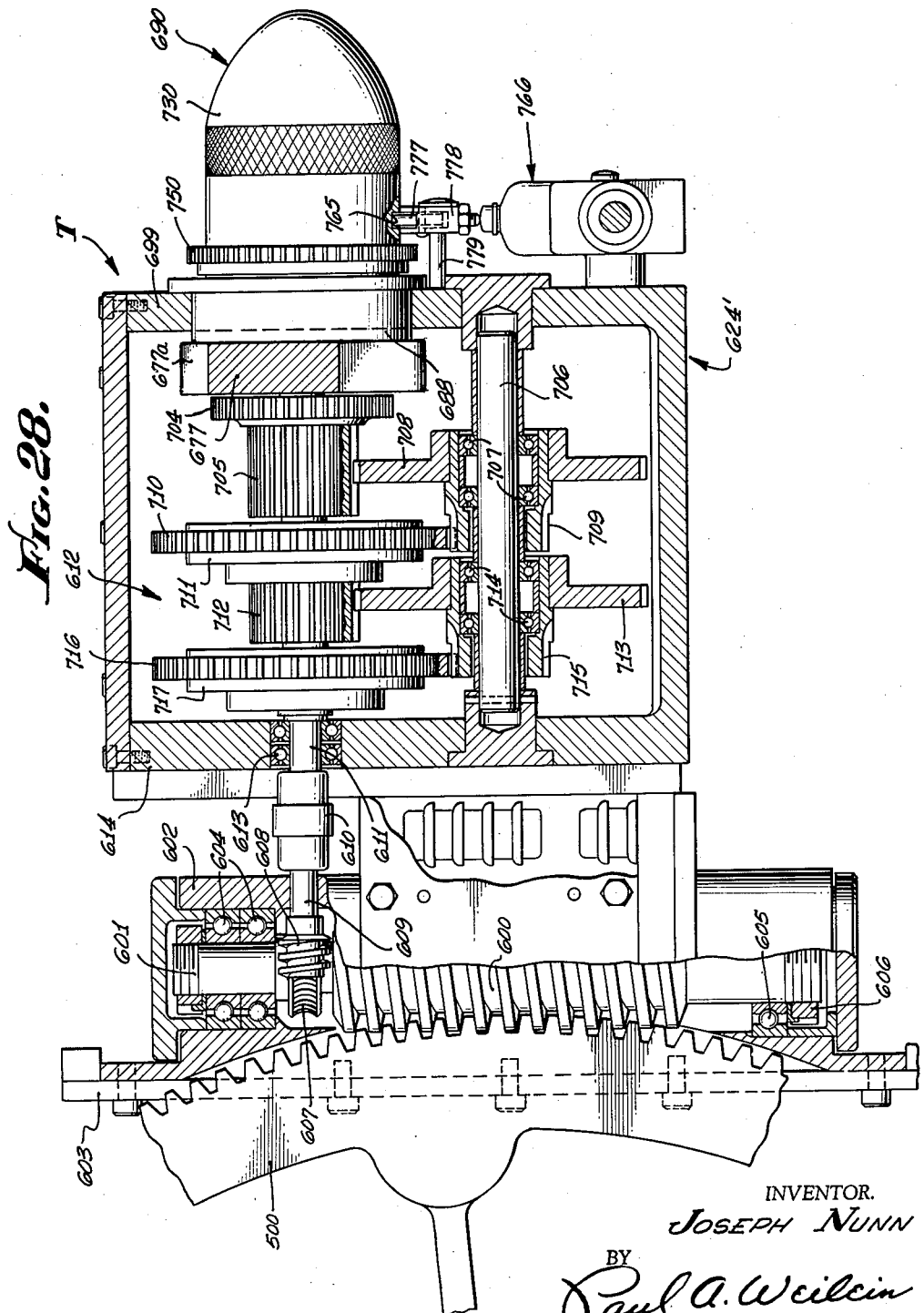

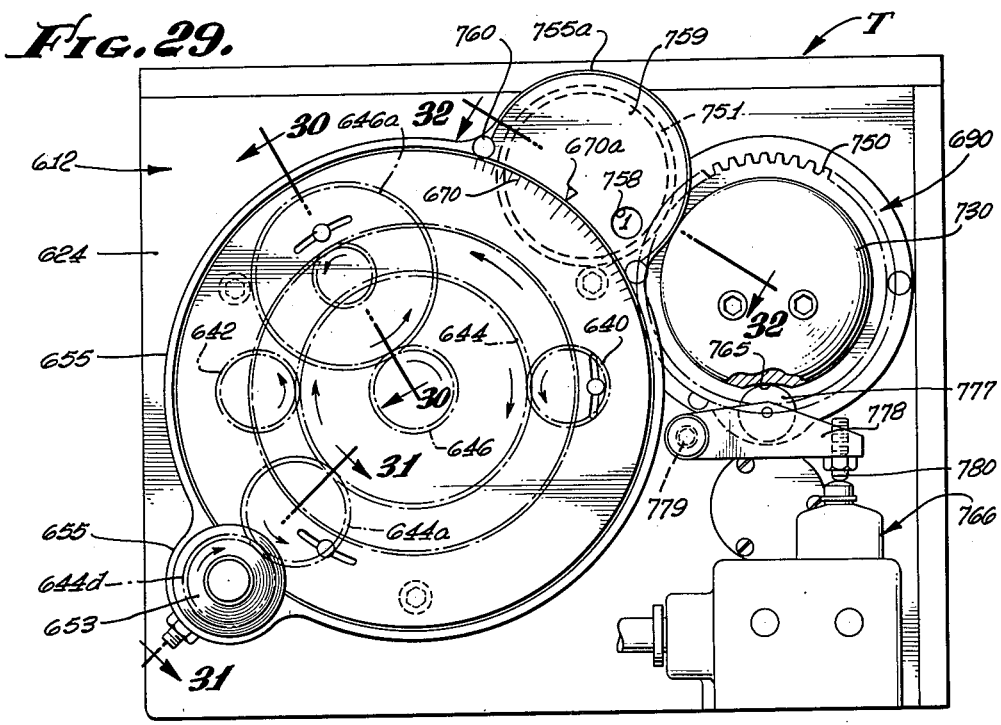
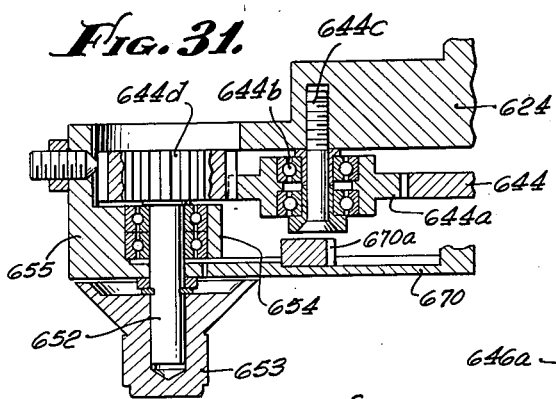
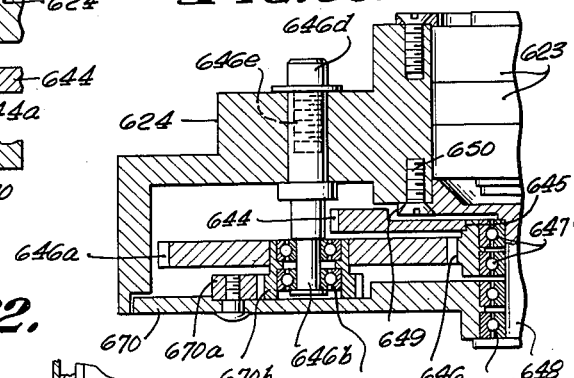
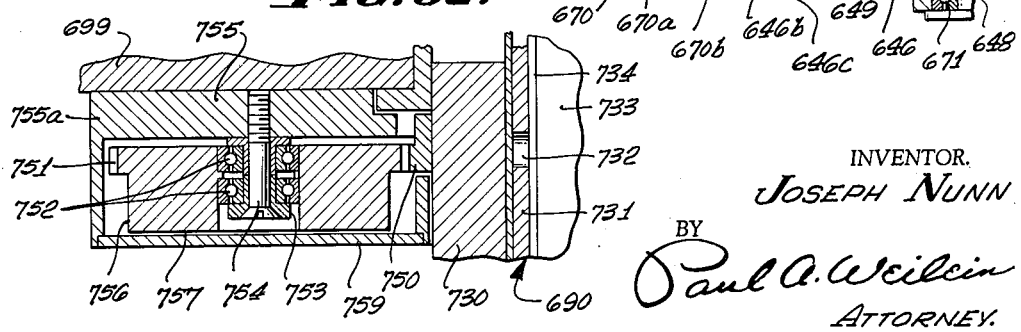

INVENTOR.
JOSEPH NUNN

Feb. 18, 1964  J. NUNN  3,121,605
TRACKING AND PHOTOGRAPHIC APPARATUS
Filed Sept. 22, 1958  31 Sheets-Sheet 25

INVENTOR.
JOSEPH NUNN
BY
Paul A. Weilein
ATTORNEY.

INVENTOR.
JOSEPH NUNN
BY
Paul A. Weilein
ATTORNEY.

INVENTOR.
JOSEPH NUNN
BY
Paul A. Weilein
ATTORNEY.

Feb. 18, 1964  J. NUNN  3,121,605
TRACKING AND PHOTOGRAPHIC APPARATUS
Filed Sept. 22, 1958  31 Sheets-Sheet 29

INVENTOR.
JOSEPH NUNN
BY
Paul A. Weilein
ATTORNEY.

United States Patent Office 3,121,605
Patented Feb. 18, 1964

3,121,605
TRACKING AND PHOTOGRAPHIC APPARATUS
Joseph Nunn, San Marino, Calif.
(164 E. Orange Grove Blvd., Pasadena, Calif.)
Filed Sept. 22, 1958, Ser. No. 762,562
77 Claims. (Cl. 346—107)

The present invention relates to tracking cameras and more particularly to a camera adapted to track and photograph an object moving rapidly across the field of vision, such as, for example, tracking an earth satellite, missiles, and the like. While the invention will be herein described with particularity in respect to problems encountered in tracking earth satellites, it should be understood that the camera may be employed for other purposes in whole or in part.

With the advent of earth satellites it has become highly desirable to precisely locate the satellite in its orbit about the earth so as to provide certain information from which various data can be derived to enable determination of, for example, the earth's shape, upper atmosphere densities, and the like, and to enable more accurate plotting of distances between given points on the earth's surface. Such computations are made possible by the detection of variations in the orbit of the satellite about the earth, as may be caused by various influences such as, for example, the increased gravitational pull exerted by land masses, as contrasted with the lesser gravitational effect of bodies of water. Preliminary studies have indicated that in order to obtain optimum results, a tracking camera capable of accurately locating a satellite in orbit about the earth must be sufficiently fast to photograph a specular source at a distance on the order of 1500 miles.

In accordance with the conventional methods of measuring star photographs, a 30 micron image can be located accurately to approximately 2 microns (.000080 inch). This distance, with a focal length of 20″, is equivalent to 0.80 second of arc. Therefore, since it is desirable to determine the position of an orbiting satellite quite accurately, say on the order of 25 feet, at 1200 miles, if time is fixed to the millisecond, then 0.80 second of arc is equivalent to 25 feet.

Moreover, in order to effectively photograph a comparatively small orbiting body, extremely accurate optical means must be provided for focusing the image to be photographed upon the photographic film. In order to bring the ideal camera photographic limiting magnitude to a value advantageously related to the photo-visual magnitude of a satellite, it was determined that an effective camera should alternately track the satellite and the stars, while preferably providing for double exposure of a single frame of film. With such a construction and arrangement an image on the film is such that while the camera tracks the satellite upon exposure of the film, the stars will appear as streaks in the background behind the more prominent satellite, while, when the camera tracks the stars, the satellite will appear as a streak across the film while the stars appear as comparatively relatively stationary.

In order to maintain the accuracy of location of the earth satellite, as poined out above, while alternately tracking the satellite and the star background, the problem is encountered of superimposing on a uniform tracking velocity a nodding or oscillating velocity whereby the resultant velocity is held constant during the exposure of the film.

To the extent that the resultant of the tracking velocity and the oscillating or nodding velocity of the camera may be maintained constant, and thereby the error in the relative positions of the stars and satellite maintained at the minimum, then the relative position of the satellite in respect to the star background may be accurately plotted by conventional astronomical procedures, if the midpoint of the streak represented by the satellite on the film is related to the stars which are in a known position, or alternatively the streaks represented by the stars may be plotted against the satellite. However, in either method of measurement of the location of the satellite relative to the star background, it is a prerequisite that the time of the midpoint of exposure of the satellite and/or the stars be recorded with great accuracy. Accordingly, it was concluded that it would be highly desirable to provide the camera with shutter means which would periodically interrupt the exposure of the film so as to produce a dashed effect in the streaks representing the satellite and/or the stars being photographed. This shutter means desirably is operated in timed relation to means for providing a time presentation upon the exposed film strip or frame, showing time to the millisecond related to the midpoint of the streak represented by the stars and/or satellite and indicated by a middle interruption break in the streak caused by the shutter means.

As a further characteristic it is highly desirable that the camera be susceptible of variation in the exposure times in view of the fact that satellites would be too faint for photographing during daylight, but would be visible for photographic purposes only during the dawn or evening twilight. The adjustable exposure time of the camera provides for minimizing the background fogging of the film and assures the procurement of an optimum image.

Moreover, in view of the fact that satellites would travel in different orbits, that is in orbits at different distances from the earth's surface, it was deemed highly desirable to provide means for varying the aforementioned uniform tracking velocity and nodding velocity so as to enable the camera to track and photograph a satellite or other body under substantially all anticipated orbital conditions.

With the foregoing problems and premises in view, it is a primary object of the present invention to provide a tracking camera capable of functioning in an efficient manner in accordance with the requirements recited above.

A further object is to provide a tracking camera which is extremely simple to operate and manipulate, the camera including a main supporting base which is adjustable about a vertical axis, as well as means mounting the body of the camera for rotation about the horizontal axis, whereby the camera body is universally supported and may be readily adjusted to desired tracking attitudes about its vertical and horizontal axes.

In view of the complexity and size of the mechanism requisite to an effective satellite tracking camera, due to the space requirements and weight of an effective optical system, it is a further object to provide a tracking camera mounted as aforementioned, wherein the camera is easily balanced so as to enable manipulation of the same and setting thereof with a minimum of effort.

Another object is to provide a tracking camera of the aforementioned type including a variable speed drive mechanism operatively associated with the camera body for effecting movement of the camera about an axis normal to the horizontal supporting axis at a uniform rate of speed, the rate being variable through a range contemplated to enable the tracking of rapidly moving or orbiting bodies travelling at different angular velocities, by reason of their travelling being in orbit at different distances relative to the surface of the earth.

Yet another object is to provide a tracking camera having a uniform speed drive as aforementioned, as well as a nodding or oscillating motion drive superimposed upon the uniform tracking drive to effect oscillation of the camera body about the axis of rotation thereof during tracking of a satellite. In accordance with this objective, the oscillating motion preferably alternates in that the tracking motion is alternately augmented and diminished by the oscillating motion, during a selected time interval.

Still another object is to provide interrelated, variable tracking drive and nodding drive mechanisms as aforesaid, including a unique means for maintaining at a constant velocity the nodding or oscillating movement of the camera body during the two phases of the nodding motion just referred to above.

Pursuant to the next preceding object, it is a further object to provide shutter mechanism operated in timed relation to the means for maintaining an angular velocity of the camera, whereby the film will be exposed during the uniform nodding or oscillating movement of the body, notwithstanding intermittent variations in the nodding or oscillating velocity of the camera body during other periods.

A still further object of the invention is to provide a camera having an $f/1.0$ optical system including an aspherical corrector cell, a spherical mirror disposed in spaced relation to the corrector cell, and interposed therebetween an aspherical focal surface, across which the film is adapted to be passed, in the pursuance of the instant invention, the optical system is perferably a modification of a classical Schmidt system, wherein the corrector cell is a multiple lens assemblage and the relationship is such that the corrector cell has a diameter on the order of about 22 inches, the mirror being about 31 inches in diameter with a 40 inch radius of concavity, the focal surface being on a radius of approximately 20 inches.

Generally, it is a further object to provide an optical system for a camera, wherein means are provided for focusing an image on a focal surface, said forming means being adjustable relative to the focal surface to effect such focusing; and while in the illustrative embodiment there is shown a modified classical Schmidt $f/1.0$ optical system, it will be understood that other optical systems may be employed without departing from the purview of the invention. In the ensuing description moreover, where a "corrector" cell is referred to, it should be understood that features of the invention are applicable to multiple lens assemblages other than corrector cells, and that, therefore, reference is made to the corrector cell as shown for the purpose of facility and is not made in a limiting sense.

Yet another object is to provide an optical system for a camera, as aforementioned, wherein the mirror is adjusted relative to the focal surface for effecting focus of an image upon the focal surface, the mirror being freely supported by means including adjuster devices which are so constructed and composed of such materials that temperature variations will not alter the focus of the mirror once it has been established.

A further object is to provide an optical system for a camera, as aforementioned, wherein the mirror or other image focusing means is freely supported and is substantially fully counterbalanced so as to facilitate adjustment of its position relative to the focal surface aforementioned by means of the adjuster devices.

Still another object is to provide a camera having an optical system of the aforementioned type wherein the corrector cell is composed of three lenses disposed in opposed relation and supported about their outer periphery in a novel manner, such that expansion and contraction of the respective lens elements of the corrector cell does not cause aberration or otherwise adversely affect the optical system.

Another object is to provide a camera including a spherical mirror and an aspherical focal surface disposed in spaced relation to the mirror in combination with means for transporting film across the focal surface and for tensioning the film so that the film is caused to conform to the aspherical focal surface configuration, thus to further reduce distortion of the image being photographed.

Yet another object is to provide film transport means for a camera including novel rack and pinion feed means for effecting the feed of film from a supply magazine to a take-up magazine, intermittently in timed relation to operation of the shutter mechanism, while tensioning the film across the focal surface or film back-up plate of the camera during exposure of the film. In accordance with this objective it is a further object to provide camera film feed and shutter mechanisms of the just-mentioned types, which are jointly operated in timed relation to mechanism for imposing upon a uniform angular tracking motion of the body of the tracking camera, a uniform velocity oscillation, the resultant movement of the camera being at a constant velocity during two phases of a cycle of the apparatus, and the shutter means functioning during the constant velocity phases of the respective cycles to expose the film while the film is tensioned.

Another object is to provide novel shutter mechanism for a camera including a comparatively fast shutter and a slow shutter jointly driven by a variable speed transmission at predetermined different rates, the fast shutter operating to intermittently interrupt exposure of a film strip while the slow shutter is open. In accordance with this objective, the respective shutters are disposed coaxially, the fast shutter including an assemblage of circumferentially spaced members rotatably disposed within the slow shutter, and the slow shutter comprising a clamshell assemblage disposed about the fast shutter.

A still further object is to provide novel power transmission mechanism for driving a compound shutter mechanism or the like, including means whereby manual rotation of a control member projecting from the transmission housing through a series of revolutions will effect a setting of the transmisison for driving the compound mechanism at different rates and further including means for indicating exteriorly of the transmission housing the condition of the compound mechanism.

Yet another object is to provide power transmission mechanism as aforesaid in combination with means for effecting nodding or oscillation of a tracking camera wherein the oscillating velocity varies as a function of variation in the speed of operation of the transmission mechanism.

Another object is to provide a tracking camera or the like, including a body and means for effecting compound angular movement of the body, such as by the imposition of an oscillating or nodding motion over a selected uniform angular motion, wherein power driven transmission means are provided for effecting the compound motion through a predetermined range of angular velocities, but wherein manual means are provided for effecting operation of the transmisison means for enabling manual tracking of the camera.

Inasmuch as in a satellite tracking camera it is necessary to determine time of exposure of the film within a very close time period, say on the order of one millisecond in order to obtain the desired accuracy, it is still another object of the invention to provide means for projecting onto the film strip or frame being exposed a time presentation. In this connection, a slave clock powered by a source of constant frequency is employed. This clock, in conjunction with a sweep oscilloscope, being adapted to indicate time to $1/10$ of a millisecond, and being illuminated so as to expose the film by the firing of a stroboscope lamp under the control of the mechanism which drives the shutter mechanism.

In addition, it is an object to provide time presentation means in accordance with the next preceding objective, wherein external indicating means are employed for showing the position in the cycle of operation of the camera at which exposure takes place and the position at which the stroboscope lamp is fired to illuminate the slave clock to indicate the midpoint of exposure of the film strip accurately within 1/10 of a millisecond, for example. However, it should be understood that the structural characteristics of the invention constructed in accordance with the objectives stated herein may be availed of in cameras or other devices wherein such extreme time accuracy is not of necessity.

As a further object the invention contemplates the provision of mounting means for an optical element such as, for example, the mirror herein shown, whereby the optical element is free of radial play and axial adjustment of the optical element may be readily effected.

Other objects and advantages of the invention will hereinafter become apparent to those skilled in the art or will be described in the following specification, and the novel features thereof will be defined in the appended claims.

Referring to the drawings:

FIG. 1 is a view in side elevation illustrating a tracking camera made in accordance with the invention, and viewed from the control panel side thereof;

FIG. 2 is a top plan view of the tracking camera of FIG. 1;

FIG. 3 is a view in end elevation of the tracking camera of FIG. 1, as viewed from the right hand end of the latter;

FIG. 4 is a view depicting diagrammatically the type of image produced on a film strip by the tracking camera hereof;

FIG. 5 is an enlarged fragmentary view in vertical section as taken through the camera body and gimbal ring support therefor on the line 5—5 of FIG. 1;

FIG. 5a is a view in horizontal section through the supporting base as taken on the line 5a—5a of FIG. 1;

FIG. 5b is an enlarged fragmentary view in vertical section as taken on the line 5b—5b of FIG. 3;

FIG. 5c is a fragmentary view partly in elevation and partly in section showing the mounting base and azimuth indicating means thereon;

FIG. 5d is an enlarged fragmentary view in section, as taken on the line 5d—5d of FIG. 5c;

FIG. 6 is an enlarged fragmentary detail view in section, particularly showing the mirror supporting means;

FIG. 8 is an enlarged fragmentary view in section with certain of the parts shown in elevation, as taken on the line 8—8 of FIG. 5;

FIG. 9 is an enlarged fragmentary detail view partly in elevation and partly in section, more particularly illustrating an adjuster mechanism for the mirror;

FIG. 10 is a view in transverse section, on an enlarged scale, as taken on the line 10—10 of FIG. 9;

FIG. 11 is a view in transverse section, on an enlarged scale, as taken on the line 11—11 of FIG. 9;

FIG. 12 is an enlarged detail view in section, as taken on line 12—12 of FIG. 9;

FIG. 14 is a transverse sectional view, as taken on line 14—14 of FIG. 5, on an enlarged scale;

FIG. 15 is an enlarged fragmentary view in vertical section through the mounting means for the multiple lens corrector cell in accordance with the invention;

FIG. 15a is an enlarged detail view in vertical section corresponding to that shown in FIG. 5, and more particularly illustrating the air circulating flow path therethrough;

FIG. 16 is an enlarged fragmentary view in transverse section showing in detail spring loaded pad means for centering an optical element, as shown in FIGS. 13 and 14;

FIG. 18 is a transverse sectional view as taken on line 18—18 of FIG. 15;

FIG. 19a is a fragmentary view in vertical section through the fresh film feed magazine and the drive mechanism for the compound shutter mechanism;

FIG. 19b is a continuation of FIG. 19a illustrating the remainder of the shutter drive mechanism, the compound shutter mechanism, the film feed tunnel, and associated parts for guiding film to the film back-up plate or focal surface;

FIG. 19c is a continuation of FIG. 19b, completing the film path from the film back-up plate and illustrating, in conjunction with FIG. 19b, the film discharge tunnel leading to the film take-up magazine;

FIG. 19d is a view in horizontal section, as taken on the line 19d—19d of FIG. 19a, with certain of the parts shown in elevation, showing the change-speed transmission mechanism for driving the compound shutter mechanism as well as for effecting operation of the film transport mechanism and the nodding mechanism;

FIG. 19e is a vertical sectional view, as taken substantially on the line 19e—19e of FIG. 19d;

FIG. 19f is a detail view in plan depicting the transmission shifter sleeve;

FIG. 20 is a view in vertical section on an enlarged scale, as taken on line 20—20 of FIG. 19b;

FIG. 21 is a view in vertical section as taken on line 21—21 of FIG. 19b;

FIG. 22 is a fragmentary detail view as taken on the line 22—22 of FIG. 19a;

FIG. 23 is a fragmentary view showing in elevation the mechanism for driving the film feed roll of the film feed magazine, and showing one end of the film tensioning mechanism, as well as the film transport control cam, this view being taken substantially on the plane of the line 23—23 of FIG. 2;

FIG. 24 is an enlarged fragmentary view in vertical section through the film transport crank mechanism, as taken on the line 24—24 of FIG. 23;

FIG. 25a is a view through the film transport slide mechanism, as shown in FIG. 25, but showing the film feed rack engaged with the cooperative gear, so as to effect feeding of the film;

FIG. 27 is a view in vertical section, as taken on line 27—27 of FIG. 26;

FIG. 28 is a view in vertical section with certain of the parts shown in elevation, as taken substantially on the line 28—28 of FIG. 26;

FIG. 29 is a view in end elevation of the change speed transmission control mechanism of FIGS. 26, 27, and 28;

FIG. 30 is a view in section, as taken on the line 30—30 of FIG. 29;

FIG. 31 is a view in section, as taken on the line 31—31 of FIG. 29;

FIG. 32 is a view in section, as taken on the line 32—32 of FIG. 29;

FIG. 38 is an enlarged fragmentary detail view in horizontal section through the compound eccentric unit for effecting mounting of the camera body as generally shown in FIG. 34;

FIG. 39 is a diagrammatic view illustrating the compound action of the compound eccentric device of FIG. 38, at one relative position of the compound eccentrics;

FIG. 40 is a diagrammatic view illustrating the relationship of the compound eccentrics of FIG. 38 upon movement thereof to another position;

Figure 43:
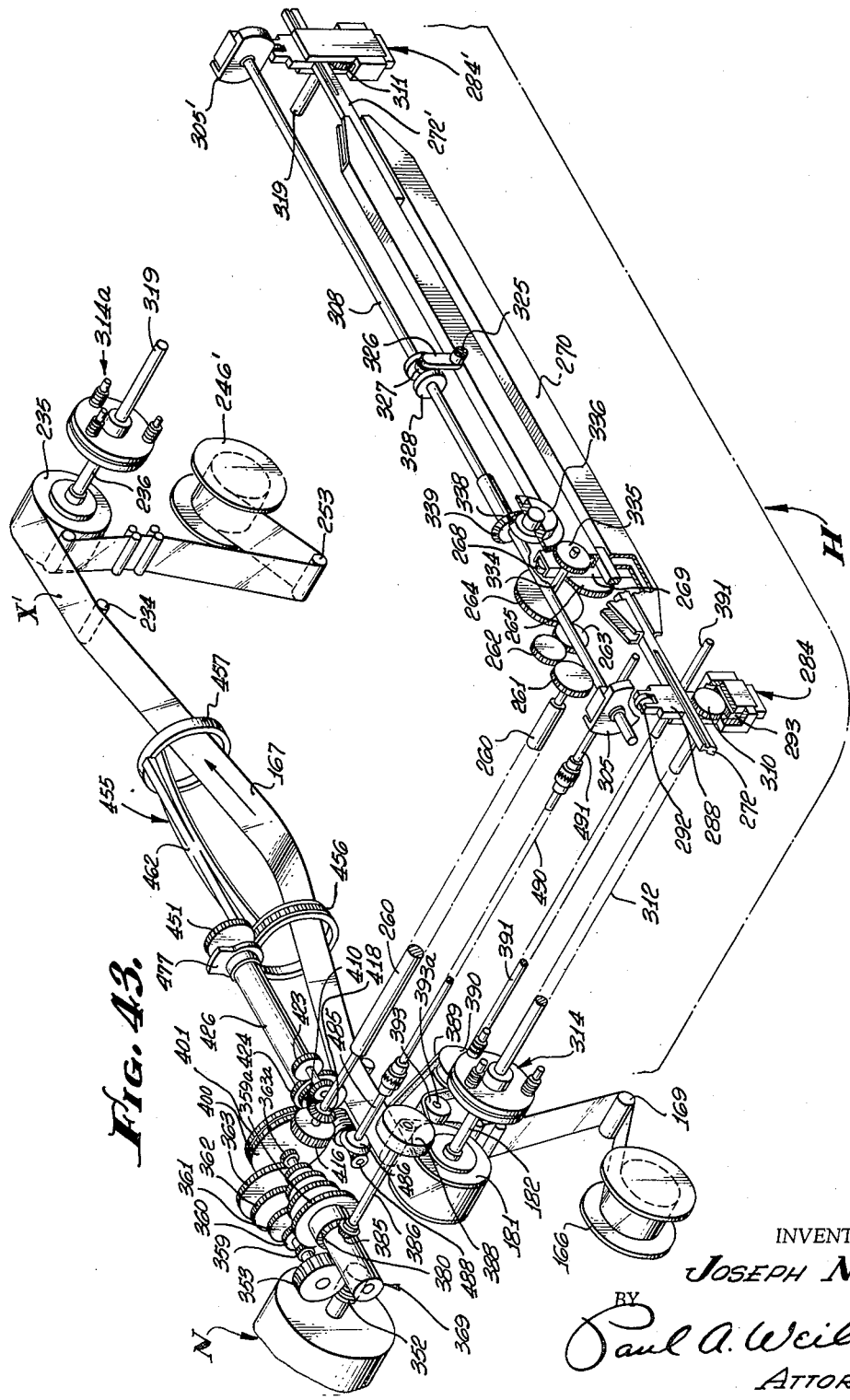
FIG. 43 is an isometric projection more or less diagrammatically showing the shutter drive and film feeding and take-up mechanisms, as well as the film tensioning means and operating mechanism for the film feed and take-up mechanism.
Figure 44:
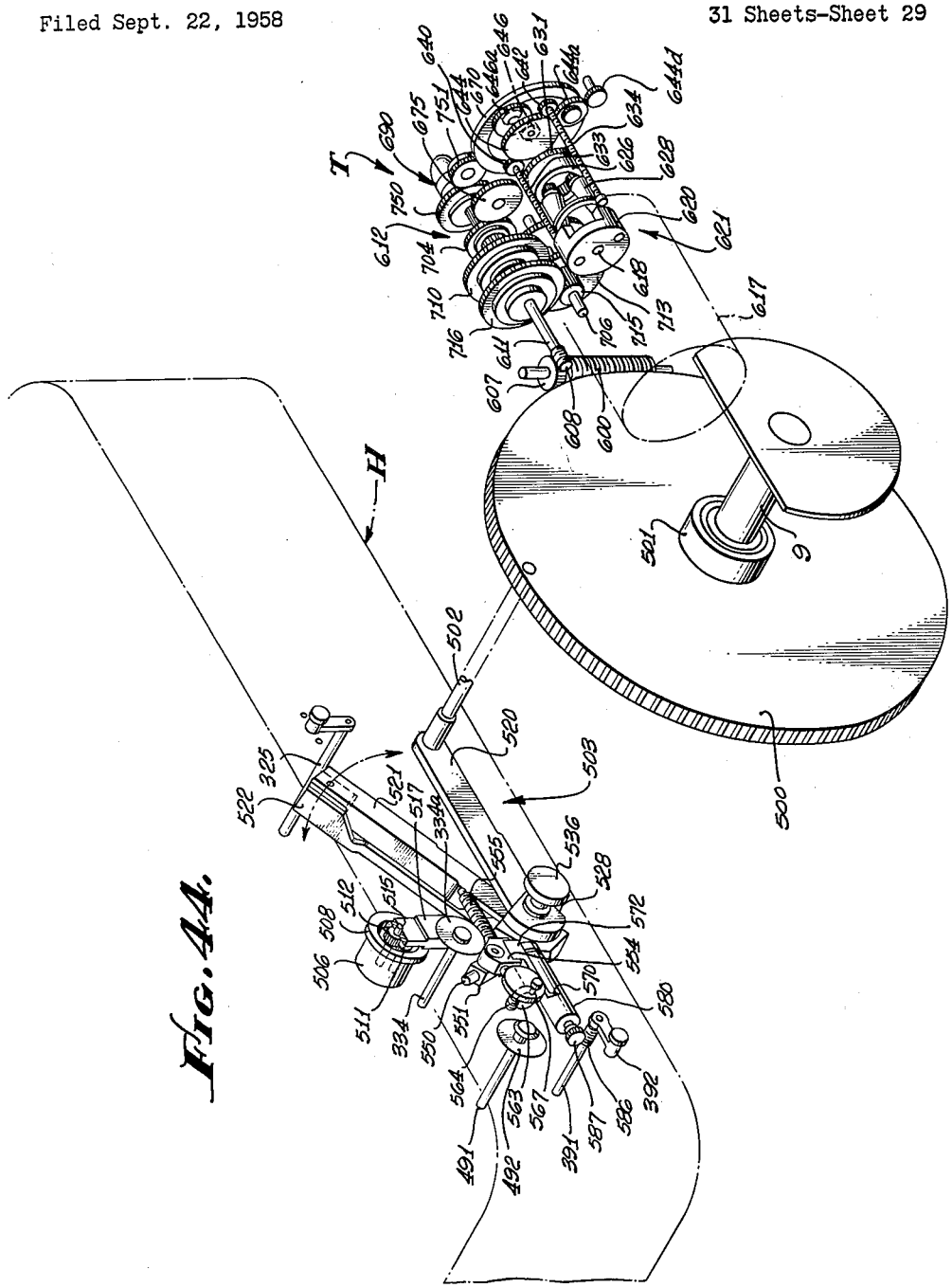
FIG. 44 is a view similar to FIG. 43, but showing only the variable speed mechanism for effecting tracking movements of the camera body and the oscillating or nodding motion mechanism associated therewith.
Figure 45:
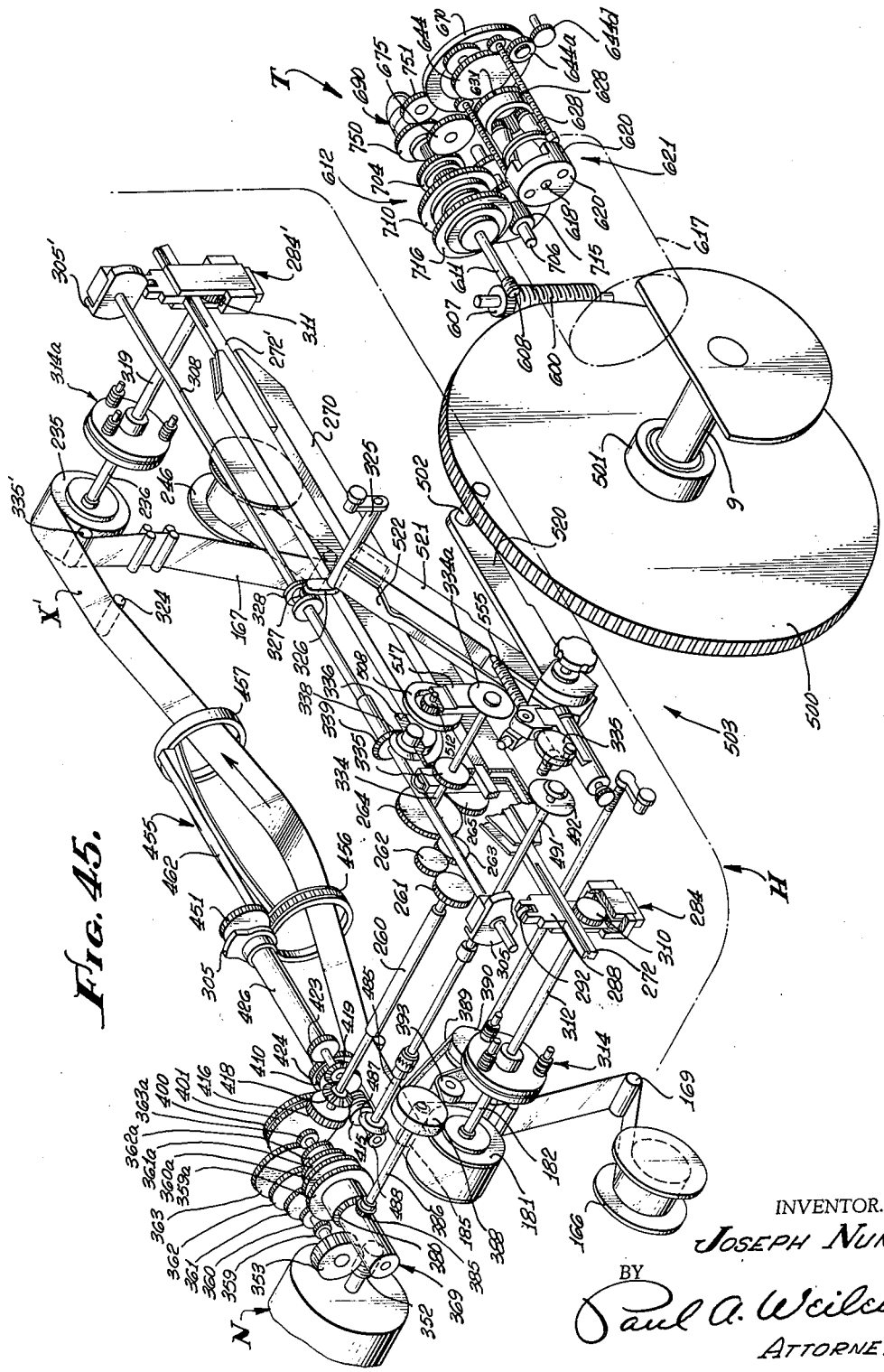
Figure 46:
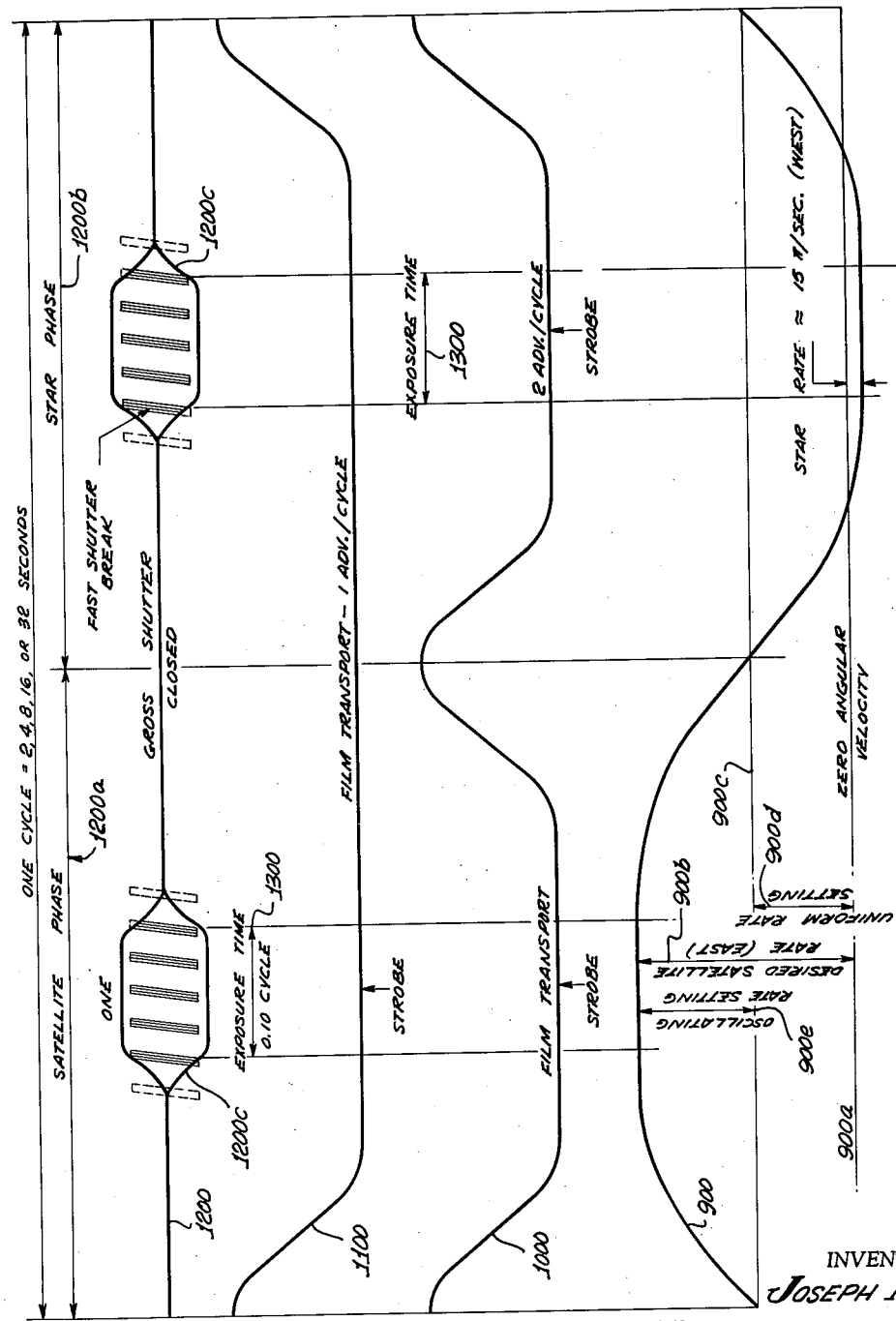

FIG. 45 is a view similar to FIGS. 43 and 44, showing the combined mechanisms of FIGS. 43 and 44, so as to better illustrate the driving relationships between the mechanisms of FIGS. 43 and 44; and FIG. 46 is a diagrammatic view illustrating the timed functional relationship of various mechanisms of the present camera during an operating cycle.

Like reference characters in the several views of the accompanying drawings, as well as in the ensuing description, designate corresponding parts.

Index

| | Column |
|---|---|
| General Description | 7 |
| Supporting Base Assembly | 8 |
| Camera Body and Optical System | 9 |
| Film Transport Mechanism | 15 |
| Film Transport Drive Mechanism | 18 |
| Film Feed and Shutter Drive Mechanism | 21 |
| Tracking and Nodding Motion | 25 |
| Uniform Speed Drive | 29 |
| Time Presentation Mechanism | 33 |
| Operation | 35 |

General Description

From its general aspects the tracking camera of the present invention includes a supporting base assembly B on which is mounted for substantially universal movements a camera body C. Means including a power source are provided as generally denoted at T for causing angular tracking movement of the camera body relative to the supporting base assembly B, in an arc as represented by the directional arrows on FIG. 1. Related to the mechanism for effecting such angular movement of the camera body C, is a power source which is adapted to drive mechanism N to effect an oscillating motion of the camera body, which is imposed on the angular tracking movement, the angular velocity of the oscillating motion being substantially constant during certain portions of the cycle of oscillation.

On the camera body C is a control mechanism housing H having thereon a control panel P through which project various instrumentalities to be hereinafter more fully described.

A film feed magazine F is carried by the camera body C at one end thereof, while a film take-up magazine F' is carried by the body at the opposite end thereof, located within the camera body is film transport and feed mechanism operative to feed a strip of film from the feed magazine F to the take-up magazine F'.

Also within the body is an optical system for focusing an object to be photographed on the film strip. A compound shutter mechanism operable in timed relation to the tracking and nodding of the camera body, is employed to progressively expose the film strip during the nodding cycle of the camera body; and in addition, time presentation means X are employed to produce on the film strip an indication of time at which the object being photographed has been exposed on the film strip by the compound shutter mechanism.

In the operation of the camera, the camera body C may be caused to nod or oscillate at a selected amplitude and period so that during each cycle of the oscillation one period of positive approximately constant angular velocity and one period of negative approximately constant angular velocity will occur. The film is exposed during each of these two periods or phases of the cycle, so that when the positive angular velocity of the nod is added to the angular velocity imparted by the tracking drive T, the resultant angular velocity is a maximum and reduces the photographic trail of a fast moving object (a satellite) to a desirable minimum, and similarly when the negative angular velocity of the nod is subtracted from the angular velocity imparted by the tracking drive T, the resultant angular velocity is a minimum and the photographic trail of a slow moving object (the star background) is reduced to a desirable minimum. In view of these circumstances and in view of the provision in the present invention of means for additionally exposing to the film illuminated time indicating means, it is possible to accurately determine by well known astronomical methods of triangulation, the position of the object being photographed, such as for instance, a satellite, relative to the stars, the position of the background material being known.

The mechanism T for effecting tracking movements of the camera body C is variable as is the nodding drive mechanism N, inasmuch as an object to be photographed and located in point of time and space may be travelling in an angular velocity of minus 15° per hour, or less on one hand, as in the case of certain celestial bodies or stars, whereas, as compared to an observed angular velocity of up to on the order of 2° of arc per second, as in the case of certain orbiting bodies, as for example, a satellite just grazing the earth's atmosphere. The camera, thus, may track and nod at selected angular velocities, enabling the camera to effectively photograph objects tracked at a wide range of angular velocities, as would be encountered when photographing orbiting satellites located on orbits ranging from 100 miles from the earth's surface, upwards to 1500 miles or more from the earth's surface.

With the foregoing general explanations in view, the following is a more detailed description of the respective components of the subject illustrative tracking camera of the invention.

Supporting Base Assembly

With particular reference to FIGS. 1, 2 and 3, it will be noted that the base assembly includes a base plate 1 which is, for example, triangular in form, having at the apex of its respective angles levelling screws 2 adapted to engage base pads 3 of suitable material such as steel plates cushioned by strips of tar paper or the like laid upon a suitable floor or foundation as indicated at 4. Rotatably mounted upon the base plate 1 for adjustment about a vertical axis is a fork or yoke 5, at the upper end of each arm of which is a clamping journal 6. In each of the journals 6 there is pivotally mounted a trunnion 7 disposed at opposite ends of a generally elliptical gimbal 8. The camera body C is mounted for pivotal movement about an axis through the axes of trunnions 9 projecting from the opposite sides of the camera body C and journalled in bearings 10 disposed upon the gimbal 8. This axis of pivot is at right angles to the horizontal tilt axis passing through trunnions 7 and journals 6. As shown in FIG. 1, the left hand trunnion 7 of gimbal 8 is provided with a quadrant or scale 11 thereon, whereby upon release of the clamping journals 6 the gimbal 8 may be rotated on a horizontal axis to a given angular position, as indicated by the scale 11, at which point the gimbal 8 may be clamped and locked in such adjusted position. In addition, means are provided for adjustably locking the fork or yoke 5 in adjusted positions about a vertical axis, as will appear hereinafter.

Referring now more particularly to FIGS. 5a, 5b, 5c, and 5d, it will be noted that the base member 1 has a support ring 1a thereon arranged concentrically with its axis, and connected to the ring 1a, as by screws 1b, is a diaphragm member 1c, which bridges the ring 1a and is provided with a central thrust bearing support 1d in which is disposed a thrust bearing 1e carried by a bearing retainer 8a secured at the axis of the base of the fork 5 as by means of a fastener 8b. An O-ring 8c or the like is preferably interposed between the base of the fork 5 and the diaphragm 1c to prevent the entry of dirt or the like into the zone of the bearing 1e. Thus, the fork 5 is mounted upon the thrust bearing 1e for free rotation on a vertical axis extending through the bearing 1e.

In order to clamp the fork 5 tightly against the diaphragm 1c, thus to prevent rotation of the fork, the diaphragm 1c is releasably engaged by a suitable number of clamps 8d carried by the base of the fork 5, as by clamping screws 8e, and having a tongue 8f adapted to engage beneath the outer periphery of the diaphragm 1c. Accordingly, upon tightening the screws 8e, the central flexible section of the diaphragm 1c will yield to permit frictional engagement of the base of the fork 5 with the diaphragm 1c, thus to prevent rotational movement of the fork. Freely disposed about the outer margin of the diaphragm 1c is an azimuth indicator quadrant 1f, which during installation of a camera hereof will preferably be oriented with the zero degree marking thereon, as shown in FIG. 5c, located at a true north position; the clamping members 8d will be operated by the screws 8e to clamp the fork 5 against the base 1, also clamping the azimuth ring 1f in its preset position, the fork also being disposed at an angle relative to a true north direction, as indicated by the pointer 8g thereon in relation to the azimuth ring 1f (see FIGS. 5a and 5c).

Camera Body and Optical System

Referring to the camera body C, as best seen in FIG. 5, it is composed of a base section or mirror cell C', a lower section C'', a central section C''', an upper section C'''', and a hood 12 of generally frusto-conical form, projecting upwardly from the upper camera body section C''''.

Referring to FIG. 5 particularly, it will be noted that there is an optical system within the camera body including a corrector cell L, a reflector or mirror M, and a focal surface Y. The elements L, M, and Y constitute an f/1.0 optical system, the aperture through the corrector cell L being substantially the same as the distance from the corrector cell to the focal surface Y, which distance is substantially equal to half of the radius of concavity of the mirror M and half of the distance from the corrector cell to the mirror, as best seen in FIGS. 5 and 6.

The mirror M is centrally supported upon a column 13 carried by a sleeve 15, secured in a central supporting cylinder 16, which is centrally located between a pair of vertically spaced webs 17 and 18 at the base of the camera body section or mirror cell C', the webs 17 and 18 being appropriately welded or otherwise secured in spaced relation at their outer extremities in a cylindrical body member 19. At its upper end the column 13 is tapered as at 20, and disposed about the tapered end 20 is the inner race of a bearing assembly. This inner bearing race is composed of a series of circumferentially spaced segments 21 tapering on their inner surface as the taper of end 20 of column 13, and axially adjustable relative to the latter as by tie fingers 22 suitably secured to the upper extremity of the sleeve 15. A series of bearings, such as balls 21' or the like, carried in a carrier 21'', are interposed between the inner bearing race segments 21 and the outer cylindrical bearing race 23, which is disposed in a central aperture 24 in the mirror M.

Figure 6A:
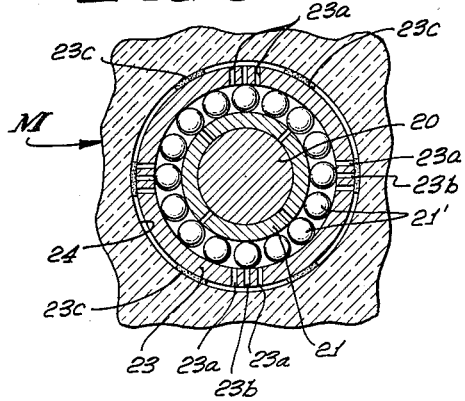
FIG. 6a is a fragmentary sectional view, as taken on the line 6a—6a of FIG. 6.
Figure 6B:
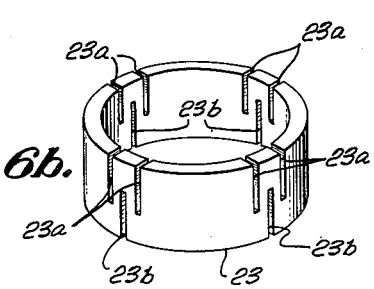
FIG. 6b is a detail view in perspective showing the outer bearing race of the mirror centering mechanism.

As best seen in FIG. 6b this outer bearing race is composed of a ring having pairs of saw cuts or other slots 23a extending longitudinally partially therethrough in circumferentially spaced relation, there being a further saw cut or slot 23b oppositely extending and disposed between each pair of slots 23a. This construction affords resiliency for the ring or race 23. As best seen in FIG. 6a, the ring or race 23 does not directly engage the opposing peripheral wall of the mirror M, but instead a suitable number of cushion pads of cork or other cushioning material are interposed between race 23 and the mirror M. Push pull screws 13' and 13'' extend through a base flange 13''' on the column 13, whereby axial adjustment of the inner race segments 21 may be effected, thus to control the radial loading on the balls and the outer race 23 so that the mirror is centered on a friction free column support. The column means just described enables vertical adjustment of the mirror M but does not serve to support the weight of the mirror M.

In order to support the mirror M, a series of circumferentially spaced counterbalance mechanisms 25 are provided, each being carried by the upper web 17 previously referred to, as by means of a suitable number of fasteners 26 extending through said web and through a mounting portion 27 of a counterbalance bracket 28 in which is pivotally mounted, as at 29, a counterbalance lever arm 30, having a weight 31 adjustably mounted thereon. The lever 30 projects at its free extremity into the gap between a pair of adjustable limit screws 32 carried by a bracket 33 secured to the web 17. Each counterbalance mechanism 25 comprises a pad 34 engaged beneath the mirror M and supported upon a ball 35 interposed between a flanged pin 36, seated in the pad 34, and the upper extremity of a slider rod 37. The ball 35 is preferably enclosed within a diaphragm 38. The rod 37 is slidably disposed in a slider bearing 39 and projects from the lower extremity of the latter into engagement with a ball 40 disposed within a cage 41 and retained in the latter by spring fingers 42, this cage being formed at the upper extremity of an adjustable ball supporting member 43 threaded into the fulcrum member 44 of the counterbalance means 25. Inasmuch as there is a plurality of counterbalance means 25 disposed in circumferentially spaced relation about the mirror M, as best illustrated in FIG. 8, the entire axial component of the weight of the mirror may be sustained by the counterbalance mechanisms while the mirror remains centralized within the body member 19 by means of the column 14, and further counterbalance mechanisms 45 carried by the member 19 and disposed in circumferentially spaced relation about the outer periphery of the mirror M counterbalance the radial component of the weight of the mirror M as the camera body C pivots on its mountings.

Each of the counterbalance mechanisms 45 includes a mounting bracket 46 secured, as by means of a suitable number of screws 48, to a plate 47, welded or otherwise suitably secured in an opening in the camera body member 19. Pivotally mounted in each of the supporting brackets 46 as at 49 is a lever 50 having adjustably mounted thereon a counterweight 51 with the free end of the lever 50 projecting into the gap between limiting screws 52 adjustably carried by a bracket 53 secured to the body member 19, as by a screw 54 or the like. Carried by the fulcrum end 55 of the lever 50 is a ball supporting member 56 adjustably mounted in the fulcrum member 55 and having at one end a ball cage 57 in which is a ball 58, the ball 58 being retained in place by spring fingers 59. Engaged by the ball 58 of each counterbalance mechanism 45 is a stem 60 secured as by means of screws 61 to a pad 62, the pad being supported upon the outer margin of the mirror M as by means of sheet metal clamps as at 63 and 63'.

With a counterbalance system such as just described, it has been found that a mirror weighing on the order of 300 pounds may be balanced to within approximately 10 ounces, thus facilitating adjustment of the mirror M longitudinally of its axis to effect the focus of an image upon the film or focal surface Y. In this connection it will be noted, upon reference to FIG. 5, that the central camera body section C''' has at its base a pair of radial flanges 65 secured together as by bolts 64 so as to interconnect a body member 66 with a cylindrical body member 66' disposed thereabove. Extending through the flanges 65 and depending therefrom in equidistantly spaced relation thereabout is a suitable plurality of micrometer adjuster means M'.

Figure 7:
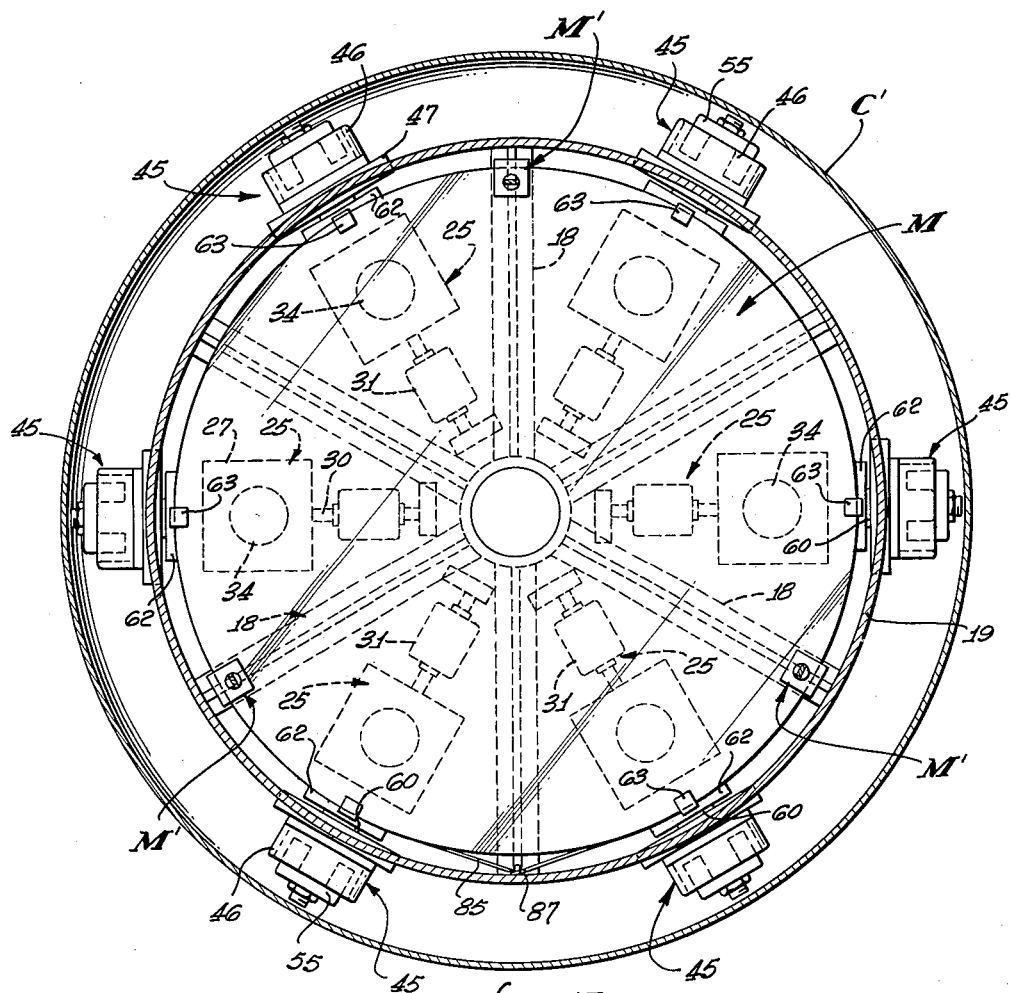
FIG. 7 is a transverse sectional view as taken on the line 7—7 of FIG. 5 on an enlarged scale.

As seen in FIGS. 2 and 7, there are preferably three of such adjuster means M' disposed 120° apart. Each micrometer adjuster means includes a mirror-engaging bracket 67 having top and bottom flanges 68, 69, with the flange 68 adapted to engage the upper marginal edge section of the mirror M and the flange 69 projecting beneath the lower marginal edge section of the mirror M. Each flange 69 is provided with a spring-loaded plunger 70 for normally clamping the mirror M into engagement with the overlying flange 68 of the respective brackets 67. Each bracket 67 is provided with a button 72 at the upper extremity of the flange 68 thereon, the button also retaining in place a sleeve 73 into which projects the lower end of the adjuster rod 71. At its upper end the rod 71 extends through a bushing 74 into a micrometer supporting housing 75, in the upper extremity of which there is clamped, as by means of a screw clamp 76, the lower end of a micrometer 77 having a pin 78 disposed in opposed spaced relation to the upper end of the adjuster rod 71, with a ball 79 interposed therebetween.

Accordingly, since the mirror M is counterbalanced by the counterbalance mechanisms 25 previously referred to, the mirror M may be readily accurately adjusted relative to the focal surface Y by adjustment of the respective micrometer adjustment mechanism M'.

In order to accommodate for expansion and contraction of the mirror M without altering the focal adjustment thereof, the respective adjuster rods 71 are preferably composed of materials such that the coefficient of expansion of the rods 71 is the same as the coefficient of expansion of the mirror M. For example, if the mirror be made of "Pyrex" then it has been found that a combination of Invar and steel in the rods 71 will produce rods having substantially the same coefficient of expansion and contraction as the Pyrex mirror. Thus, expansion and contraction of the latter will not disturb the focal setting as would occur were the rods 71 and the mirror M composed of materials having different coefficients of expansion. Further in connection with the rods 71 it will be noted that upon adjustment of the rods by the micrometers 77 the upper extremity as well as the lower extremity of each rod is fixed. To maintain the position of the upper end of the rod 71, the upper portion of bushing 74 is suitably slotted as at 74' and provided with clamping means such as screws 74". In order to enable slight movement of the mirror in such directions as may be necessary to achieve best focus of an image on the focal surface Y, the rods 71 are preferably rendered resilient to flexure as by forming at axially spaced points along the rods a pair of opposed slots 81 and adjacent thereto in axially spaced relation and located 90 degrees from slots 81, a pair of opposed slots 82, there remaining between the slots a thin web of rod material as at 83, affording flexibility for the rods 71. Thus it is clear that the mirror M while being virtually supported by the counterbalance mechanisms 25 may be adjusted by the micrometer means M' along the axis of the central column bearing support, but the mirror M is free for slight rotation relative to the column support.

Inasmuch as rotational displacement of the mirror is not desirable, means are provided for preventing such limited rotation. As best seen in FIGS. 6 and 7, a winding of prestretched nylon, as at 85, is made about the outer periphery of the mirror M in a peripheral channel 86. These ties 85 may be appropriately secured as by tying about a pin or the like, as at 87, as seen in FIG. 7.

From the foregoing, it will now be understood that while the axial columnation supporting means referred to above controls the position of the mirror M in a radial direction, i.e., maintains axial alignment, with respect to the optical and geometrical axes of the camera body, the micrometer adjuster means M' controls the position of the mirror M axially of the assembly, and the ties 85 control rotation of the mirror M. The counter-balance mechanisms, in effect, minimize the stresses of restraint. In this respect, the counter-balance means 25 counterbalances the axial component of the weight vector of the mirror M, while the counterbalance means 45 counterbalances the radial component of the weight vector of the mirror M. Accordingly, the angular tracking and alternate oscillating movements as well as the attitude of the camera body have no ill effect on the mirror mounting and axial alignment is maintained.

Projecting upwardly from the central body section C''' of the camera body and secured thereto as by bolted flanges at 88, is an upper camera body member 89 to which is supported a corrector cell lens supporting ring 90, the ring 90 being secured to an upper body flange 91 by means of screws 92. As best seen in FIGS. 5 and 15, the corrector cell L comprises three lenses, namely an upper lens L', an intermediate lens L", and a lower lens L'''. The lens supporting ring 90 is adapted to support the central lens L", and accordingly is provided adjacent its lower section with an inwardly projecting flange 93 upon which the lens L" rests. Disposed above the inwardly directed flange 93 of lens supporting ring 90 is an annular ring 94, having a resilient rubber or other gasket 95 engaging the upper marginal portion of the lens L". The ring 94 is adapted to be urged toward the flange 93 so as to clamp the lens L" therebetween, as by means of a suitable plurality of set screws 96 disposed in circumferentially spaced relation about the ring 94 and carried by an expansible lock ring 97, the supporting ring 90 being provided with an inner peripheral channel 98 for reception of the ring 97. As best viewed in FIG. 18, the split ring 97 is adapted to be expanded as by means of an expander screw 99 rotatably engaged at one end of the split ring and threadedly engaged in the opposing end of the split ring 97.

At its upper extremity the lens supporting ring 90 is provided with a cylindrical upward extension 100 about which is disposed a cylindrical upper lens supporting ring 101, having an inwardly directed flange 102 against which is pressed the other marginal section of the lens L'. In order to maintain pressure of the marginal edge of the lens L' against flange 102, a ring 103 is disposed in opposed relation to the flange 102 and is provided with a rubber or like gasket 104 engaged with the lens L'. An expansible locking ring 105, similar to the ring 97 previously described, is employed to maintain pressure of the ring 103 against the lens L' as by means of a suitable number of set screws 106 carried by the locking ring 105.

At its lower extremity the central lens supporting ring 90 is provided with a further cylindrical section extending downwardly as at 107, and a lower lens supporting ring 108 is disposed about the cylindrical portion 107 at the upper extremity of ring 108, the lower portion of ring 108 having a flange 109 against which the lower lens L''' abuts, there being a pressure ring 110 opposed to the flange 109, and having a resilient rubber or other gasket 111 interposed between the ring and lens L'''. An expansible locking ring 112, which is similar to locking rings 97 and 105 previously described, engages in a groove 113 in the ring 108 to retain the pressure ring 110 in engagement with the lens L''', there being a suitable plurality of set screws 114 extending through the locking ring into engagement with the pressure ring 110.

For connecting the rings 90, 101, and 108 together, a suitable number of circumferentially spaced bolts 90a, see FIG. 5, extend through ring 101 into center ring 90, while a plurality of bolts 90b extend upwardly through ring 108 into center ring 90. It will be noted that a set screw 115 is shown in FIG. 15 extending through the lower section of upper lens supporting ring 101 into engagement with the cylindrical extension 100 of the central lens supporting ring 90. In addition, a further set screw 116 extends through the upper section of lower lens supporting ring 108 into engagement with the cylindrical lower extremity 107 of the central lens supporting ring 90. As will be apparent, a suitable number of the set screws 115 and 116 may be disposed in angularly spaced relation about the respective lens supporting rings, and by appropriate adjustment of the screws 90a and 90b the axial relationship of the lenses may be adjusted and ultimately set by the set screws 115 and 116.

The three lenses L', L'', and L''', as previously mentioned, constitute a triple lens cell which is adapted to fully achromatize the field through the visible spectrum, reducing chromatic aberration to a minimum. The lenses L' and L''' are preferably constructed of a material having a coefficient of expansion different than the coefficient of expansion of the center lens L'', since it has been found that the use of lens material as stated provides photographic accuracy while affording certain advantages in mounting. In this connection, the three lens elements are accurately maintained in position on a common axis by means provided for this purpose, as more particularly shown in FIGS. 13 through 17.

Figure 13:
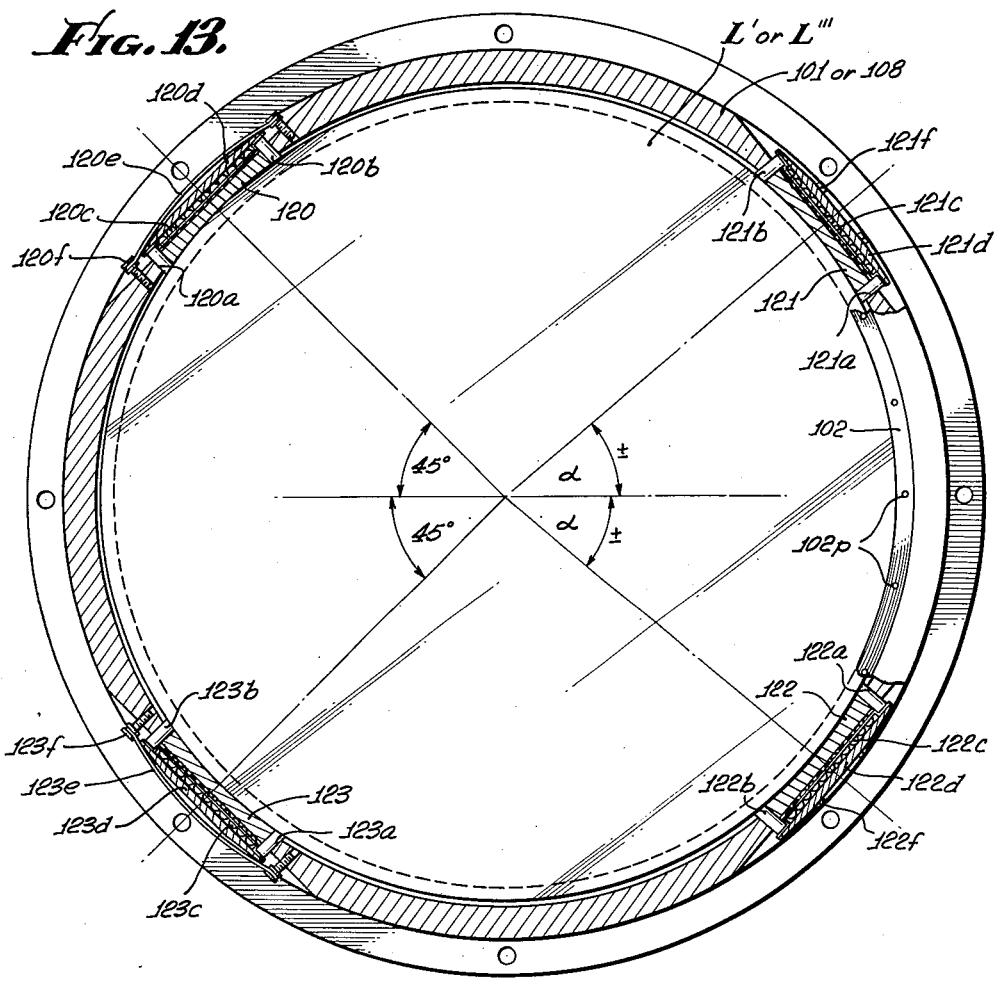
FIG. 13 is a transverse sectional view, as taken on line 13—13 of FIG. 5, on an enlarged scale.
Figure 17:
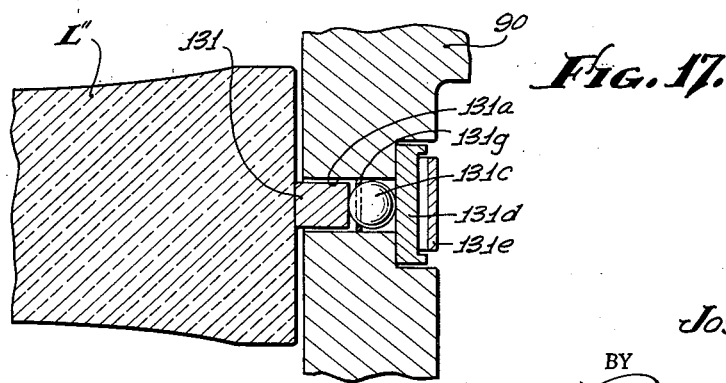
FIG. 17 is a view in vertical section, as taken on line 17—17 of FIG. 16.

Referring to FIG. 13, the lens L' is shown as being concentrically mounted within the lens supporting ring 101 between a series of four angularly spaced pads respectively designated 120, 121, 122, and 123. These pads 120 through 123 are provided with arcuate surfaces engageable with the outer periphery of the lens L', and are disposed in windows 120a, 121a, 122a and 123a respectively, extending radially through the lens supporting ring 101. Interposed between the opposite ends of the respective pads 120 through 123 and the end walls of the windows 120a through 123a, are short rubber sections or tubes 120b, 121b, and 123b, constituting air seals. Disposed along the outer faces of the respective pads 120 through 123 is a series of balls 120c, 121c, 122c and 123c, these balls respectively being retained in engagement with the pads by means of plates 120d, 121d, 122d and 123d. It should be noted that the plates 120d and 123d are resiliently urged into engagement with the balls 120c and 123c, as by means of leaf spring elements 120e and 123e, respectively, these leaf spring elements being secured to the ring 101 as by means of screws 120f and 123f respectively. Moreover, it should be noted that the pads 120 and 123 are centered on radii which are disposed at right angles to one another, as evidenced in FIG. 13, where each of these pads is centered upon a radius displaced 45° from a transverse center line. However, the pads 121 and 122 are not diametrically opposed to pads 123 and 120 respectively, but instead are located on radii at an angle α relative to the aforementioned transverse center line. Moreover, the ball retainer plates 121d and 122d of pads 121 and 122 are not spring biased towards the pads, but instead are fixedly mounted as by screws 121f and 122f, these screws extending into the ring 101 to secure the plates 121d and 122d in place in an obvious manner.

The lens L''' is supported about its outer periphery by means of pads similar to pads 120 through 123, as particularly illustrated in FIG. 15, wherein the same reference numerals have been applied.

The central lens L'' is also mounted between angularly spaced pads similar to those previously described in connection with lens L', although it will be noted that the balls are somewhat larger with reference to FIG. 14 particularly. A further distinction in the showing of FIG. 14 is the fact that the adjacent spring biased pads are disposed on radii 45° displaced from a transverse center, whereas the non-spring biased pads are disposed on centers displaced 50° from said transverse center at an angle β greater than 45°. By proper selection of angles α and β so that their sum is 90° they differ from 45° by the same amount, and so that the proportionality of the cosine of angle α to the cosine of angle β is the proportionality of the coefficient of thermal expansion of the material of lenses L' and L''' compared to lens L. The optical axes of the lenses may be maintained aligned independent of temperature changes.

In this connection, the lens L'' is centrally positioned by means of four angularly spaced pads 131, 132, 133 and 134, each disposed in a window respectively designated 131a, 132a, 133a and 134a, extending radially through the lens supporting ring 90. Rubber tubes 131b, 132b, 133b and 134b are interposed between the extreme ends of the respective windows and the pads 131 through 134, while balls 131c, 132c, 133c and 134c are interposed between the pads 131 through 134 and retainer plates 131d, 132d, 133d and 134d. Leaf springs 131e and 134e are retained in place by screws or the like 131f extending into the lens supporting ring 90, while the ball retainer plates 132d and 133d are directly secured to the lens supporting ring 90 by screws 132f and 133f respectively, as best seen in FIG. 16. The balls designated 131c in this view are preferably disposed in a ball spacer member 131g having end flanges 131h overlying the outer ends of the rubber tubes 131b, while the inner ends of these tubes are in engagement with the outer periphery of the lens L''. The sealing tubes 120b and 131b prevent the escape of air from between the lenses L', L'' and L''' and prevent entry of foreign matter such as dust.

If desired, moreover, means may be provided for forcing the circulation of dry air through the corrector cell lens system. In this connection, particular reference is made to FIG. 15a, as to the path of air circulation through the lens assembly and to FIGS. 1, 2 and 5 as to means for forcing a draft of dry air into the central section C''' of the camera body C.

As seen in FIG. 1, means such as a squirrel cage or other fan designated in broken lines at A is disposed within the housing H beneath a grip or screen H', with a filter and desiccant container H'' interposed between the fan and the grid. The fan is operative to cause a draft of air through the grid of screen H' and desiccant container H'' into the housing space A' outside of the body member 67, as best seen in FIG. 5. This body member 67 is provided with an opening 67' leading into the central body section C''' so as to provide a high pressure dry air condition within the body C, virtually filling the body with dry air, thus maintaining the mirror M in a dry environment.

Air flow from the body C is provided for in such a manner as to cause the dry air to circulate upwardly through the lens assembly L, around and between the lenses L', L'', and L''', thus maintaining the lenses in a dry environment. This is especially desirable in the case where the lenses, or at least one of them, may be composed of a glass or other material which is subject to corrosive attack when moist as by reason of condensation.

Referring to FIG. 15a, it will be noted that lens supporting flange 109 is provided with a suitable number of passageways 109p leading from the body into an annular space 109s between the flange 109 and ring 110. In angularly spaced relation to the passageways 109p the ring 110 is provided with a suitable number of peripheral notches 110a providing passageways leading from space 109s into the space between the ring 110 and the locking ring 112. Thus air from the hollow central body section C'''' will pass upwardly through its primary avenue of escape through passages 109p and 110a into the space 110b between lenses L''' and L''.

The lens supporting ring or flange 93, as seen in FIGS. 15 and 15a has a suitable number of circumferentially spaced passageways 93p establishing communication between space 110b and annular space 93s around the middle lens L'', into which air will pass. Ring 94 above the lens L'' has a number of outer peripheral notches 94a providing passageways angularly spaced, as for example at the opposite side of the lens assembly from passageways 93p, leading from annular space 93s into the space 94b between lens L'' and lens L. Likewise, ring 103 is provided with a suitable number of notches 103a providing passageways leading from the space 94b into the annular space 103s about upper lens L'. Angularly spaced relative to the passageways 103a the flange 102 of upper lens support 101 is provided with a suitable number of passageways 102p extending from the annular space 103s into the hood 12.

Accordingly, it will be noted that air follows a path of circulation through the lens assembly, substantially as indicated by the arrows in FIG. 15a. The sealing rings 95, 104 and 111 engaged with the respective lenses confine the dry air to this path of flow, and preferably a sealing ring 90c, as for example, a ring of L-shaped section, is disposed about the lens mounting assembly at the juncture of the lens supporting ring 90 with the annular member 101. Another sealing band 90d is preferably disposed about the assembly to seal the gap between the lower section 107 of ring 90 and the lower lens supporting member 108. Moreover, as previously mentioned, rubber tubes or other seals 120b through 123b and 131b through 134b prevent leakage of air through the lens centering pad means previously described.

*Film Transport Mechanism*

Referring to FIG. 19a, there is a plate 150, extending between flange 65 at the base of the central body section C'' and the flange 88 at the head of the central body section. Projecting from the plate 150, and interconnected therewith as by means of screws 151 or the like, is a generally L-shaped dark-box 152.

A hollow film magazine 153 constituting the fresh film feed magazine F depends from the dark-box 152. In this connection the dark-box 152 is preferably provided with a lower wall 154 having at its opposite sides outstanding ears 155 and 156. A pivot bracket 157 is secured as by a screw 158 to the upper inside edge of the magazine 153 and is provided with a tongue 159 adapted to engage in a recess 160 in the ear 156. At the upper outside edge of the magazine 153 a bracket 161 is secured as by means of a screw 162, this bracket having a spring pressed detent 163 carried thereby, for engagement in a socket 164 in the ear 155 of dark-box 152. Accordingly, the magazine 153 is removably secured to the dark-box 152 as by the tongue 159 and detent 163 engaging in the recesses 160 and 164 respectively of the ears 156 and 155.

Extending generally centrally through the magazine 153 is a shaft 165 on which is mounted a film supply reel 166 adapted to carry a supply of film as designated 167. Pivotally mounted upon the shaft 165 externally of the reel 166 is a film tensioning lever 168 having at one end a tension roller 169 engaging the film strip 167 and urged in a clockwise direction as by a spring 170 connected as at 171 to the side wall 172 of the magazine 153 and connected as at 173 to the lever 168, this spring tending to normally urge the lever in a clockwise direction so as to maintain the film strip 167 under tension as it is being stripped from the reel 166. Since the reel 166 is a free-running reel, that is, it is not a driven reel, friction drag means are preferably provided by securing a friction element 174 to the side wall 172 of the magazine 153. In the illustrative embodiment the friction member 174 is constituted by a strip of rubber, leather, or the like, folded back upon itself and secured to the wall 172 as by a rivet 175, as best seen in FIG. 22. The film strip 167 passes upwardly from the magazine 153 through a slot 176 in the upper wall 177 of the magazine, and thence through a slot 178 in the lower wall 154 of dark-box 152.

Light sealing means are provided between the walls 154 and 177 of the dark-box 152 and magazine 153, as by disposing sponge rubber pads 179 therebetween. In addition, rollers 180 and 180a are respectively suitably mounted upon the inner surface of wall 177 and the inner surface of wall 154, so as to guide the film strip through the respective slots 176 and 178, into the dark-box 152 from the magazine 153.

Rotatably mounted in the dark-box 152 is a film feed roller 181 mounted on a shaft 182, this shaft being driven by the aforementioned power transmission mechanism N which includes a power transmission mechanism mounted within a housing 183 disposed above the dark-box 152 and connected to the plate or bracket 150, previously described, as by screws 184, in a manner which will be hereinafter more fully described.

The power transmission mechanism 183 is adapted to drive the film feed roller 181 in the direction of the arrow shown on the latter. The film strip 167 passes from between rollers 180a upwardly over an idler roller 185 and thence about the feed roller 181. From the roller 181 the film strip 167 passes over a further idler roller 186 which is journalled in a bracket or plate 187 disposed in an opening 189 through the plate 150. Externally of the dark-box 152, a film feed tunnel generally designated 190 is secured to the plate 150 as by screws 191, 193 the bracket or plate 187 being secured to the film tunnel device as by screws 192 and 193.

As seen in FIGS. 19a and 19b jointly, the tunnel device 190 comprises a pair of complemental body sections 194 and 195, with the screws 191 connecting the body portion 195 to the plate 150 and with the screws 193 connecting the upper body section 194 of the tunnel device to the plate 150. As shown in broken lines in FIGS. 19a and 19b, sealing plates 196 are suitably secured along the opposite sides of the complemental body sections 194 and 195 of the tunnel device 190, so as to prevent the passage of light into the tunnel 197 defined between the opposing internal faces of the body members 194 and 195. The film strip 167 is adapted to freely pass through the tunnel 197 as it leaves the dark-box 152, and passes toward the film back-up plate 206 which provides the focal surface in the optical system previously described.

Mounted at the west or left hand extremity of the tunnel mechanism 190, as viewed in FIG. 19b, is a plate 200 secured to an ear 201 on the tunnel body member 194, as by a screw 202, and secured as by an ear 203 on the plate 200 to the tunnel body section 195 as by screw 204. The film strip 167 passes through a lined opening 205 in the plate 200 so as to ride beneath a film back-up member 206, which is preferably composed of glass having a cadmium plated surface determining the aforementioned focal surface Y.

The film back-up member 206 is supported by a body member 207 connected to the plate 200 previously mentioned as by screws 208 (see FIG. 21) and extending longitudinally in the direction of the film take-up magazine F'. At its end opposite the plate 200, the body member 207 has suitably secured thereto an end plate 209. Along its opposite sides the body member 207 has secured thereto a pair of longitudinally extended plates 210 and 211 (see FIG. 20), as by means of screw fasteners 212. At longitudinally spaced points along the plates 210 and 211 they are each provided with vertical recesses 213 in which are suitably secured spring detents 214 having prongs engageable in complemental sockets 215 in the film back-up member 206 for appropriately retaining the film back-up member 206 within the confines of the side plates 210 and 211.

The end plate 209 is provided with a passage 216 therethrough lined similarly to the passage 205 in plate 200 leading to a film discharge tunnel device generally designated 217 constructed of complemental body sections 218 and 219 similarly to film feed tunnel 190, previously described   The film discharge tunnel 217 is particularly shown in FIGS. 19b and 19c jointly, in which views it will be noted that the discharge tunnel member 219 is secured to the plate 209 as by screws 220, extending through an ear 221 projecting from the plate 209, while the lower discharge tunnel body member 218 is secured as by screws 222 to an ear 223 projecting from the lower section of the plate 209. At the westerly end of the discharge tunnel device 217, it is secured to a plate 226 extending between flanges 65 and 88 of the central body section. In this connection, the upper tunnel body member 219 is provided with a radial projection 227 through which one or more screws 228 project for connecting the same to the plate 226, while the lower tunnel body member 218 is provided with a projection 229 through which one or more screws 230 project for connecting the latter to the plate 226. The discharge tunnel body members 218 and 219 provide a tunnel passage 224 therethrough, leading towards a west dark-box 225, as viewed in FIG. 19c. Mounted upon a bracket 231 which is secured as by a screw 232 to the tunnel body member 218 and which is disposed within an opening 233 in the dark-box 225 is a guide roller 234 for the film strip 167. Within the dark-box 225 the film strip 167 passes over a film take-up drive roller 235 mounted upon a shaft 236, extending through the dark-box 225. It should be noted at this point that the drive rollers 181 in dark-box 152 and 235 in dark-box 225 are jointly driven by film transport drive mechanism which will hereinafter be more particularly described, but which is adapted to tension the run of film 167 between the rollers 181 and 235 so that the film will conform to the curvature of the back-up member 206 therefor. Moreover, if desired, pressure roller 185, which maintains a driving relation between the feed roller 181 and the film strip 167 in the dark-box 152, may, as will be readily recognized, be loaded across the roller 181 in such a manner that upon the breakage of the film strip 167 so that no film exists between the rollers 185 and 181, suitable switch mechanism may be operated to cease operation of the camera.

Referring now to the west dark-box 225 of FIG. 19c, the film strip 167 passes partially around the take-up roller 235, between the latter and a pressure applying roller 235', about which the film strip then passes downwardly through a slot 237 in the bottom wall 238 of the dark-box 225, between sponge rubber-like shields, or other suitable means, as indicated at 239, these light shields being interposed between the just mentioned wall 238 and the upper wall 240 of the film take-up housing 241 of film take-up magazine F'.

Housing 241 is detachably connected to the dark-box 225 in the same manner as the housing 153 at the east side of the machine, as previously described, is detachably connected to the dark-box 152. Accordingly, as shown in FIG. 19c, a retaining ear 241' on a bracket 242 engages in a recess 243 of the dark-box 225, the bracket 242 being secured to the housing 241 by screw means 242' or the like. Additionally, a spring pressed detent 244 is supported upon the housing 241 as by screws 245, there being a recess 246 engageable by the detent for releasably retaining the housing 241 in place.

Within the housing 241 is an exposed film take-up reel 246', upon which the film is adapted to be wound, this reel 246' being driven in a clockwise direction, as indicated by the arrow, by means of a constantly running motor, as shown at 247 in FIGS. 2 and 3. The motor 247 is adapted to continuously drive the shaft 248 on which reel 246' is keyed and in an obvious manner there is preferably provided between the motor and the shaft 247 and 248 respectively, a slip clutch so that take-up reel 246' remains stationary until such time as the previously mentioned film transport mechanism, which will hereinafter be more fully described, shifts the film through the film path structure of the camera, and through the shutter bridge, as will become hereinafter more readily apparent. In order to maintain tension on the film strip 167 within the take-up magazine housing 241, a lever 249 is rotatably disposed within the housing 241 and is biased as by a spring 250 in a counterclockwise direction, the spring 250 being secured to the lever 249 as at 251, and being secured to the housing 241 as at 252. At one end of the lever 249 is a tensioning roller 253 for maintaining tension on the film strip 167.

*Film Transport Drive Mechanism*

The film transport drive mechanism is particularly shown in FIGS. 23, 24, 25, 34, 43, and 45, to which reference will now be had.

As has previously been mentioned, the film transport mechanism is powered by means of the mechanism generally designated N, which will be more particularly described hereinafter. However, at this point it should be noted that a driven shaft 260 extends from the mechanism N. This shaft 260 is disposed in the control housing H and has mounted thereon a gear 261 meshing with an idler gear 262, which in turn meshes with an idler gear 263 in mesh with a gear 264, which in turn is in mesh with a gear 265, having a crank arm 267 thereon. Rotation of the gear 261 in a counterclockwise direction will effect rotation of the crank arm 267 in a counterclockwise direction. At its free extremity the crank arm 267 has a roller 268 thereon riding in a vertically extended channel member 269, carried by a horizontally extended scotch yoke 270. As best seen in FIG. 24, the gears 264 and 265 are preferably journalled in suitable bearing supports 265' and 264', and the gears 261, 262, and 263 are similarly supported on a vertical wall 271 of the housing H.

Extending from the easterly end of the scotch yoke 270 is a longitudinally extended rack 272 which may be characterized as a film feed rack inasmuch as it is adapted to effect rotation of the film feed roll 181. The rack 272 is preferably secured to the end of the scotch yoke 270 as by means of screws 273. Projecting from the westerly end of the scotch yoke 270 is a film take-up rack 272', which is adapted to drive the film take-up roller 235 synchronously with operation of the feed roll 181 upon reciprocation of the scotch yoke 270 responsive to rotation of the shaft 260.

Figure 25:
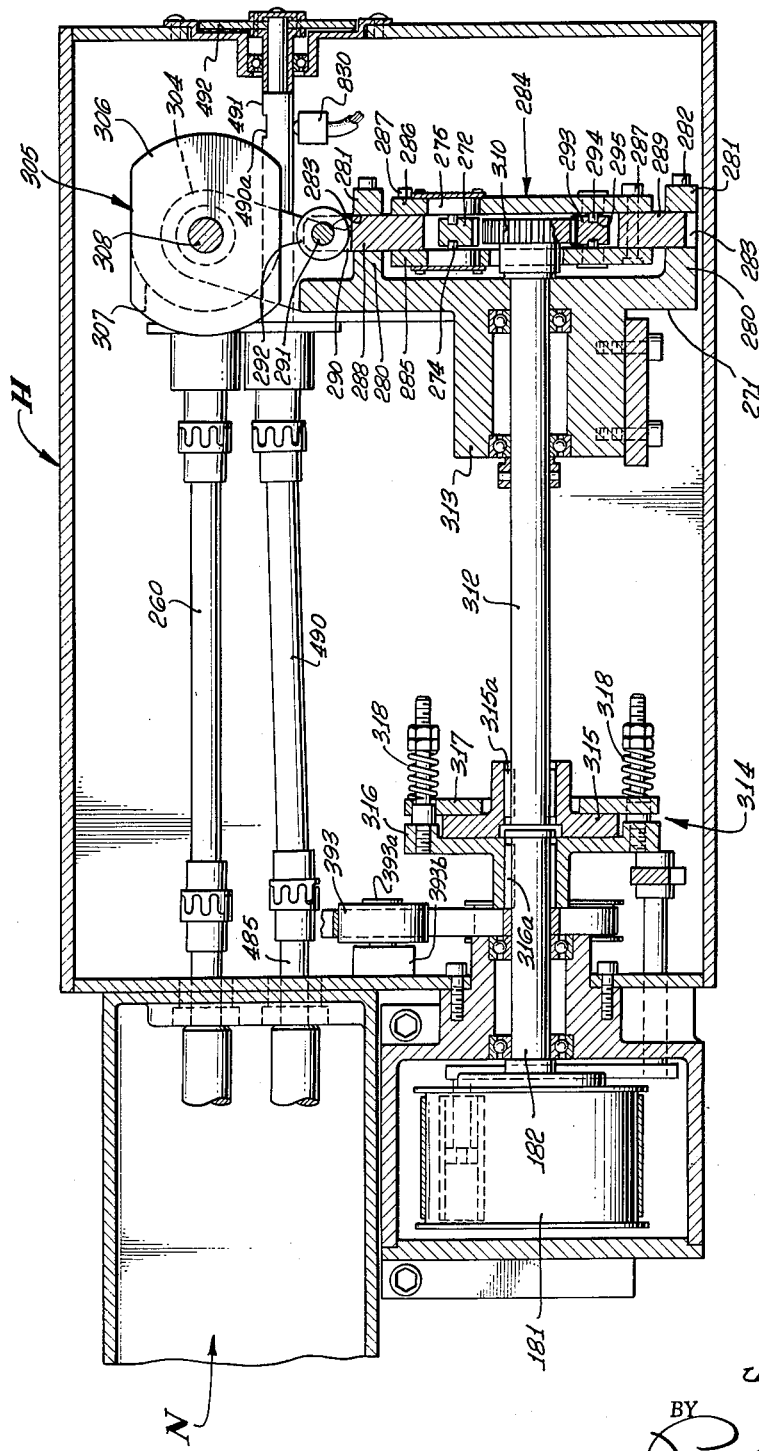
FIG. 25 is a view in vertical section through the film feed and tensioning drive mechanism, as taken substantially on the plane of the line 25—25 of FIG. 23.

In this connection, it will be noted that the wall 271, as is best seen in FIGS. 24, 25, and 25a, is provided with a pair of horizontally disposed, vertically spaced and opposed ears 280, to each of which is attached a member 281, as by screws 282, there being a rectangular opening 283 between each member 281 and the opposing ear 280. Slidably disposed for vertical reciprocation in the openings 283 is a cam follower assembly generally designated 284. This assembly comprises a pair of spaced plates 285 and 286 having clamped therebetween, as by screws 287, a head 288 and a foot 289. The head 288 is bifurcated as at 290, and has mounted therein on a pin 291 a cam follower roller 292.

The film feed rack 272,, previously described, extends through the space between the side plates 285 and 286, and is supported on slider keys 274 rotatably mounted in bearings 275 carried by the side plates 285 and 286. Disposed beneath the rack 272 in vertically spaced relation thereto is a short rack section 293 which is secured in place as by means of slider keys 294 projecting into longitudinally extended channels 295 in the sides of the rack section 293. A pair of opposed webs 298 and 299 are provided between the side walls 285 and 286 of the cam follower slide assembly, as best seen in FIG. 23, and projecting through these webs are set screws 300 which engage the end faces of the rack segment 293 so as to enable axial adjustment thereof, as may be necessary to effect proper film tensioning in a manner which will hereinafter become apparent.

Figure 34:
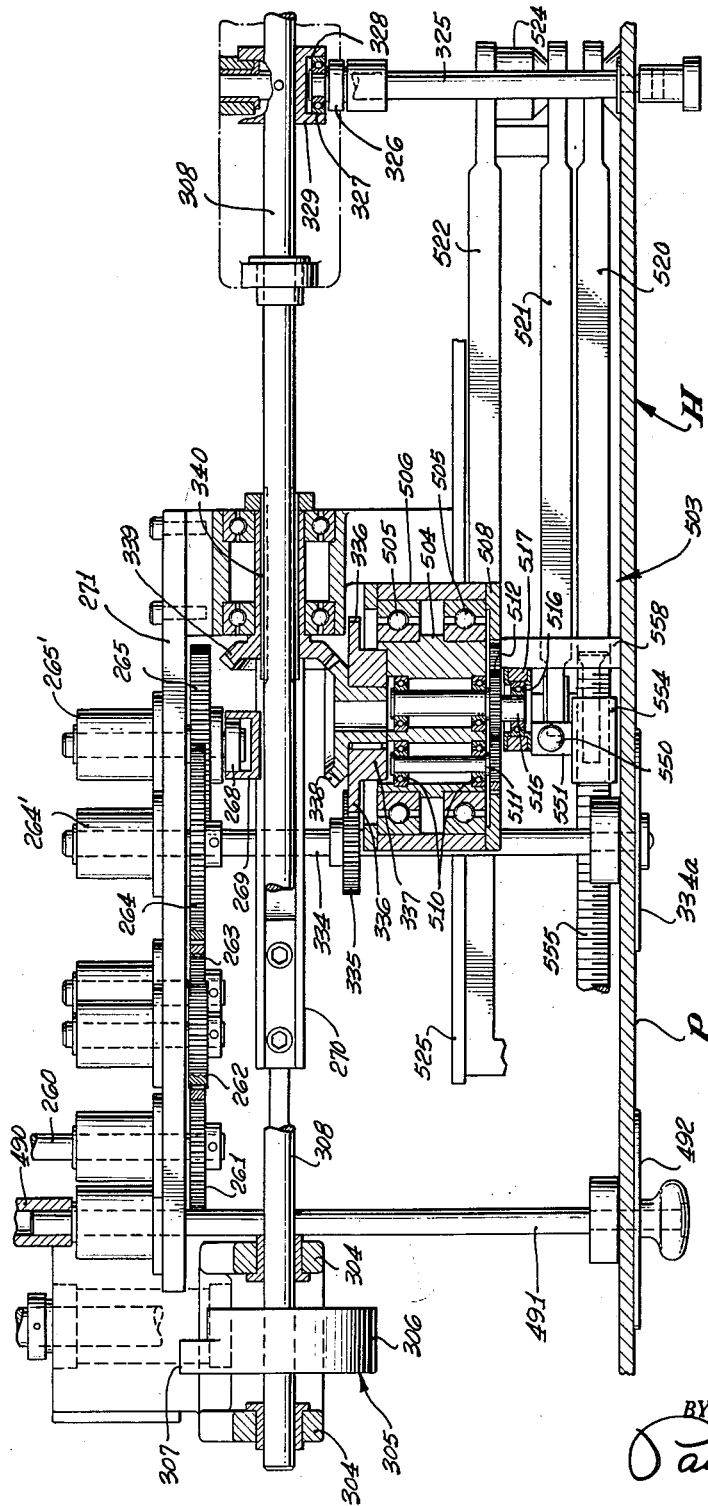
FIG. 34 is a view taken substantially on the plane of the line 34—34 of FIG. 33, with certain of the parts broken away as shown in section, so as to more particularly illustrate portions of the film transport mechanism as well as the camera body nodding mechanism.

It will be recognized with reference to FIGS. 25 and 25a that the slide assembly 284, comprising the plates 285 and 286 and the parts carried thereby, is movable vertically within the openings 283 through supporting ears 280. Such vertical movement of the cam follower slide assembly 284 in an upward direction is preferably effected by suitable means such as tension springs 301 which are connected at one end as by brackets 302 near the base of the slide assembly 284, and which are connected at the other end to a pair of supporting brackets 303 to upstanding shaft-supporting ears 304 on the vertical wall 271 of housing H. Downward movement of the cam follower slide assembly 284 is effected by means of a multiple-lobed cam 305 which, in a manner which will hereinafter be more fully apparent, is adapted to control the advances of the film strip per cycle. The cam 305 is so constructed as to provide a double-lobed section 306 and a single-lobed section 307, as is best seen in FIGS. 34 and 43, selectively engageable with the roller 292. Referring to FIG. 25, it will be noted that upon rotation of the cam 305, a lobe thereon will engage the roller 292 so as to depress the slide assembly 284. Thus, rack 272 is moved downwardly towards a gear 310, while rack section 293 is moved downwardly away from gear 310. In order to effect rotation of the cam 305, it is fixed upon a cam shaft 308 which extends longitudinally within the housing H from substantially one end of the latter to the other and which is supported in the upstanding ears 304.

At the end of cam shaft 308 opposite the cam 305, as seen in FIGS. 43 and 45, is a second cam 305′ identical to the cam 305. The cam 305′ is operative to effect downward movement of a cam follower slide assembly 284′, identical to the slide assembly 284 previously described. Extending through the slide assembly 284′ is a film feed rack 272′, corresponding to but extending oppositely from the rack 272, previously described, the rack 272′ being carried by the scotch yoke 270 and engageable with a film take-up gear 311 (see FIGS. 43 and 45).

Inasmuch as the slide assembly 284′ and the cam 305′ therefor are preferably identical to the slide 284 and the cam 305, it is unnecessary to describe the slide assembly 284′ in further detail. However, it will be noted that the slide assemblies 284 and 284′ are operated in unison by means of the film transport cams 305 and 305′ to effect downward movement of the slides 284 and 284′ such that the respective film feed racks 272 and 272′ will be simultaneously shifted downwardly upon engagement of the cam follower rollers, as indicated at 292, by the single lobe section 307 or 307′ of the respective cams 305 and 305′ or by either of the lobes of the double-lobe section 306 or 306′ of the respective cams 305 and 305′. Such downward movement of the film feed racks 272 and 272′ will move them into engagement with film feed gear 310 and film take-up gear 311 respectively, which are adapted to effect rotation in a film feeding direction of the film feed roll 181 and the film take-up roll 235, which are respectively located in the dark-boxes 182 and 225.

In this connection, the gear 310 is secured to a film feed shaft 312 journalled in a bearing extension 313 formed on the vertical wall 271 of the housing H. Film feed shaft 312 is connected to the film feed roll shaft 182, as best seen in FIGS. 25, 43, and 45, for example, by means of a friction clutch, designated 314 and comprising a central disk 315 engaged between a back-up plate 316 and a spring-loaded pressure plate 317 urged toward the back-up plate 316 as by means of coil spring devices 318. The disk 315 is keyed as at 315a to the film feed shaft 312, while the back-up plate is keyed as at 316a to the film feed roll drive shaft 182. Film feed rack 272′ engages the gear 311 previously referred to, which, as best seen in FIG. 43 for example, is connected to a film take-up shaft 319, which is in turn coupled to the film take-up roll shaft 236, as by a clutch 314a which is preferably identical to the clutch 314 previously described.

Accordingly, it will be noted that as a result of rotation of gear 265, the crank arm 267 carried thereby will effect horizontal translation of the scotch yoke 270, to effect simultaneous rotation of the film feed shaft 312 and the film take-up shaft 319 when the film feed rack 272 and the film take-up rack 272′ are respectively engaged with the gears 310 and 311.

Referring now more particularly to FIGS. 25 and 25a, it will be observed that as the cam follower slide assembly 284 is being shifted downwardly by the film transport cam 305 and correspondingly the slide assembly 284′ is being shifted downwardly by the film transport cam 305′, the rack sections, as shown at 293 in FIG. 25, will be moved downwardly from engagement with the respective gears 310 and 311 to release the latter for rotation upon engagement thereof by the racks 272 and 272′.

As the cam follower rollers 292 ride off the lobes or the lobe, as the case may be, of the respective cams 305 and 305′, the tension spring means 301 will shift the slide assemblies 284 and 284′ upwardly to effect reengagement of the gears 310 and 311 with the film feed and take-up racks 272 and 272′, which will lock the film feed shaft 312 and the film take-up shaft 319 against rotation. As will hereinafter be more readily apparent, this locking of the film feed and take-up shafts occurs during exposure of the film.

Moreover, in order to effect tensioning of the film strip 167 on the arcuate film back-up 206, the rack section 293 may be so located relative to the corresponding rack section in the slide assembly 284′ that slight rotation in a film tensioning direction will be imparted to the film feed shaft 312 and to the film take-up shaft 319 by virtue of the angle of the coengaging teeth on gears 310 and 311 and the rack sections carried by the slide assemblies 284 and 284′. The clutches 314 and 314a provide means for enabling slippage in the film tensioning mechanism and to equally distribute film tension over the entire span of the back-up member 206.

In the operation of the film transport mechanism it will be understood that the film strip 167 will be shifted only while the cam follower slide mechanisms 284 and 284′ are depressed by the cams 305 and 305′. Each depression of these slides is preferably calculated to effect a single advance of the film strip. Therefore, if the cams 305 and 305′ are positioned, for example, as shown in FIG. 23, both of the lobes of the double-lobe section 306 of the cam 305 will effect depression of the slide assembly 284, and correspondingly two depressions per revolution of cam shaft 308 will be imparted to the slide assembly 284′ by the cam 305′. However, if the respective cams 305 and 305′ should be positioned in an axially adjusted position such that the single-lobe section 307 of cam 305, as well as the single lobe section of cam 305' are operative to effect depression of the slide assemblies 284 and 284', then the slide assemblies 284 and 284' will be depressed once per revolution of the cam shaft 308.

Figure 33:
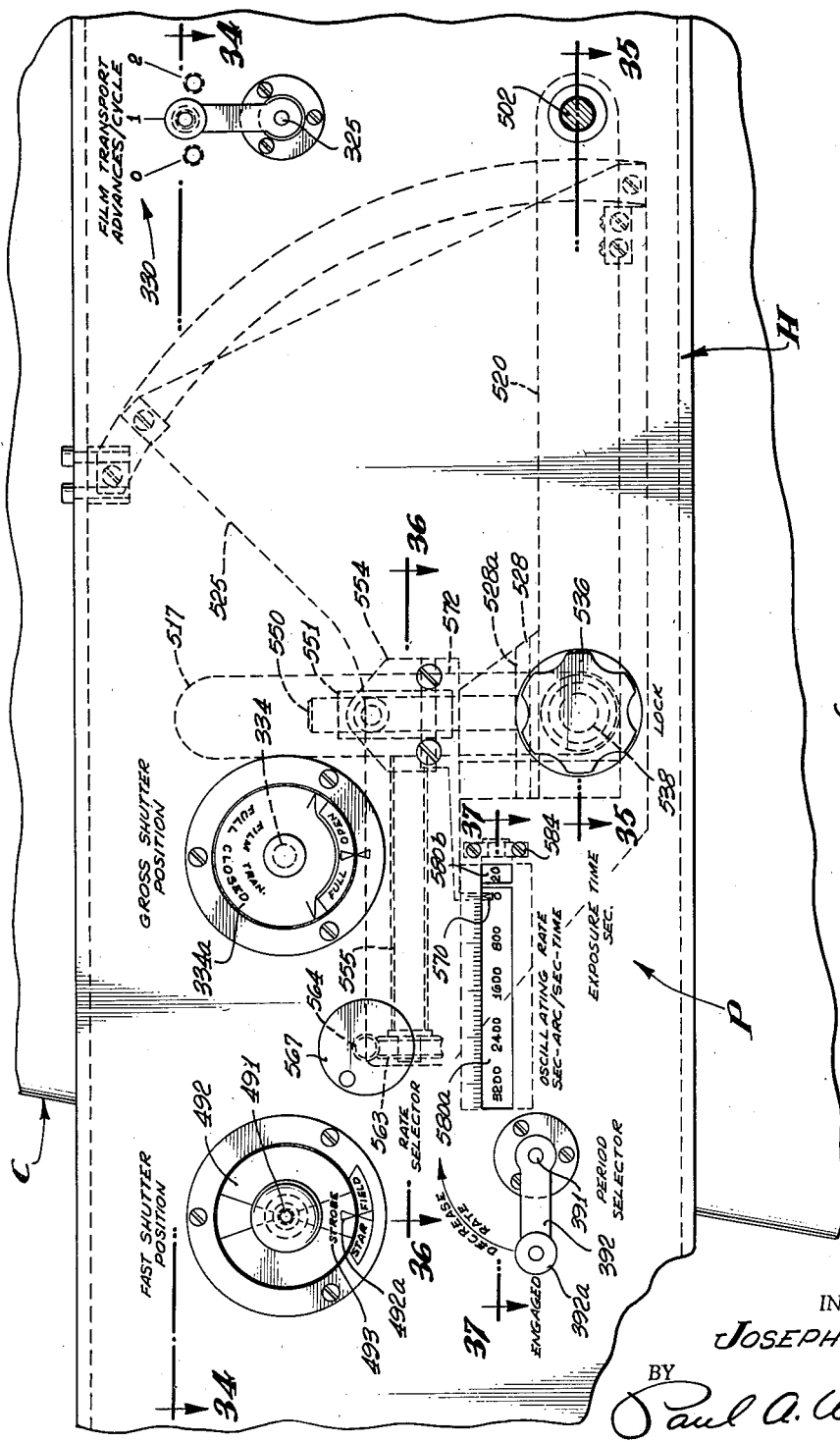
FIG. 33 is a view in side elevation and on an enlarged scale, showing the control panel illustrated in FIG. 1.

In order to effect such adjustment of the cams 305 and 305', so as to effect variation in the number of advances of the film strip 167 per cycle of the cam shaft 308, a cam shaft shifter means is provided as best seen in FIGS. 34 and 43. In the illustrative embodiment a crank shaft 325 extends through the housing H and is provided with a throw 326 having at its end a bearing 327 disposed in a channel 328 in a spool connector 329 secured to the cam shaft 308. Referring more particularly to FIG. 33, it will be seen that the crank 325 has a handle disposed exteriorly of the housing H, such that indicating means in the form of indicia upon the front panel of the housing H, as indicated at 330, will indicate to a machine operator whether the cam shaft 308 is positioned so that a single lobe of the cams 305 and 305' respectively, is operable to effect vertical reciprocation of the slide assemblies 284 and 284' as shown in FIG. 33, or alternatively whether two of the lobes are effective, or whether the cam shaft 308 has been shifted to such a position that the cams 305 and 305' are so disposed relative to the slide mechanisms 284 and 284' that they will not effect operation thereof. In accordance with the invention, the indicia 330 indicates that, depending upon the position of the crank handle of the crank 325, a film strip 167 will be advanced zero, one, or two steps or advances per cycle of operation of the machine.

Rotation of the cam shaft 308 is effected, as best seen in FIGS. 34 and 43, through a shaft 334 driven by gear 264 previously described, from which is derived the actuation of the scotch yoke 270. Mounted upon the shaft 334 is a gear 335 which is in mesh with a gear 336 of nodding motion mechanism hereinafter to be described. The gear 336 is provided with a hollow central hub 337 in which is keyed a bevel gear 338 disposed on an axis generally normal to cam shaft 308, and in mesh with a bevel gear 339 keyed to the cam shaft 308, as by a key 340. Accordingly, it will be noted that, as previously mentioned, the cam shaft 308 will be rotated through the gearing comprising gears 261 through 265, which are also effective to rotate the crank 267, whereby the scotch yoke 270 will be reciprocated in timed relation of the cam 308. Hence, depending upon the selective adjustment of the cam shaft adjuster crank 325, the film strip 167 will be advanced by the film feed mechanisms to a selected number of advances per cycle. The speed of the film feed operation is variable by the film transport and nodding motion drive mechanism N in a manner which will become hereinafter more apparent.

*Film Feed and Shutter Drive Mechanism*

The film feed and transport mechanisms previously described are driven by the transmission mechanism N within the housing 183 disposed upon the dark-box 152, as best seen in FIG. 19a.

Referring particularly to FIG. 19d, it will be noted that the drive motor 349 previously described is secured to the rear wall of the housing 183 as by bolts 350, the motor shaft 351 projecting through the housing 183 and having thereon a worm 352 engaged by a worm gear 353, which is keyed as at 354 to an input shaft 355 disposed normal to the motor shaft 351. Shaft 351 is journalled, as by a bearing 356, in opposed upstanding supports 357 each connected to the base of the housing 183 as by screws 358. Disposed in axially spaced relation along the input shaft 355 are a series of gears 359, 360, 361, 362, and 363, which are of progressively larger diameters and which are each keyed or otherwise suitably secured to the input shaft 355.

Disposed in parallel spaced relation to the input shaft 355 is an output shaft 364 journalled at its opposite ends in the upstanding supports 357. Rotatably mounted upon the shaft 364 in axially spaced relation therealong is a series of gears 359a, 360a, 361a, 362a, and 363a, which are respectively meshed with gears 359 through 363. The output shaft 364 is provided with diametrically opposed and longitudinally extended slots 365 therein, in which are slidably disposed a pair of arms 366 of a selector fork 367, these arms 366 having at one extremity thereof radially projecting lugs 368. The selector fork 367 is preferably so constructed that the arms 366 thereof are stressed into the longitudinal slots 365 of the output shaft 364 by the hubs of the respective gears 359a through 363a, whereby the lugs 368 of the arms 366 will normally be inherently biased outwardly for selective engagement in longitudinally extended internal keyways within the hubs of gears 359a through 363a. As is best seen in FIG. 19a, the gear 363a is provided with a pair of such keyways which are designated 363b and which are disposed in diametrically spaced relation so as to register with the slot 365 of output shaft 364.

Means are provided for shifting the selector fork 367 axially with respect to output shaft 364 so as to selectively engage the lugs 368 on the arms 366 of the selector fork in the keyways 363b of gear 363a or in the corresponding keyways of any of the gears 359a through 362a. When the lugs 368 are engaged with a selected one of the hubs of the gears 359a through 363a, then the selected gear will be keyed to the output shaft 364, so that the latter will be driven by one of the gears 359 through 363.

Inasmuch as the gears 359 through 363 and 359a through 363a effect operation of the shutter mechanism hereinafter to be described, and accordingly control the exposure time, it will be evident that the exposure time may be readily varied merely by axially shifting the selector fork 367, as by means of a novel operating mechanism, generally designated 369.

This operating mechanism includes an internal cylindrical member 370 having an inner end flange 370' suitably secured to the upstanding support 357 within the housing 183. Extending longitudinally of the internal member 370 is a pair of diametrically opposed slots 371 through which project a pair of roller supporting pins 372 carried by a thrust bearing hub 373. Within the hub 373 is a bearing 374 which is connected to the end of the selector fork 367 so that the selector fork 367 is rotatably disposed within the non-rotating hub, about the bearing 374. Rotatably mounted at the outer extremity of each of the pins 372 is a roller 375, these rollers being disposed within a helically arranged channel 376 formed in a rotatable shifter sleeve 377, as is best illustrated in in FIG. 19f. This shifter sleeve 377 is journalled at its outer extremity upon a bearing 378, carried by the internal member 370 referred to above. Disposed about the shifter sleeve 377 is an outer sleeve 379 which is appropriately rigidly connected to the shifter sleeve 377 and which has secured thereto a gear 380. In addition, the sleeve 379 adjacent the gear 380 is journalled within a bearing 381 disposed in a recess 382 in the upstanding support 357. Thus it will be observed that the assembly comprising the shifter sleeve 377 and the external sleeve 379 is freely rotatably mounted on bearing 378 at one end and in bearing 381 at the other end.

Such rotation of the shifter sleeve 377 will effect axial movement of the selector fork 367, thus shifting the lugs 368 of the arms 366 of the selector fork selectively into interlocking engagement with the hub of a selected one of the gears 359a through 363a so as to vary the drive ratio from the input shaft 355 to the output shaft 364.

Rotation of the shifter sleeve 377 is preferably effected by manual control means and for this purpose a bevel gear 385 is in mesh with the gear 380 on the sleeve 379, and is adapted to be driven by a shaft 386 supported in a bracket 387 mounted upon the base of the housing 183. The shaft 386 projects from the housing 183 and, as shown in FIGS. 43 and 45, has secured thereto a pulley 388 about which is trained a drive belt 389. This drive belt is disposed about a drive pulley 390 mounted upon a speed selector crank shaft 391, which projects through the front panel P of the housing H and has secured thereto an operating crank 392. An idler pulley 393 is engaged with the belt 389 so as to maintain sufficient driving friction between the belt and the pulleys 388 and 390. The pulleys 388, 389, and 393 for the belt 389 are preferably supported on the rear wall of the housing H, as is best illustrated in FIG. 25, wherein the idler pulley 393 is shown as being mounted upon a shaft 393a, journalled in a bearing support 393b, the driven pulley 388 and the drive pulley 390 being similarly supported upon the rear wall of the housing H.

Preferably the gears 380 and 385 are so constructed in relation to the helix of the shifter 377 that a single revolution of the hand crank 392 will effect axial movement of the selector fork 367 from one of the gears 359a through 363a to an adjacent one of these gears. As indicated on the panel of the housing H, as shown in FIG. 33, the arrangement of the speed selector mechanism as herein shown is preferably such that clockwise rotation of the crank arm 392 will shift the selector fork 367 in a direction such that the ratio of the respective complemental gears 359 through 363 and 359a through 363a increases. Preferably the ratio of gears 359 and 359a through 363 and 363a increases at a ratio of 2 to 1. In this connection, for illustrative purposes, assuming gears 359 and 359a have a 1 to 4 ratio, then gears 360 and 360a will have a 1 to 2 ratio, while gears 361 and 361a will be at a 1 to 1 ratio, and gears 362 and 362a will be at a 2 to 1 ratio, while gears 363 and 363a will be at a 4 to 1 ratio.

Accordingly, rotation will be imparted from the drive motor 349 to the output shaft 364 of transmission mechanism N at a selected speed, thus imparting variable speed rotation to a pair of gears 400 and 401 which are mounted upon a common hub 402 keyed to the shaft 364 as at 365. The gears 400 and 401 are pinned together as at 406, and are resiliently biased toward a radially projecting flange 407 on the hub 402 with which the gear 400 is engaged, as by means of a spring pressure plate 408. The pressure plate 408 is secured on the hub 402, as by a retainer ring 409. The gears 400 and 401 are freely mounted about the hub 402 so that a friction drive connection is provided between the shaft 364 and the gears 400 and 401, to enable slippage of these gears relative to the plate 408 and the flange 407 in the event that any of the mechanism driven by these gears should become jammed.

As will now appear, the gear 400 constitutes a slow speed shutter drive gear, while the gear 401 constitutes a fast speed shutter drive gear. Gear 400 is in mesh with a gear 410, which is keyed to a shaft 411 disposed in parallel spaced relation to the transmission shaft 364. The shaft 411 is journalled in a web 412 of the housing 183 at one end of the said shaft, while at the other end of the shaft it is journalled in a bearing 413 secured to the base of housing 183 as by screws 414. Connected to the shaft 411 is a worm 415 which is engaged by a worm gear 416 keyed as at 417 to the slow speed shaft 260, previously described, which drives the film feed mechanism. Mounted on the shaft 260 within the housing 183 is a bevelled gear 418 which is in mesh with a complemental bevel gear 419, keyed as at 420, to a shaft 421 projecting normal to the shaft 260 and journalled in the aforementioned housing web 412, at one end, and in an opposed housing web 422, at its other end. Keyed to the shaft 421 adjacent the web 422 is a gear 423 which is in mesh with a gear 424 fixedly connected as at 425 to a hollow shaft 426 which is journalled at one end in a bearing 425a in the side wall 427 of the housing 183. Referring to FIG. 19b, the other end of the hollow shaft 426 is journalled on a bearing 428 which is disposed about a reduced end 429 of a fast speed shutter drive shaft 430, this shaft 430 being concentrically mounted within the hollow slow speed shutter drive shaft 426, and being provided at its opposite end with a reduced section 431 (see FIG. 19d), in which is keyed as at 432 a gear 433. The gear 433 is in mesh with the fast speed drive gear 401, referred to above. A bearing 434 supports the reduced end 431 of shaft 430 within the hollow shaft 426, while the reduced end 429 of shaft 430 is supported in a coupling member 435 which is journalled on a bearing 436 in the plate 200 of the shutter drive mechanism. A complemental coupling member 437 is connected to the coupling member 435 as by a suitable number of pins 438, the coupling member 437 being suitably attached to the reduced end 429 of shaft 430, so as to effect a driving connection therebetween.

A gear housing 450 is secured to the plate 200 as by bolts 450′, and rotatably disposed therein is a gear 451 having a hub 452 journalled in a bearing 453 in the wall of housing 450. This gear 451 is adapted to drive the aforementioned fast speed shutter or chopper which is generally designated 455 and comprises a pair of end rings 456 and 457, respectively rotatably mounted upon a hub 458 on plate 200 and on a hub 459 on the plate 209, previously referred to, as by bearings 460 and 461. Longitudinally extending between and secured to the rings 456 and 457 is a pair of shutter or chopper blades 462 and 463, these shutter blades being slightly arched longitudinally and being disposed in diametrically opposed relation, as best seen in FIGS. 19b and 20. Rotation of the rings 456 and 457 will effect rotary movement of the blades 462 and 463 about the body member 207 and the film back-up member 206, between the latter and the mirror M so as to successively interrupt exposure of the film strip 167.

In order to effect such rotary movement of the fast speed shutter 455, the drive gear 451 which is driven by the high speed drive shaft 430 is in mesh with gear teeth 456a on the ring 456, as best seen in FIGS. 19b and 20.

The slow speed or gross shutter mechanism is generally designated 465 and comprises an arcuate shell 467, as best seen in FIGS. 19b and 20, which extends longitudinally between shutter supporting plates 200 and 209, and which is secured thereto in an appropriate manner. At the base of the arcuate shell 467 is a longitudinally extended opening 468, which exposes the film strip 167 to an image reflected thereto from the mirror M.

In order to intermittently close the opening 468, clamshell-like shutter members 469 and 470, which extend longitudinally of the shell 467 externally thereof, are mounted for oscillation on levers 469a and 470a, the shutter members 469 and 470 being secured to the levers as by means of screws 469a and 470b. There is a pair of levers 469a and 470a, with a lever of each pair respectively disposed at opposite ends of the shutter mechanism, and, as best seen in FIG. 19b, the levers 469a are connected to one end of a shaft 469c extending through a central opening 207a in the body member 207. Thus, the levers 469a are connected by the shaft 469c for oscillation as a unit. Levers 470a on the other hand, is journalled upon bearings 470c on the ends of shaft 469c, the levers 470a being interconnected by a tubular shaft 470d disposed about the shaft 469c, whereby the levers 470a will oscillate as a unit relative to the levers 469a.

A pair of connecting links 469e and 470e are respectively connected to the levers 469a and 470a, as at 469f and 470f. These links extend vertically and converge upon one another at a point above the coupling members 435 and 437, where they are interconnected as by a pin 475, having thereon a roller 476. Engageable with the roller 476 is a cam 477 mounted upon the hollow slow speed shutter drive shaft 426, which upon rotation of the shaft 426 will effect opening of the slow speed shutter 465 as the roller and links 469e and 470e are elevated, as shown in FIG. 21.

Closure of the slow speed shutter 465 is effected by a tension spring 478 which is connected at one end, as at 479, to the plate 200, and which is connected at its other end, as at 480, to one end of a lever 481, the latter being connected to the pin 475 between the links 469e and being pivotally supported on a pin 482 carried by a supporting block 483, which is in turn secured to the plate 200.

Thus, it will be observed that as a function of rotation of the respective slow speed and high speed shutter drive gears 400 and 401, the gear 451 on shaft 430 will effect rotation of the fast speed shutter 455 as the cam 477 on shaft 426 effects oscillation of the clamshell slow speed shutter 465. Preferably the fast speed shutter 455 will rotate at such a rate relative to the slow speed shutter shaft 426 that the gross shutter will be open about 0.10 of the cycle time and the blades 462 and 463 will interrupt exposure of the film strip 167 about forty times per cycle of the slow speed shutter 426, and thus four separate exposure periods will be provided during the periods when the slow speed shutter is open, as will hereinafter more fully appear.

Preferably means are also provided for manually driving the shutter mechanisms, and in the illustrative embodiment (see FIGS. 19d, 43, and 45) these means include a shaft 485 extending into the housing 183 and having at its inner extremity a bevel gear 486 keyed thereto as at 487 and engaged with a bevel gear 488 keyed as at 489 to the shaft 411. It will be noted that shaft 411 drives the aforementioned slow speed shaft 260 and the slow speed shutter tubular drive shaft 426. Since the shaft 411 is driven by the slow speed shutter drive gear 400, which is keyed to the high speed shutter drive gear 401, rotation of the shaft 485 will also effect operation of the fast speed shutter 465. Moreover, since slow speed shaft 260 drives the film transport and feed mechanism, as previously described, rotation of the shaft 485 by manual means will also effect operation of the film transport mechanism, as well as operation of the nodding mechanism hereinafter to be described.

In order to effect manual rotation of the shaft 485, it is connected as by means of a coupling shaft 490 to a high speed dial shaft 491 which projects through the panel P of the housing H, as shown in FIG. 33, and has mounted thereon a high speed dial 492, provided with markings 493 serving as an indication of the position of the fast shutter. The dial 492, moreover, is adapted to be manually rotated to effect manual operation of the mechanism, as just described. In addition to indicating the high speed shutter position, the dial 492 is provided with a pointer 492a which indicates, relative to a section representing the star field, i.e., the optical field exposed to the film, the instant of firing of a stroboscope lamp which will also be hereinafter described.

In order to visually indicate the position of the gross or slow shutter, means are associated with the slow speed shaft 260, which, as previously mentioned, drives the gear train 261, 262, 263, and 264 for this purpose. Gear 264, as previously mentioned, drives the shaft 334, and this shaft also projects through the front panel P of the housing H and has mounted thereon a gross shutter position-indicating dial 334a having indicia thereon for indicating the full open and full closed positions of the slow speed shutter 465.

*Tracking and Nodding Motion*

Inasmuch as the camera of the present invention is principally adapted to photograph an orbiting object, such as a satellite, in relation to a fixed star background, and since, as previously described, it is accordingly necessary that the camera body travel in a tracking motion while nodding or oscillating during its tracking motion, means are provided for effecting such motion of the camera body about the horizontal pivots 9.

This means includes a large worm gear 500 freely journalled on a bearing 501 on the pivot 9 which is at the panel side or northerly side of the camera in use. A pin 502 is connected to the worm 500 and projects through the panel of the housing H, where it is connected to nodding linkage mechanism generally designated 503 for effecting the nodding motion of the camera. The worm gear 500 is driven at a uniform speed as by the uniform speed mechanism or tracking drive T which will hereinafter be more particularly described, while the nodding linkage 503 is driven by the film transport and shutter operating mechanism N, previously described and more particularly by the gear 335 on the slow speed shutter dial shaft 334 (see FIG. 34), which is driven by the slow speed shaft 260 through gearing 261, 262, 263, and 264.

This gear 335 is in mesh with the gear 336 (see FIGS. 34, 38, and 45), which, as best seen in FIGS. 34 and 38, is connected as by screws 336a to a rotatable body 504 journalled in bearings 505 in a fixed annular body 506. The annulus 506 has secured thereto, as by screws 507, an internal ring gear 508. The rotatable body 504 is eccentrically bored as at 509, and in this bore there is journalled, as on bearings 510, a drive gear 511 which is in mesh with internal gear 508 and with a gear 512 which, as clearly illustrated in FIGS. 38, 39, and 40, is mounted on an axis 512a slightly eccentric to the axis 508a of the ring gear 508. Gear 512 is journalled in bearings 513 in a bore 514 in the rotatable body 504.

Internal ring gear 508 being stationary and the body 504 rotating in a counterclockwise direction, then gear 512 will likewise be driven in a counterclockwise direction by drive gear 511 as it orbits about the axis of ring gear 508, upon rotation of the body 504. A crank pin 515 projects from the gear 512, the center of the crank being represented at 515a, and the throw of the crank being the distance from the center 512a to the center 515a.

Connected to the crank pin 515, as by a bearing 516, is a vertical bar or connecting rod 517 of the nodding linkage 503. By reason of the eccentricity of the axis 512a of the gear 512 relative to the axis 508a of the ring gear 508 and the body 504, which latter are coaxial, and in view of the throw of the crank 515, the vertical motion imparted to the connecting rod 517 is such that its velocity is substantially constant during the mid-part of the lift of the connecting rod 517 as well as during the descent of the connecting rod 517. That is to say, the action of the eccentric or crank 515 is modified by that of the eccentric 512, so that the velocity curve of the connecting rod 517 on the upstroke and downstroke is flattened out.

The gear drive to the eccentric 515 is preferably so related to the gear drive which effects operation of the shutter mechanism and transport of the film that exposure takes place during lifting of the vertical bar or connecting rod 517 and during its descent; that is, the slow speed or gross shutters 465 will be opened during lifting of the vertical bar 517 by the eccentric 515, and will be open again during descent of the vertical connecting rod 517, during which periods of time the vertical velocity of the connecting rod 517 is substantially constant, as just mentioned.

As will appear in the following, this periodic constant velocity of the connecting rod 517 during the exposure periods is instrumental in accurately locating the relative positions of the stars and satellite being photographed, by reason of the constant velocity vertical motion being superimposed on the action of the tangent bar linkage means 503 for effecting nodding of the camera body.

Figure 35:
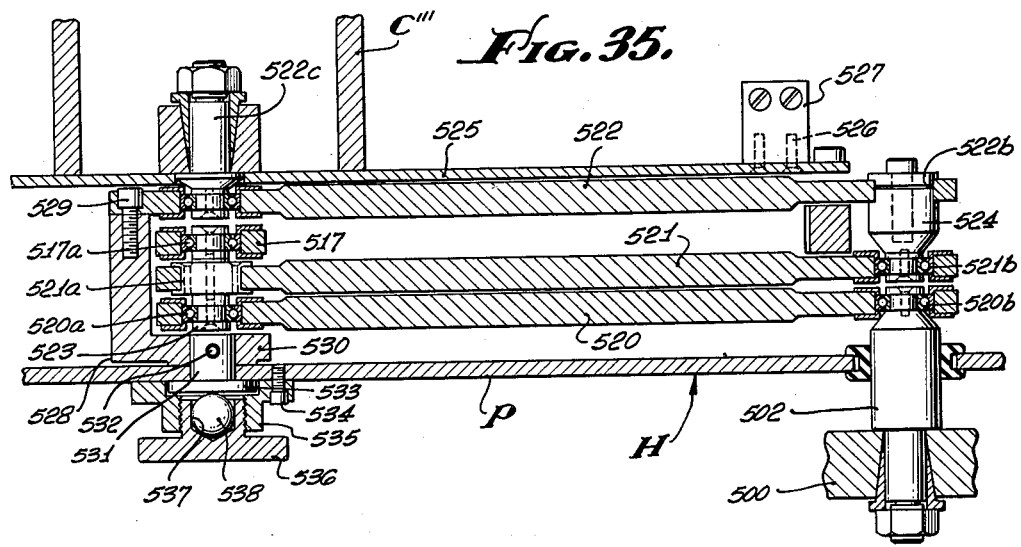
FIG. 35 is a fragmentary view in horizontal section and on an enlarged scale, as taken on the line 35—35 of FIG. 33.

Referring to FIG. 35, this nodding linkage means 503 includes an outer link 520, a middle link 521, and an inner link 522. The outer link 520 and the intermediate link 521 are connected at one end, as at 520a and 521a, to a common pin 523, the vertical connecting rod 517 also being connected to the pin 523 as at 517a. Link 520 is also connected at its other end, as at 520b, to the pin 502 projecting from the worm gear 500. Link 521, at its other end, and one end of inner link 522 are interconnected as by a pin 524, which is connected to the link 521 at 521b and to the link 522 at 522b. Link 522 is pivotally connected at its other end to the central section C''' of the camera body, as by a connecting pin 522c which extends through a vertical plate 525 secured by screws 526 to a suitable number of supporting blocks 527.

While the pin 522c pivotally connects the link 522 to the central camera body section C'', means are provided for clamping the link 522 to the camera body, and in this connection a clamping bracket 528 is connected to the extremity of the link 522, as by a screw 529. Bracket 528 has a section 530 engaged with the inner surface of the front panel P of the housing H, through which extends a headed clamp element 531 connected to the section 530 of bracket 528 as by a pin 532 with the head 533 thereof disposed in engagement with the external surface of the front panel P of the housing H. Connected to the front panel, as by a suitable number of screws 534, is an annular internally threaded member 535, in which is threadedly mounted a locking knob 536 disposed externally of the front panel P of the housing H, as best seen in FIGS. 33 and 35. Internally of the clamping knob 536 is a recess 537 in which a ball 538 seats, the ball engaging the head 533 of the clamping member 531 to force the latter into tight frictional engagement with the front panel of the housing H, thus to secure the bracket 528 to the central body section C'' of the camera.

Accordingly, it will be observed that motion of the worm gear 500 is transmitted to the camera body from pin 502 on the worm gear 500, through link 520 to the pin 523, which is commonly connected with the intermediate link 521 as well as with the vertical connecting rod 517. Motion imparted to the front link 520 is transmitted through the intermediate link 521 to the pin 524, which is connected to the inner link 522, the latter in turn being connected to the camera body as just described. However, the motion of the camera, that is, the motion of the camera about its horizontal pivots 9, transmitted to the camera from the gear 500 through the links 520, 521, and 522, is altered by the vertical reciprocation of the connecting rod 517 in such a manner that angular tracking movement of the camera body is modified by a nodding motion proportional to the angular adjustment of the intermediate bar or link 521 and the inner bar 522. In other words, the gear 500 is constantly driving the camera body through a tracking arc, while the vertical connecting rod 517 is constantly modifying the angular relationship of the tangent bars or links 520, 521, and 522 of the nodding linkage 503 to effect a nodding of the camera body in conjunction with travel of the camera body at a uniform arcuate velocity, so as to alternately add to and subtract from the tracking velocity of the camera the uniform nodding velocity derived from the linkage 503.

Modification of the just described nodding action may be effected as by means of mechanism for adjusting the angular position of the inner link 522 and the intermediate link 521 of the linkage just described, relative to the axis of the pivotal connection of the vertical connecting rod 517 to the intermediate link 521 and the outer link 520.

Figure 36:
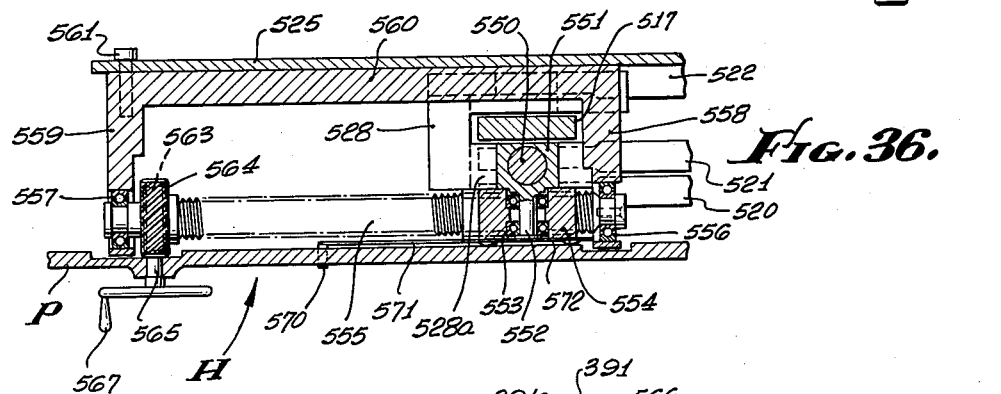
FIG. 36 is a fragmentary view in horizontal section, as taken on the line 36—36 of FIG. 33.

With particular reference to FIGS. 33, 36, and 44, it will be noted that the clamping bracket 528 is provided with an integral section 528a to which is suitably secured an upstanding pin 550. Slidably disposed on the pin 550 is a block 551 having a laterally projecting shaft 552 journalled in bearings 553 within a screw follower 554. The screw follower is threadedly disposed upon a lead screw 555 which is journalled at its opposite ends in bearings 556 and 557 respectively disposed in ends 558 and 559 of a supporting bracket 560 secured to the body wall 525, as by a suitable number of screws 561 (see FIG. 36). Accordingly it will now be apparent that rotation of the screw 555 will effect axial movement therealong of the follower screw 554 and consequent angular movement of the clamping bracket 528. Upon release of the clamping knob 536, the clamping bracket 528 is free to rotate on pin 522c, as a result of the operation of the screw 555. Such adjustment of the clamping bracket 528 will effect, as aforementioned, angular adjustment of the inner link 522 of the linkage 503, by elevating or lowering, depending upon the direction of rotation of the screw 555, the connector pin 524 between links 521 and 522 relative to the common connector pin 523 for the vertical connecting rod 517 and intermediate links 520 and 521 respectively. The function of the linkage 503, in this regard, will be more particularly described in the following description of the operation of the camera.

In order to effect rotation of the adjuster screw 555, it is provided adjacent the supporting bearing 557 with a worm gear 563 engaged by a worm 564 on a shaft 565 projecting through the front panel P of the housing H and having thereon an operating handle 567.

Figure 37:
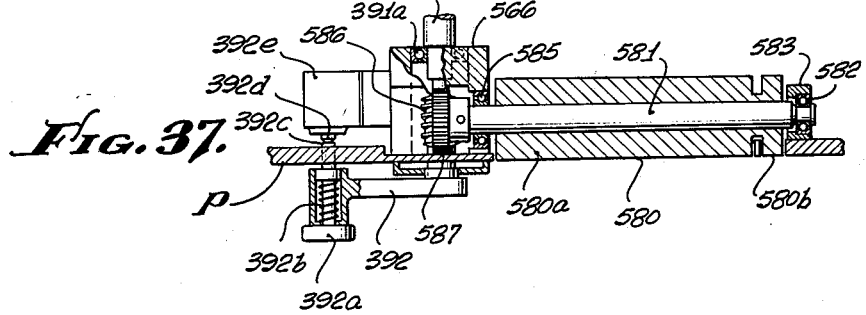
FIG. 37 is a fragmentary view in horizontal section as taken on line 37—37 of FIG. 33.

Carried by the screw follower or nut 554 is a pointer 570 on the end of a supporting arm 571 having a mounting portion 572 suitably secured to the nut or follower 574. This pointer 570, which moves with the follower 554, is adapted to indicate in conjunction with an indicator drum 580 the rate of nodding during exposure of the film in seconds of arc per second of time. The drum 580, as best seen in FIG. 37, is mounted upon a shaft 581 journalled in a bearing 582, at one end, with the bearing 582 supported in a block 583 mounted on the panel P of the housing H as by screws 584. The other end of the shaft 581 is journalled in a bearing 585 supported in a bearing support 566 through which the previously described speed selector shaft 391 projects and in which the latter is journalled in a bearing 391a. Mounted on the speed selector shaft 391 within the bearing support 566 is a worm 586 engaged with a worm gear 587 fixed on the drum shaft 581, so that upon rotation of the speed selecter shaft 391 by the crank handle 392, the drum 580 will also be rotated to bring into view indicia indicating the oscillating rate of the camera body in seconds of arc per seconds of time on the major portion 580a of the drum. On an end section of the drum adjacent bearing 582 and designated 580b, there is exposed indicia representing the exposure time in seconds. The indicia so exposed on the drum 580 relates to the nodding oscillation in seconds of arc per second in relation to the exposure time, and since the manual operation of crank arm 392 is operative to select an exposure period by selectively engaging a selected set of the gears 359 through 363 and 359a through 363a, to determine the exposure time, the drum 580 is preferably marked with five rows of indicia representing, respectively, the seconds of arc per second of nodding oscillation relative to the selected exposure time as determined by operation of the hand crank 392. Adjustment of the hand crank 392 determines the time per cycle of the camera, but the amplitude of the motion of the camera body is not altered. Instead the frequency of nodding is adjusted.

As illustrated in FIG. 33, a cycle period of 2.0 is indicated on the drum, and at such setting the gearing of the shutter and film transport drive mechanism N and the shutter operating mechanism for the gross shutter 465 is such that the exposure time is one-tenth the cycle time, or 0.2 seconds. However, as pointed out just above, the amplitude of the nodding motion remains the same, and only the nodding or oscillating frequency varies, as indicated by the indicia on drum 580.

In conjunction with the mechanism just described, means are preferably provided for rendering the camera inoperative except when a selected pair of the gears 359 through 363 and 359a through 363a are effectively engaged. Accordingly, the hand crank 392 has a spring-loaded switch operator 392a carried thereby (see FIG. 37) and biased inwardly by a spring 392b. One the switch operator is a stem 392c adapted to project through an opening in the front panel P of the housing H into engagement with a contact 392d of a suitable microswitch or the like 392e, which in an obvious manner may be adapted to control the power circuits for the camera. In addition, indicia is preferably provided on the panel P of the housing H to indicate that the transmission is "Engaged," at which time the micro-switch will be closed.

*Uniform Speed Drive*

Referring now to FIGS. 26 through 32, 44, and 45, it will be noted that in order to effect angular motion of the camera body, to provide the tracking motion of the camera, the drive mechanism T includes a worm 600 engaged with the large worm gear 500 and mounted upon a shaft 601 which is journalled in a supporting member 602 carried by a supporting bracket 603, secured to the gimbal ring 8 in a suitable manner. The shaft 601 is preferably journalled in the supporting member 602 by a pair of bearings 604 at the upper end of the shaft 601 and is journalled at its base on a bearing 605 suitably loaded by a nut 606. On the worm shaft 601 is a worm gear 607 which is driven by a driven worm 608 on a shaft 609 connected as by couplings 610 to the output shaft 611 of a variable transmission assembly generally designated 612.

Figure 26:
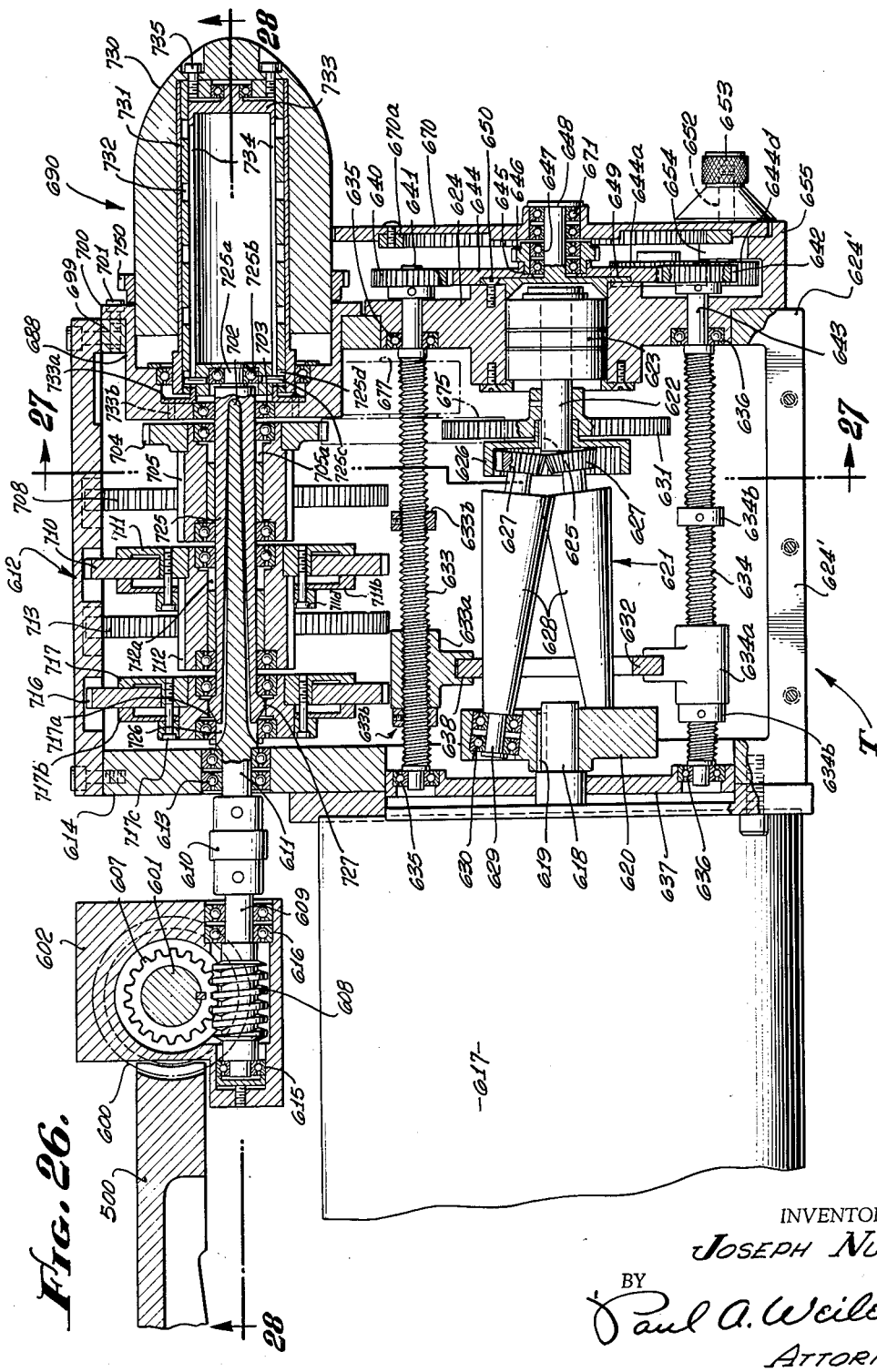
FIG. 26 is an enlarged fragmentary detail view in horizontal section taken substantially on the plane of the line 26—26 of FIG. 1, with the motor shown in elevation, of the uniform speed drive mechanism, including a variable speed power transmission device, for effecting tracking movement of the camera body about a horizontal axis as indicated by the directional arrows in FIG. 1.

As best seen in FIG. 26, the power output shaft 611 is journalled in bearings 613 extending through an end wall 614 of the transmission 612, while the shaft 609 is journalled in bearings 615 and 616 in the supporting member 602 for the worm 600. The transmission assembly 612 has a source of power in a uniform speed motor 617 having a motor shaft 618 keyed as at 619 to a rotor 620 of infinitely epicyclic variable speed mechanism generally designated 621.

In axial alignment with the motor shaft 618 is a shaft 622 of the variable speed mechanism, which shaft is journalled in bearings 623 in a removable end wall 624 of a housing 624' of the transmission mechanism 612. Keyed to the inner extremity of the shaft 622, as at 625, is an internal gear 626 in which respectively engage planetary gears 627, which are respectively provided at the end of tapered friction cones 628, these cones each having at their other ends a reduced shaft portion 629 as best seen in FIG. 26, journalled in bearings 630 in an opening in the rotor 620. Fixed on the shaft 622 is an output drive gear 631, the speed of rotation of which is adapted to be varied as a result of variation of the rotational rate of the respective friction rollers 628. This latter variation is effected by an axially shiftable friction drive ring 632 which is disposed about the roller cones 628 for engagement therewith, for effecting rotation of the cones 628 about their own axes, as a result of rotation of the rotor 620 and the cones 628 as a unit by the motor shaft 618.

In order to vary the output of the mechanism 621, a pair of adjuster screws 633 and 634 are supported in bearings 635 and 636 respectively mounted in an end plate 637 of the change speed mechanism 621 and the end wall 624 of the housing of transmission mechanism 612. Threadedly connected to the respective screws 633 and 634 are screw followers 633a and 634a to which the friction ring 632 is fastened, as at 638. Axial adjustment of the followers 633a and 634a on the screws 633 and 634 will shift the friction ring 632 axially relative to the cones 628 so as to vary the effective perimetrical contact of the cones 628 in the friction ring 632, thus to vary the speed of rotation of the cones 628 as the effective cone diameter varies, with consequent variation of the speed of rotation of output gear 631 relative to the motor input shaft 618. Stop collars 633b and 634b may be suitably mounted upon the adjuster screws and 633 and 634, so as to limit movement of the followers 633a and 634a in opposite directions, thus to vary the minimum and maximum output of the change-speed mechanism 621.

In order to effect rotation of the screws 633 and 634, the screw 633 has a gear 640 fixed to a shaft section 641 of the screw which projects through the wall 624, while the screw 634 has a gear 642 connected thereto as upon a shaft section 643 projecting through the wall 624. Interposed between the gears 640 and 642 and in mesh therewith is a large idler gear 644, which, as best seen in FIG. 30, is carried upon a hub 645 of a small gear 646. The hub 645 of the gear 646 is journalled on bearings 647 on a cylindrical supporting shaft 648, connected to the wall 624 as by a flange 649 and a suitable plurality of screws 650.

Engaged with the gear 644 so as to effect rotation thereof, as is best seen in FIG. 31, is an idler gear 644a journalled upon a bearing support 644b secured as by a screw 644c to the housing wall 624. The idler gear 644a is drivingly engaged by a gear 644d carried on a shaft 652 of a hand dial 653, the shaft 652 extending through an internal ear 654 of an annular extension 655 of the housing wall 624. Accordingly, it will be observed that rotation of the hand dial 653, through the gears 644d, 644a, 644 and thence the gears 641 and 642 on the screws 633 and 634, will effect axial movement of the friction ring 632 relative to the drive cones 628, so as to vary the rate of rotation of the output gear 631 of the change-speed mechanism 621. This adjustment will, through mechanism to be described, vary the rate of angular movement of the large worm gear 500 which effects tracking movement of the camera.

In order that the angular velocity of movement of the camera and the gear 500 may be visible to an operator of the camera, an indicator dial 670 of annular form is journalled on bearings 671 (see FIGS. 26 and 30) so as to be rotatable within the annular extension 655 of the wall 624 of the transmission housing. The dial 670 may be graduated, for example, in seconds of arc per second in 72 divisions so as to indicate relative to a pointer 670a (see FIG. 29) the angular rate of movement of the camera body during tracking of a satellite, for example. In other words, the dial 670 is indicative of the effective output of the change-speed mechanism 621 which, through the gearing to be hereinafter described, effects angular movement of the gear 500.

Means are provided to effect rotation of the indicator dial 670 along with the hand dial 653 to adjust the indicator dial 670 in accordance with variation in the adjustment of the change-speed mechanism 621. In this connection, the aforementioned small gear 646 is in mesh with a large idler gear 646a, which, as best seen in FIG. 30, is journalled on a bearing support 646b, as by bearings 646c, this bearing support being secured to the end wall 624 of the transmission housing, as by a screw 646d extending into a cylindrical mounting portion 646e of the bearing support 646b. Mounted internally of the indicator dial 670 is a large internal ring gear 670a, and engageable with this gear 670a is a dial drive gear 670b formed or otherwise provided on the mounting hub for gear 646a. Accordingly, as the hand dial 653 is rotated, the large internal ring gear 670a will be driven by the gear 646 through gears 646a and 670b, since the idler gear 644 which drives the screw adjuster gears 641 and 642 is rigidly connected or integrally formed with small gear 646.

Referring to the change-speed gear transmission 612 and particularly to FIGS. 26, 27 and 28, the output gear 631 of the variable speed mechanism 621 is in mesh with an idler gear 675 mounted on a shaft 676 which is best seen in FIG. 27, and which is appropriately rotatably supported on an axis parallel to the axis of gear 631 as by an outstanding ear 677 on a split clamp ring 677a extending about and clamped as by screw 677b (see FIG. 27) to a hub 688 of a multiplier selector mechanism generally designated 690, this hub 688 projecting through the end wall 699 of housing 224' and having a flange 700 disposed externally of the housing 624' and secured to the end wall 699 as by screws 701, as best seen in FIG. 26.

The output shaft 611 of the transmission mechanism 612 extends through the hub 688 as at 702, and is journalled in a bearing 703. Rotatably disposed about the shaft 611 adjacent the hub 688 is a gear 704 which is in mesh with the idler gear 675 previously described, which is in mesh with the output gear 631 of the variable speed mechanism 621. Integrally formed with or suitably connected to the gear 704 is an elongated smaller gear 705 extending longitudinally of the shaft 611, with suitable bearing means interposed between the gears 704 and 705 and the shaft 611. Disposed in parallel relation beneath the shaft 611 is an idler shaft 706 mounted in the opposing walls 614 and 699 of the transmission assembly and having rotatably mounted thereon, as by bearings 707, a large idler gear 708 to which is fixedly connected a small idler gear 709, which in turn is in mesh with a gear 710 rotatably mounted about the transmission shaft 611 as in a gear carrier 711. To prevent damage, gear 710 is frictionally connected to carrier 711 as by means of a spring plate 711b secured to the hub of carrier 711 by screws 711d or the like. The carrier 711 is fixedly connected to an elongated gear 712 extending lengthwise of the transmission shaft 611, this latter gear being in mesh with another large idler gear 713 journalled on bearings 714 on the idler shaft 706. The latter idler gear 713 also is integrally formed or rigidly connected with a small idler gear 715 which is in mesh with a large gear 716 carried by a gear carrier 717, which is rotatably mounted about the shaft 611. Gear 716 is frictionally connected to carrier 717 by a spring clutch plate 717b secured to the hub of the carrier 717 as by screw 717c or the like.

Selector means under the control of the mechanism 690 are provided for selectively drivingly connecting the gears 716, 710 and 704 to the transmission shaft 611, as may be desired. In the illustrative embodiment, a novel selector mechanism 690 is shown which generally corresponds to that hereinbefore described in connection with the film transport and shutter drive transmission mechanism N. The selector mechanism 690 includes a selector fork 725 axially shiftably mounted in opposed radial slots 726 extending along the transmission shaft 611. The gear carrier 717 is notched at diametrical points at 717a to receive radial projections or protuberances 727 on the free ends of the arms of the selector fork 725 whereby, as shown in FIG. 26, the gear carrier 717 will be operatively connected to the transmission shaft 611. Similarly, gear 712 is notched as at 712a and gear 705 is notched as at 705a to be engaged by the radial projections 727 on the arms of the selector fork 725.

Means are provided for effecting axial movement of the selector fork 725 relative to the shaft 611, and in the illustrative embodiment this means includes a rotatable operating head 730 within which is disposed a cylindrical member 731 having a helical groove 732 therein. Disposed within the member 731 is a fixed circular body 733 having diametrically opposed, longitudinally extended slots 734 therein. The member 733 is secured internally of the hub member 688 previously referred to as by a flange 733a and suitable screws 733b. The shifter fork 725 is provided with a reduced end portion 725a to which is secured a thrust bearing unit 725b from which projects a radially extended pair of diametrically opposed pins 725c having rollers 725d thereon riding in the helical grooves 732 of the member 731. The latter member is connected to the operating knob 730, previously referred to, as by means of screws 735, whereby, upon rotation of the knob 730, the member 731 will likewise be rotated, and the non-rotating thrust bearing assembly on the end 725a of selector fork 725 will be shifted in an axial direction by the helical groove 732, so as to selectively engage the projections 727 of the selector fork 725, either in the recesses 717a, the recesses 712a, or the recesses 705a.

Accordingly, the drive from the output gear 631 of the change-speed mechanism 621 to the transmission shaft 611 will be selectively from gear 716, from gear 710, or from gear 704. As shown in FIGS. 26 and 28, power is transmitted from the output gear 631 aforesaid to the idler gear 675 which is in mesh with the gear 704 on transmission shaft 611. Accordingly, gear 705 will drive idler gear 708 and gear 709 which, for practical purposes, is integral with gear 708. Gear 709 will drive gear 710, which in turn will drive gear 712, which is in mesh with idler gear 713, whereby the output of the transmission is effected by a driving connection between idler gear 715 and the gear 716 which is connected to the transmission shaft 611 by the selector fork 725. This illustrated drive provides a maximum drive ratio. However, if the selector fork 725 be operatively engaged in the recesses 712a of gear 712, gears 712, 713, 715 and 716 will be removed from the gear train, thus effecting a reduction in the transmission system. Further, as an alternative, if the selector fork 725 be operatively engaged in the recesses 705a of gear 705, then a direct drive will be in effect from gear 704 through the body of gear 705 to the transmission shaft 611.

In operation, for reasons which will hereinafter more particularly appear, the change-speed gear mechanism 612, idler gear 675, gear 704, worm 608 on transmission shaft 611, worm gear 607, worm 600, and the large gear 500 are so constructed that at its maximum output the change-speed mechanism 621 will effect rotation of the large gear 500 at the rate of 7200 seconds of arc per second of time. The reduction through gear 710 and its associated gearing is preferably at a ratio of 10:1 so that at maximum output of the change-speed mechanism 621 the gear 500 will rotate at the rate of 720 seconds of arc per second of time, while drive through the gear 716 will be at the rate of about 72 seconds of arc per second of time, or a further reduction of 10:1. Thus, it will be observed that direct drive through gear 704 will effect variation of the angular velocity of gear 500 directly as the change-speed mechanism 621 is varied from a minimum (zero) to 7200 seconds of arc per second, while the angular velocity of gear 500 is stepped down by a factor of 10 when the selector fork 725 is engaged with the gear 712, and a further factor of 10 is employed to provide rotation of the gear 500 at a rate of 72 seconds of arc per second, when the selector fork 725 is engaged with the gear 716.

In this connection, means are employed for indicating the extent of multiplication of the output of the variable speed mechanism 621 which is employed by the change-speed gearing 612 in driving the gear 500. This means is best illustrated in FIGS. 28, 29 and 32. For this purpose, the operating knob 730 of the selector mechanism 690 has disposed thereabout an external ring gear 750 which engages a gear 751 journalled as by bearings 725 on a bearing support 753. The support 753 is secured, as by bolt 754, to a wall 755 of a housing 755a which is suitably secured to the removable end wall 624 of the transmission housing. The gear 751 includes an enlarged hub 756 having an end face 757 adapted to be viewed through a sight opening 758 in a closure plate 759 disposed in overlying relation to the gear 751, and secured in place as by cap screws 760 to the housing 755a. On the face 757 of the gear 751 is appropriate indicia. In the illustrative embodiment, the numeral 1 is shown as appearing on the face 757 within the sight opening 758, while the numerals 10 and 100 are respectively shown in dotted lines as being applied to the end plate 757 of the gear 751, but lying behind the closure plate 759. The relationship between gear 750 and 751 is preferably such that, per unit of revolution of the knob 670 required to effect a shift of the transmission selector fork 725 from one position to the next operative position, rotation of the gear 751 will be produced to the point where one of the numerals 1, 10, or 100 will be visible through the sight opening.

In practice, the numeral 1, as viewed through the sight opening 758, will be indicative of the fact that the transmission selector fork 725 is engaged in the notches 717a of gear hub 717, and therefore the drive through the change-speed gear transmission 612, whereby the angular velocity of the gear 500 will be at the rate of from 0 to 72 seconds of arc per second. The numeral 10 appearing on the face 757 of gear 751 at the sight opening 758 will be indicative of the fact that the angular velocity of the gear 500 has been multiplied by a factor of 10, by reason of adjustment of the change-speed gear mechanism 612, such that the selector fork 725 is engaged in the recesses 712a of the gear 712. Finally, appearance of the numeral 100 on the face of gear 751 at the sight opening 758 will be indicative of the fact that the change-speed gear mechanism 612 has been conditioned with the selector fork 725 engaged in the recesses 705a of gear 705, and therefore the angular velocity of the gear 500 has been multiplied by a factor of 100 as compared with the direct drive thereof.

In order to assure that the tracking camera will not be operated with the selector fork 725 only partially shifted from one operative position to another, means are provided for rendering the camera inoperative under such circumstances. As shown in FIG. 29, the operating knob 730 of the control mechanism 690 is provided with a peripheral indentation as at 765. Micro-switch means, generally designated 766, is disposed beneath the operating knob 730 and includes a follower roller 777 engaged with the periphery of the knob 730 and carried by a lever 778 pivotally mounted to the transmission housing as at 779, and provided with an adjuster screw 780 at its free end. The micro-switch 766 is adapted to render the camera inoperative except when the roller 777 is located in the recess 765 of the operating knob 730. Accordingly, it is desirable that a complete revolution of the knob 730 be required to effect a ratio shift of the transmission mechanism 612, as may be accomplished in the forming of the helical groove 732 of the cylindrical selector member 731.

From the foregoing, it will now be apparent that through the tracking drive mechanism T just described, which drives the large worm gear 500, the camera body is pivoted in a tracking arc at a uniform rate of speed, and superimposed upon this tracking motion is the uniform nodding or oscillating motion effected by the nodding linkage 503, which is driven through the variable speed mechanism N in timed relation to the feeding of film and the operation of the camera shutter.

*Time Presentation Mechanism*

Figure 41:
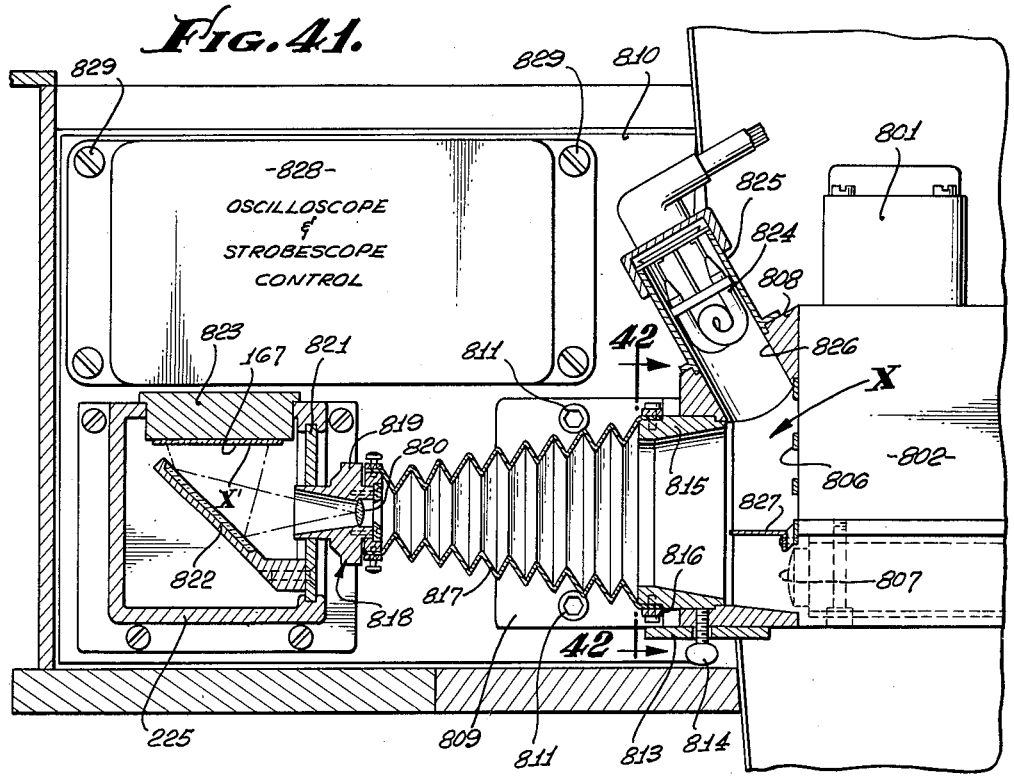
FIG. 41 is a view in vertical section as taken on line 41—41 of FIG. 19c, particularly showing the time presentation mechanism hereof for exposing on the film time data related to the operation of the shutter mechanism and nodding mechanism hereof.

Reference will now be made to FIGS. 19c, 23, and 41 particularly.

In order to accurately plot the position of an object being photographed, as, for example, an orbiting satellite, it is also necessary that the time at which the object is photographed be precisely known, say to an accuracy on the order of within one millisecond, which for a body orbiting at an elevation of 1200 miles from the earth would represent accuracy to within 25 feet. Since it is desirable to fix the time to a millisecond, time presentation means, hereinabove generally designated X, are provided, including a constant speed drive motor 801 for a clock 802, having gearing therein of a well known type (not shown) for driving dials 803, 804, and 805 which are exposed in openings through a side wall 806 of the clock, as clearly seen in FIG. 42. The clock dial 803 is adapted to indicate time in minutes, whereas the dial 804 is adapted to indicate time in seconds, and the dial 805 is adapted to indicate time in hundredths of seconds. Beneath the clock 802 is a circular sweep oscilloscope 807 having peripheral demarcations representing thousandths of a second, and preferably capable of indicating time to one ten-thousandth of a second by the firing of a pip during its sweep of one centi-second, as indicated at 807a.

Figure 42:
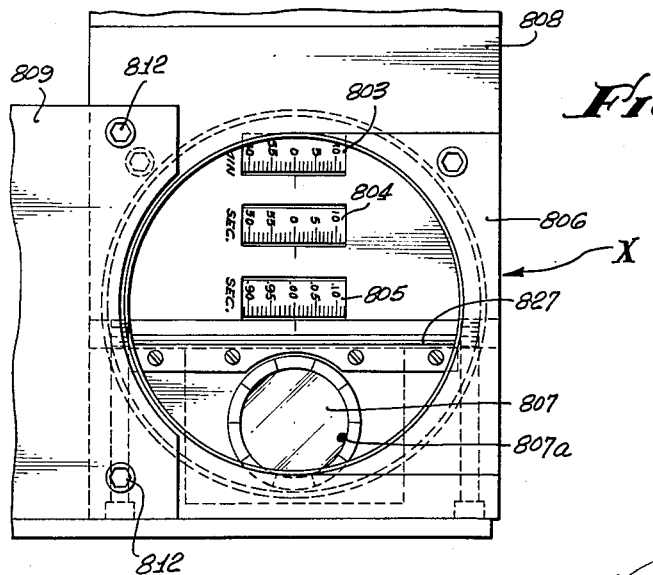
FIG. 42 is an enlarged view in section as taken on the line 42—42 of FIG. 41.

Extending about the face 806 of the clock 802 is an axially tapered hood 808, the assembly comprising the hood 808, the clock 806, the oscilloscope 807, and the drive motor 801 is suitably secured to the central body section C''' of the camera body as by means of a supporting bracket 809 secured to an upstanding supporting plate 810, which is rigidly connected to the camera body. Cap screws 811 connect the bracket 809 to the plate 810, and, as best seen in FIG. 42, the hood 808 is connected to the bracket 809 as by means of a suitable number of screws 812 or the like. The supporting structure for the time presentation mechanism also includes a horizontal member 813 disposed beneath the hood 808, through which a thumb screw or the like 814 extends for engagement with a bellows supporting ring 815. Secured to the outer extremity of the ring 815, as by a clamping ring 816, is a tapered bellows 817, the bellows 817 being connected at its smaller extremity to a lens assembly 818. The lens assembly includes a body 819 having mounted therein a lens 820. The lens assembly 818 is supported in a plate 821 forming a portion of the dark-box 225, previously referred to, at the west end of the machine, and as particularly viewed in FIG. 19c. Carried by the plate 821 is an angularly disposed reflector 822 adapted to reflect an image representing the face of the clock 802 and the oscilloscope upon the film strip 167, extending beneath a block 823 which projects through the upper wall of the dark-box 225 to provide a fixed time presentation focal surface for the film strip 167. With particular reference to FIGS. 19c and 41, it will be noted that the time presentation mechanism X is adapted to expose the time presentation to the film strip 167 in the zone of the film strip designated X', which is within the throat of the dark-box 225.

In order to illuminate the face 806 of the clock 802, a stroboscope light 824 is provided, this light 824 being mounted in a shell 825 carried by the hood 808 in axial alignment with an angularly disposed bore 826 through the hood. To prevent obscuring the oscilloscope 807 upon illumination of the stroboscope light 824, a suitable shield 827 is mounted above the oscilloscope 807 to shade the latter.

Operating circuitry for the oscilloscope and stroboscope may be of any well known type and are preferably mounted within a housing 828 secured by screws 829 to plate 810 referred to above. Means are also provided for effecting illumination of the stroboscope light 824 at a predetermined instant with relation to the feeding of film through the film path and to the operation of the shutter mechanism. Accordingly, as shown in FIG. 23, the film transport cam shaft 308 at a suitable point thereon has mounted thereon a multiple-lobe cam 824' having a double-lobe section 824a, a single-lobe section 824b, and a section 824c which is provided with no lobes. Cooperating with the cam 824' is a micro-switch 824d, which is adapted to be closed by the respective lobes of the multiple-lobe cam upon engagement thereby. The cam 824' is so constructed and arranged on the shaft 308 that as it moves axially as a result of axial adjustment of the cam shaft 308 by means of the crank 326 previously described, the two-lobe section 824a of the cam 824' will be disposed for engagement with the micro-switch 824d when the two-lobe section of the film transport cam 305 is engageable with the cam roller 292 of the slide block assembly 284 and the double-lobe section of the cam 305' is engageable with the roller of the slide block assembly 284', so as to effect advance of the film twice per revolution of the cam shaft 308. Thus it will be observed that the micro-switch 824' will be closed for energization of the stroboscope lamp 824 each advance of the film strip and in timed relation to the operation of the shutter mechanism. A further stroboscope control micro-switch 830 is adapted for engagement with the high speed shaft 491, as particularly viewed in FIG. 23, the shaft 491 having suitable means, such as a flat 490a thereon engageable with the micro-switch contact 830, to effect operation thereof to close the circuit to the stroboscope lamp 824. Preferably, the micro-switch 824d and the micro-switch 830 are connected in series so that the micro-switch 830 engaged with the high speed shaft 491 will be closed once per revolution of the shaft 491, which is operating at a much greater rate of speed than is the cam shaft 308, which controls the operation of the micro-switch 824d. The micro-switch 824d therefore is operative to enable illumination of the stroboscope lamp 824 when the switch 824d is closed and when the micro-switch 830 is also closed.

Illumination of the clock dial 806, as well as operation of the oscilloscope, is preferably under control of the micro-switch 824d, and therefore, since the micro-switch 824d is on the axially adjustable cam shaft 308, energization of the oscilloscope and the stroboscope will only occur when the cam shaft 308 is in such a position as to effect the feeding of the film through the action cams 305 and 305' and actuation of the micro-switch 824d through the cam 824.

*Operation*

In the use of the satellite tracking camera specifically described in the foregoing, the supporting fork 5 may be adjusted about its vertical axis so that the pointer 8g is directed in a desired northerly direction, as indicated on the preset azimuth ring 1f. In addition, the gimbal 8 may be angularly adjusted about a horizontal axis within the bearings 6 to a desired camera angle, as indicated by the quadrant 11 on the trunnion 7 which is at the left hand side of FIG. 1. Inasmuch as an orbiting satellite will be travelling generally in a westerly to easterly direction while the star background will be travelling relatively east to west, the camera body is initially set on its supporting trunnions 9 so as to be leaning in a westerly direction, that is, to the right as seen in FIG. 1 to the limit of the directional arrow, thus to best intercept a satellite as it comes into the range of the camera.

As previously mentioned, in order to positively fix the position of the orbiting satellite at a given instant of time relative to the known positions of the stars in the star background, it is desirable to alternately or simultaneously photograph the satellite and the stars. When intensifying the photographic trail of the satellite, it is desirable that the camera be tracking at substantially the same angular velocity as that of the satellite so that accordingly the star background will appear as a series of attenuated streaks, whereas in intensifying the photographic trail of the stars it is desirable that the camera be substantially stationary so that the satellite trail will be attenuated.

In order to photograph strong images of both the satellite and the stars the uniform speed or tracking drive mechanism T constitutes means for driving the camera at a selected angular velocity within the minimum to maximum capacity of the transmission mechanism, while the variable speed film transport and shutter drive mechanism N and the nodding mechanism driven thereby, as previously described, provides means for adding to or subtracting from the uniform angular velocity of the camera so that the camera will be traversing at the desired rate of speed to intensify both the star and the satellite images.

For example, assuming that a satellite is travelling at an angular velocity of 3600 seconds of arc per second, then the transmission mechanism T will be so adjusted as to effect angular movement of the worm gear 500, which interconnects the transmission mechanism T to the camera body, at approximately one-half of the angular velocity of the orbiting satellite. Thus the camera body will track at a uniform angular velocity of 1800 seconds of arc per second. During each cycle of the camera, as will presently appear, the nodding mechanism will add to the camera angular tracking rate of 1800 seconds of arc per second an angular velocity of an additional 1800 seconds of arc per second, in order that the camera body will be moving at an angular velocity substantially approximating that of the orbiting satellite, namely, 3600 seconds of arc per second during the satellite exposure phase of the cycle. When the star background is to be photographed during the star phase of this cycle, then the nodding mechanism will subtract from the 1800 seconds of arc per second uniform angular velocity imparted to the camera from the uniform drive mechanism T, 1800 seconds of arc per second, so that the camera is, during this phase of the cycle, substantially fixed upon the star background.

During each cycle of the camera, the gross shutter mechanism 465 will open twice, and during each opening of the gross shutter mechanism the high speed shutter 455 will make a number of revolutions, causing interruptions in the trail images of the stars during the satellite phase of the cycle and in the trail image of the satellite during the star phase of the cycle. The film strip 167 is preferably caused to shift a selected number of frames per cycle, so that a single frame may be exposed during both phases of a cycle, or, alternatively, the film may be advanced two frames per cycle so as to be exposed once per phase.

In the performance of the foregoing functions of the tracking camera, the uniform angular velocity of the camera may be selected by rotating the control knob 653, which will vary the variable speed mechanism 621 such that the transmission output shaft 611 will effect drive of the large worm gear 500 at a selected angular velocity ranging from zero to, for example, 72 seconds of arc per second when the control knob is so positioned as to engage the lugs 727 of the selector fork 725 with the notches 717a of carrier 717 and expose the ratio number 1 in window 758. In the illustrative example stated in the foregoing, the satellite was assumed to be travelling at an angular velocity of 3600 seconds of arc per second, and accordingly the transmission mechanism 621 may be adjusted to effect an angular velocity of the gear 500 of 18 seconds of arc per second, which is well within the capacity of the mechanism 621.

Next, the control knob 730 of the multiplier selector control mechanism 690 may be rotated so as to shift the selector fork 725 of the transmisison 612, to effect a multiplication of the net angular velocity transmitted from mechanism 621 to the gear 500 by a factor of 1, by a factor of 10, or by a factor of 100. Since it is desired that the gear 500 be travelling at an angular velocity of 1800 seconds of arc per second, then in accordance with the exemplary circumstances, the control knob 730 will be rotated so as to effect engagement of the projections 727 of the selector fork 725 with the hub of the gear 716, as shown in FIG. 26, whereby, as previously described, a multiplication factor of 100 will be effective, as indicated on the multiplier indicator 751 viewable through the sight opening 758, shown in FIG. 29.

In order to produce effective nodding of the camea so as to alternately add to and subtract from the uniform 1800 seconds of arc per second angular velocity of the camera, 1800 seconds of arc per second of angular nodding motion, the clamping knob 526 (see FIGS. 33 and 35) will be loosened so as to free the clamping bracket 728 for angular adjustment about the pin 522c. Such angular adjustment is effected by means of the adjuster crank 567 (see FIGS. 33 and 36), so as to move the follower 554 on adjuster screw 555 in a direction rocking the clamping bracket 528 about the pin 522c through the pin 550 connected to the bracket 528. This in turn varies the angular relationship of connector pin 524 between the rear link 522 of the nodding linkage 503 and the common connector pin 523 which interconnects the vertical connecting rod 517 to the outer link 520 and the inner link 521, thus to effect a related change in the action of the linkage 503, as will appear hereinafter.

Such adjustment of the nodding linkage 503 is continued until the pointer 570 carried by the follower block 554 on screw 555 reaches the scale marking on the drum 580 representing an oscillating rate of 1800 seconds of arc per second; whereupon the clamping knob 536 will be tightened to effect connection of the nodding linkage to the camera body. As previously described, the vertical connecting rod 517 of the nodding linkage 503 is driven by the slow speed shaft 260 through the gearing 261 through 264, which in turn drives shaft 334 on which gear 335 is mounted (see FIGS. 34 and 45). Gear 335 effects rotation of the rotary member 504 of the compound eccentric mechanism, more particularly shown in detail in FIGS. 38, 39, and 40, through the gear 336, which is meshed with the gear 335. Vertical motion of the connecting rod 517, effected by the throw of the crank 515 and the eccentric mounting of the gear 512 by which the crank 515 is carried, is converted to substantially a horizontal motion and consequent alternate nodding of the camera body, as a function of variation in the relative angularity between the link 520 on the one hand, and link 521 on the other hand.

Since the gear 500 is connected to the camera body through the linkage 503, it will now be apparent that upon the upstroke of the connecting rod 517 and during the downstroke thereof the effective length of the linkage 503 will be alternately lengthened and shortened so as to negate the angular movement of the gear 500 as the linkage is shortened, so that the camera body will remain substantially fixed; while, as the linkage is lengthened, the angular velocity of the camera will be increased. Thus, the linkage 503 alternately acts to subtract from the tracking velocity of the camera and to add to that tracking velocity the angular nodding velocity as represented on the drum 580 by the indicia, and as modified by the rate selector control operating crank 567. Since in the illustrative example the pointer 570 has been adjusted so as to indicate an oscillating rate of 1800 seconds of arc per second of time, it will now be apparent that the function of the nodding linkage is to add the oscillating rate indicated on the drum 580 to the tracking velocity of the camera body, and to subtract the same oscillating rate as indicated on the drum 580 from the tracking velocity of the camera alternately.

It should be understood in connection with the foregoing that the linkage 503 determines the amplitude of the nodding motion of the camera, and that the velocity of the nodding motion accordingly varies with the time per cycle. The unit of time indicated on the cycle time indicating section 580b of the drum 580, in accordance with the illustrative example being described, is given as 2.0 seconds. Therefore, the adjustment to the nodding linkage, as referred to above, is calculated to vary the amplitude of the nodding motion so as to obtain the desired angular nodding velocity in the cycle time set by the variable transmission mechanism N, since the velocity varies as a function of variation in amplitude.

As pointed out in the specific description hereinabove, the slow speed shaft 260, which drives the nodding mechanism, is powered by the power transmission mechanism N, which is more particularly illustrated in FIGS. 19a and 19b, as well as in FIGS. 43 and 45. The gearing 359 through 363 and 359a through 363a under the control of the selector fork 367 is adapted to drive the slow speed shaft 260 at any of five selected speeds which are preferably stepped up in ratios of 2 to 1. The cycle rate of the present invention is preferably, as shown, directly related to the speed of rotation of the slow speed shaft 260, such that exemplary cycle periods of 2, 4, 8, 16 or 32 seconds may be availed of, by reason of the five selective 2:1 step-up ratios of mechanism N.

The gearing of the transmission mechanism N is such that a selected cycle period may be acquired by rotation of the crank handle 392a at the panel P as shown in FIG. 33. Rotation of the handle 392 also will effect rotation of the indicator drum 580 through the worm and worm gear 562 and 563 respectively, so as to expose to view the section 580b of the drum 580, indicating the cycle time in seconds. The oscillating rate scale indications on the drum section 580a are repeated in circumferentially spaced rows, but with nodding velocity scale marking arranged in different positions longitudinally, since adjustment of the linkage 503 for a nodding oscillation of 1800 seconds of arc per second in a 2-second cycle requires double the linkage adjustment required for a setting of 1800 seconds of arc per second in a 4-second cycle.

In order that the feeding of the film strip 167 will be effected in timed relation to the nodding motion, the film feed mechanism is also driven by the variable transmission mechanism N through the slow speed shaft 260 which drives the nodding mechanism. As best seen in FIGS. 23, 24, and 25, as well as in FIGS. 43 and 45, the gear 264, which is in the power train to the nodding mechanism, effects reciprocation of the scotch yoke 270, which in turn, through the film feed and take-up racks 272 and 272' respectively, drives the film feed and take-up shafts 182 and 236, respectively, under the control of the adjustable film feed and take-up cams 305 and 305' on the cam shaft 308. The scotch yoke 270 is continuously reciprocating during operation of the camera, but the advance of the film strip can only occur when the slide assemblies 284 and 284' are depressed by the cams 305 and 305'. When the slide assemblies 284 and 284' are depressed, the racks 272 and 272' effect clockwise rotation of the shafts 312 and 319, as viewed in FIGS. 43 and 45, which in turn drive the film feed and take-up rolls 181 and 235 in a clockwise direction to feed the film in the direction of the arrows in FIGS. 43 and 45.

As the slide assemblies 284 and 284' are depressed, rack segments 293 and 293' are disengaged from the gears 310 and 311 with which the racks 272 and 272' are engaged to effect feeding of the film. However, as the cams 305 and 305' permit elevation of the slide assemblies 284 and 284', slight opposite rotation is imparted to the shafts 312 and 319 by the teeth of the rack segments 293 and 293' as they reengage gears 310 and 311, so as to effect opposite rotation of the film feed roll 181 and the film take-up roll 235, thus to tension the film strip 167 spanning the space therebetween. The film strip 167 is accordingly tensioned against the spherical back-up plate 206 of the film bridge so as to enhance the photographic accuracy of the camera. The clutches 314 and 314a which respectively interconnect shafts 312 and 182 and shafts 319 and 236, will enable sufficient slippage so that the film tensioning motion of the rolls 181 and 235 does not rupture the film strip. Accordingly, the clutches 314 and 320 provide means for equally distributing the tension of the film strip across the back-up plate 206 and for limiting the tension which is applied to the film strip.

Referring now more particularly to FIGS. 19a, 19b, 19c, and 19d, as well as to FIGS. 43 and 45, it will be noted, upon reference to FIG. 19b in particular, that the gross or slow speed shutter drive shaft 426 and the high speed shutter or chopper drive shaft 430 are driven by the transmission mechanism N which drives the nodding mechanism as well as effects advance of the film strip. The gross shutter shaft 426 is driven by the gear 418 which is mounted directly on the slow speed shaft 260, while the chopper or high speed shutter mechanism drive shaft 430 is driven by the gear 401 which is, for practical purposes, integral with the gear 400 which drives the gross shutter drive shaft. Accordingly, the shutter drive shafts 426 and 430 are driven in timed relation to the nodding motion of the camera and the film transport and feed mechanism, as previously described.

Rotation of the gross shutter drive shaft 426, through the cam 477 thereon, effects actuation of the toggle linkage of the gross shutter mechanism 465, and the gear mechanism effecting rotation of the shaft 426 is preferably so constructed that the gross shutter is opened twice per cycle of the machine, that is, once during the period of time that the nodding mechanism is adding to the uniform angular velocity of the camera the angular nodding velocity, and once as the nodding mechanism is subtracting from the uniform angular velocity of the camera the nodding angular velocity.

The high speed shutter or chopper mechanism 455 is rotated at a comparatively high rate of speed by the shaft 430, within the hollow shaft 426 by the gear 451, and the gear drive to the high speed shutter 455 is preferably such that the latter rotates approximately 5 revolutions per cycle of the slow speed shutter shaft 426, the respective shutter drives being preferably so constructed that the high speed shutter 455 rotates about two full revolutions during each exposure period during which the slow speed shutter 465 is open.

The foregoing timed relationships of the uniform tracking rate, the oscillating nodding rate, the film transport advances, and shutter actuation are diagrammatically illustrated in FIG. 46, where the curve 900 represents the angular velocity of the camera, the curve 1000 represents film transport motion during a two-advance cycle, curve 1100 represents the film transport motion during a single-advance cycle, and the compound curve 1200 represents the gross shutter motion during a given cycle of the machine, which may range from on the order of 2 through 32 seconds of time in incremental ratios of 2 to 1; that is, the cycles may be for periods of 2, 4, 8, 16 or 32 seconds, as indicated in FIG. 46.

Referring to the curve 900, it will be noted that this curve is plotted relative to the line 900a representing zero angular velocity of the camera. The arrow 900b represents the desired satellite rate in an easterly direction, i.e., the desired tracking rate when the uniform angular velocity of the camera has been augmented by the addition thereto of nodding velocity by the nodding mechanism. Line 900c represents the selected uniform rate setting, as indicated by the arrow 900d between lines 900a and 900c. It will be noted that in the diagram, the uniform rate setting is slightly less than half of the desired satellite rate, while the oscillating or nodding rate setting, as indicated by the arrow 900e, is shown as being slightly greater than half of the desired satellite rate.

Each cycle includes a satellite phase, as represented by the arrow 1200a, and a star phase, as represented by the arrow 1200b, and it will be observed that the desired satellite rate and the oscillating rate are plotted substantially at the middle of the curve representing the satellite phase of the cycle, at which point the curve is substantially flat. The uniform angular velocity represented by the flat section of the curve 900 is accomplished by the action of the compound eccentric mechanism which is more particularly shown in FIGS. 38, 39, and 40. This action on the nodding linkage 503, by reason of the compound eccentricity of the crank 515 and the mounting of the drive gear 512 in the supporting rotary member 504 is such that on each revolution of the rotary member 504, with consequent reciprocation of the vertical connecting rod 517 of the nodding linkage 503, the vertical motion of the connecting rod 517 will be at a uniform velocity during its upstroke and during its downstroke. The uniform velocity of the connecting rod 517 during the star phase of the cycle represented in FIG. 46 is indicated by the flat section of the curve 900. By reason of the sinuous nature of the curve 900, it will be noted that during the satellite phase of the cycle the angular velocity of the camera body will be equal to the uniform rate setting plus the oscillating rate setting, and thus equal to the desired satellite tracking rate in an easterly direction; whereas, during the star phase of the cycle, the angular velocity of the camera is slightly less than the zero angular velocity represented by the line 900a, the difference representing the relative angular velocity of the star background in a westerly direction, so that there will in effect be a negative angular velocity during the star phase equalling the rate of angular velocity per second of the star background in a westerly direction.

Referring to the curve 1000 in FIG. 46 and the curve 1100, one or the other of these curves will represent the advances of the film during a given cycle of the camera, depending upon the position of axial adjustment of the cam shaft 308, which may be varied by the crank handle 325 projecting through the panel P of the housing H, as seen in FIG. 33. As previously described, the panel P is provided with indicia indicating the number of advances of the film transport mechanism per cycle; that is, 0 advances, 1 advance, or 2 advances per cycle. The curve 1000 in FIG. 46 represents the two advances per cycle film transport motion, whereas the curve 1100 represents the one advance per cycle film transport motion.

Moreover, it will be observed that the feeding of the film is so timed in relation to the satellite phase and the star phase of the cycle in the two advance per cycle setting that the film is transported during the non-uniform angular velocity periods of the camera body, as shown by the curve 900, while the film remains stationary during that period of time that the curve 900 is flat, the angular velocity of the camera at this period being uniform during the respective satellite and star phases of the cycle. It is during this period that the film is tensioned by the film tensioning means previously described.

The curve 1100 is representative of film transport motion when the crank handle 325 is positioned in the one advance per cycle position, as shown in the panel P of the housing H, and it will be observed that the film remains stationary through both uniform velocity periods of the satellite and star phases of the cycle, as well as during the period between the uniform velocity periods.

The period of time during which the film strip is exposed is represented by the arrows 1300 in the satellite phase as well as in the star phase diagram of FIG. 46. This exposure time preferably is for a period equalling 0.10 cycle, and, as seen upon reference to the compound curve 1200, the gross shutter 465 is open, as represented at 1200c, during the exposure time of each cycle, while the gross shutter is closed during the remainder of the cycle. The exposure period and the shutter opening are timed with relation to the uniform velocity periods of the camera body, as shown in the curve 900, during both the satellite phase and the star phase of the cycle. In addition, during the time that the gross or slow speed shutter is open, the fast shutter is rotating so as to cause fast shutter breaks represented by the dashes across the compound curve representing the open gross shutter.

The effect of the foregoing timed relationships in respect to the photograph being produced will be best understood with reference to FIG. 4, wherein three separate film strips are shown at 1400, 1500, and 1600. On the strip designated 1400, the black dot 1400a represents a satellite photographed during the period of time in the cycle when the uniform nodding rate has been added to the uniform rate of angular velocity of the camera, as represented by the arrows at opposite sides of the vertical center line bisecting FIG. 4. The dashes on the film strip 1400, as shown at 1400b, represent a star streak which has been interrupted as at 1400c by passage of the high speed shutter blades across the photo-visual field, as represented by the fast shutter break dashes in FIG. 46. Accordingly, the film strip 1400 represents a photograph taken during a satellite phase of a camera cycle. The film strip 1500 has a satellite streak 1500a and a star spot 1500b, the satellite streak being interrupted as at 1500c, the film strip 1500 accordingly representing the results of a star phase of a cycle.

The film strips 1400 and 1500 constitute the results of an exposure of individual frames of the film strip during the two advance per cycle film transport motion represented by the curve 1000 in FIG. 46.

The film strip 1600, shown in FIG. 4, is representative of a single frame of film, for example, which has been exposed during both the star phase and the satellite phase of a camera cycle, as would occur as a result of film transport motion as represented by the curve 1100 of FIG. 46. In either event, the positions of stars on the photograph being known, then the relative position of the satellite may be plotted against the known position of the stars by conventional astronomical surveying methods.

As has been previously described, the center break in the star streaks during the star phase of the camera cycle and of the satellite streaks during a satellite phase of the cycle is extremely accurately related to time by the time presentation means, whereby, in accordance with the objectives of the invention, the position of a satellite may be accurately determined to a millisecond, which would be 3.6 seconds of arc in the example described herein.

In order to accomplish the foregoing time presentation, the stroboscope lamp 824 and the oscilloscope 807 are fired under the control of the stroboscope control microswitches 824d and 830, as seen in FIG. 23, so that the stroboscope lamp is illuminated substantially at the middle of the 0.10 cycle exposure period, as shown in FIG. 46, by reason of the timed relation of the gearing driving the shafts by which the stroboscope controlling microswitches 824d and 830 are operated. Thus the time presentation is exposed to the film upon firing of the stroboscope lamp precisely at the instant of the center sweep of the fast shutter across the photo-visual field, which produces the center break in the star streaks, during the satellite phase of a cycle, and in the satellite streaks, during the star phase of a cycle. The time presentation means including the sweep oscilloscope accordingly is photographed on the film strip as at X' as previously described, so that time is shown to one ten-thousandth of a second or within .360 second of arc of the satellite.

In order to maintain this high degree of accuracy, thus to determine the position of a satellite as definitely as possible, power is supplied to the drive motor previously described at a uniform frequency by known types of electronic means (not shown), which constant frequency power supply is also employed to drive the time presentation dials 803, 804, and 805 of FIG. 42, through drive mechanism well known in the art. The time presentation may be compared with the National Standard Time as broadcast by the Bureau of Standards, Washington, D.C., or other accurate time indicating means, so as to correct for any error in the time presentation, thereby rendering the calculations as to the position of the satellite at a given time more accurate.

It will now be recognized that a tracking camera is provided, by virtue of the present invention, which accomplishes the objectives stated at the commencement hereof, among others, with a high degree of accuracy as to fixing in space and time the relative position of a body moving across the photo-visual field at a high rate. While the specific details of the invention have been herein shown and described, changes and alterations may be resorted to without departing from the spirit thereof, and, while the invention has been described in relation to a satellite tracking camera, it will be readily apparent to those skilled in the art that various features and combinations of features are applicable to other astronomical uses and otherwise. Accordingly, the scope of the invention is to be limited only by the appended claims.

What is claimed is:

1. Mechanism for tracking an object across a visual field, comprising: a fixed base support; a body having an optical system; means supporting said body on said base support for angular tracking movement in a selected plane; means for driving said body angularly; and means for effecting opposite oscillation of said body in said plane during said tracking movement.

2. Mechanism for tracking an object across a visual field, comprising: a body having an optical system; means supporting said body for angular tracking movement; means for driving said body angularly; and means connecting said driving means to said body for effecting variable oscillation of said body during said tracking movement.

3. Mechanism for tracking an object across a visual field, comprising: a body having an optical system; means supporting said body for angular tracking movement; means for driving said body angularly including a variable speed transmission; and means connecting said driving means to said body for effecting oscillation of said body during said tracking movement.

4. A tracking camera comprising: a camera body; means supporting said body for movements in a sweep across a photovisual field; means for driving said camera body through said sweep; and means connecting said driving means to said camera body for effecting intermittent nodding of said camera body in a direction opposite to said sweep at a variable rate of speed.

5. A tracking camera comprising: a camera body; means supporting said body for movements in a sweep across a photovisual field; variable speed means for driving said camera body through said sweep; and means for effecting alternate nodding of said camera body in the direction of and in a direction opposite to said sweep at a variable rate of speed.

6. A tracking camera comprising: a camera body; means supporting said body for movements in a sweep across a photovisual field; variable speed means for driving said camera body through said sweep at a selected rate of speed; and means for effecting alternate nodding of said camera body in the direction of and in a direction opposite to said sweep at the same rate of speed.

7. A tracking camera comprising: a camera body; means supporting said body for movements in a sweep across a photovisual field; variable means for driving said camera body through said sweep at a selected rate of speed; and means connecting said driving means to said camera body for effecting intermittent nodding of said camera body in a direction opposite to said sweep at a variable rate of speed.

8. A tracking camera comprising: a camera body; means supporting said body for movements in a sweep across a photovisual field; means for driving said camera body through said sweep; and means for effecting alternate nodding of said camera body in the direction of and in a direction opposite to said sweep.

9. A tracking camera as defined in claim 8, wherein the means for effecting alternate nodding of said camera body comprises means interconnecting said camera body and said means for driving said camera body through said sweep.

10. A tracking camera as defined in claim 8, wherein the means for effecting alternate nodding of said camera body comprises means interconnecting said camera body and said means for driving said camera body through said sweep, said interconnecting means including a plurality of links and means for varying the angular relationship of said links.

11. A tracking camera as defined in claim 8, wherein the means for effecting alternate nodding of said camera body comprises variable-length link means interconnecting said camera body and said means for driving said camera body through said sweep, and means for alternately lengthening and shortening said link means.

12. A tracking camera as defined in claim 8, wherein the means for effecting alternate nodding of said camera body comprises means for effecting nodding movement at a uniform rate in opposite directions.

13. A tracking camera as defined in claim 8, wherein the means for driving said camera body effects movement of said camera body at a uniform rate, and said means for effecting alternate nodding of said body comprises means for effecting nodding movement at a uniform rate in opposite directions.

14. A tracking camera as defined in claim 8, wherein the means for effecting nodding of said camera body comprises a plurality of links pivotally connected one with another and interconnecting said camera body and said means for driving said camera body, and means for varying the angular relationship of said links.

15. A tracking camera as defined in claim 8, wherein the means for effecting nodding of said camera body comprises a plurality of links pivotally connected one with another and interconnecting said camera body and said means for driving said camera body, and means for varying the angular relationship of said links to adjust the amplitude of the nodding motion of said camera body.

16. A tracking camera as defined in claim 8, wherein the means for effecting nodding of said camera body comprises a plurality of links pivotally connected one with another and interconnecting said camera body and said means for driving said camera body, and means for varying the angular relationship of said links to adjust the amplitude of the nodding motion of said camera body, said last mentioned means comprising a member pivotally connected to said body and one of said links, and manually operable means for effecting adjustment of said latter member and said link relative to the camera body.

17. A tracking camera as defined in claim 8, wherein the means for effecting nodding of said camera body comprises a plurality of links pivotally connected one with another and interconnecting said camera body and said means for driving said camera body, and means for varying the angular relationship of said links during said sweep, including a connecting member pivotally connected to certain of said links and movable relative to the pivotal connections of said links one with another, and means for effecting movement of said connecting member.

18. Apparatus of the class described, comprising: a camera; means supporting said camera for movements in a sweep across a photovisual field; means for driving said camera through said sweep; means for effecting intermittent nodding of said camera in a direction opposite to said sweep; means for transporting film through said camera; shutter mechanism in said camera; and means for operating said shutter mechanism to expose said film in timed relation to said nodding motion.

19. Apparatus as defined in claim 18, wherein the means for effecting nodding of said camera includes a source of power, and said shutter mechanism operating means including means driven by said source of power.

20. Apparatus as defined in claim 18, wherein the means for effecting nodding of said camera includes a change-speed transmission, and means for driving said shutter mechanism operating means by said transmission at a rate governed by said transmission.

21. Apparatus as defined in claim 18, wherein said shutter mechanism includes gross shutter means for exposing said film, and chopper means for intermittently interrupting exposure of the film.

22. Apparatus as defined in claim 18, wherein said shutter mechanism includes compound shutter means for exposing said film and intermittently interrupting exposure of the film.

23. Tracking apparatus of the class described, comprising: a camera; means supporting said camera for movements in a sweep across a photovisual field; means for driving said camera through said sweep; means for effecting intermittent nodding of said camera in a direction opposite to said sweep; means for transporting a film strip in said camera; shutter means for exposing said film strip; film feed means for operating said film transporting means in timed relation to said nodding of the camera; and means for operating said shutter means to expose said film strip during said nodding motion.

24. Tracking apparatus of the class described, comprising: a camera; means supporting said camera for movements in a sweep across a photovisual field; means for driving said camera through said sweep; means for effecting alternate nodding of said camera in the direction of said sweep and in a direction opposite to said sweep; means for transporting a film strip in said camera; shutter means for exposing said film strip during nodding of said body in both directions aforesaid; and means for operating said film transporting means in timed relation to said nodding of said camera.

25. Apparatus of the class described, comprising: a camera; means supporting said camera for movements in a sweep across a photovisual field; means for driving said camera through said sweep; means for effecting intermittent nodding of said camera in a direction opposite to said sweep; shutter mechanism in said camera; means for transporting a film strip through said shutter mechanism; and means for operating said film transporting means in timed relation to said nodding motion.

26. Apparatus as defined in claim 25, wherein said film transporting means comprises a film feed roll and a feed take-up roll, and said operating means includes means for operating said feed and take-up rolls in unison.

27. Apparatus as defined in claim 25, wherein said camera includes an arcuate back-up member engageable by said film strip within said shutter mechanism, and said operating means includes means for tensioning said film strip into conformity with said back-up member.

28. Apparatus as defined in claim 25, wherein said film transport means includes a film feed roll and a film take-up roll, and said operating means includes means driven by said means for effecting nodding of the camera for operating said film feed and take-up rolls.

29. Apparatus as defined in claim 25, wherein said operating means includes means for varying the rate of advance of said film strip.

30. Apparatus as defined in claim 25, wherein said film transport means includes a roll engageable with said film strip and a rotary shaft for said roll, and said operating means includes means for effecting intermittent rotation of said shaft including a reciprocable rack and means for effecting reciprocation of said rack.

31. Apparatus as defined in claim 25, wherein said film transport means includes a roll engageable with said film strip, a shaft connected to said roll, and a gear on said shaft, and said operating means includes a rack engageable with said gear, means normally maintaining said rack disengaged from said gear, and means for shifting said rack into engagement with said gear.

32. Apparatus as defined in claim 25, wherein said film transport means includes a roll engageable with said film strip, a shaft connected to said roll, and a gear on said shaft, and said operating means includes a rack engageable with said gear, means normally maintaining said rack disengaged from said gear, and means for shifting said rack into engagement with said gear, said rack shifting means including a member connected with said rack and shiftable relative to said gear, and means for intermittently shifting said member to engage said rack with said gear.

33. Apparatus as defined in claim 25, wherein said film transport means includes a roll engageable with said film strip, a shaft connected to said roll, and a gear on said shaft, and said operating means includes a rack engageable with said gear, means normally maintaining said rack disengaged from said gear, and means for shifting said rack into engagement with said gear, said rack shifting means including a member connected with said rack and shiftable relative to said gear, a cam rotatable relative to said member, and means for rotating said cam.

34. Apparatus as defined in claim 25, wherein said film transport means includes a roll engageable with said film strip, a shaft connected to said roll, and a gear on said shaft, and said operating means includes a rack engageable with said gear, means normally maintaining said rack disengaged from said gear, and means for shifting said rack into engagement with said gear, said rack shifting means including a member connected with said rack and shiftable relative to said gear, a cam rotatable relative to said member, and means for rotating said cam, said cam having a plurality of sections and having a different number of lobes on each section, said cam rotating means including a shaft on which said cam is mounted, and means for effecting axial adjustment of said shaft.

35. Apparatus as defined in claim 25, wherein said film transport means includes a film feed roll and a film take-up roll, a film feed shaft and a film take-up shaft on which said rolls are respectively mounted, a gear on each shaft, and said operating means includes a reciprocable member having a film feed rack and a film take-up rack carried thereby, means for reciprocating said member, and means for effecting intermittent engagement of said respective racks with said gears.

36. Apparatus as defined in claim 25, wherein said film transport means includes a film feed roll and a film take-up roll, a film feed shaft and a film take-up shaft on which said rolls are respectively mounted, and a gear on each shaft, and said operating means includes a reciprocable member having a film feed rack and a film take-up rack carried thereby, crank means for reciprocating said member, means for effecting intermittent engagement of said respective racks with said gears, a gear for driving said crank means, and means interconnecting said gear with the means aforesaid for effecting nodding of the camera.

37. Apparatus as defined in claim 25, including means for tensioning the film strip within said shutter mechanism.

38. Apparatus as defined in claim 25, wherein said film feed means includes a film feed roll and a film take-up roll, and said operating means includes means for effecting intermittent rotation of said rolls in the same direction, and means for alternately effecting rotation of one of said rolls in the opposite direction.

39. Mechanism for tracking an object across a visual field, comprising: a body having an optical system; means supporting said body for angular tracking movement; and means for driving said body angularly, said driving means including a shiftable drive member, motion transmitting means connecting said drive member to said body, and variable transmission means for shifting said member, said transmission means including an infinitely variable speed mechanism and selective change-speed gear multiplier means interposed between said variable speed mechanism and said motion transmitting means.

40. A tracking camera comprising: a camera body; means supporting said body for angular movement in a sweep across a photovisual field; variable transmission means for driving said camera body through said sweep at a selected rate of speed; a member driven by said transmission means; and motion transmitting means interposed between said driven member and said camera body, said transmission means including variable speed rate selector means for effecting movement of said driven member, and change-speed gear means interposed between said rate selector means and said driven member for selectively multiplying the output of said variable speed rate selector means.

41. A tracking camera as defined in claim 40, wherein said variable speed rate selector means includes a selector dial and means for varying the output of said rate selector means responsive to rotation of said dial, said change-speed gear means including selector means for effecting a change in the drive ratio through said change-speed gear means, and means for indicating the effective selected drive ratio of said change-speed gear means.

42. A tracking camera as defined in claim 40, wherein said motion transmitting means includes means for varying the rate of angular movement of said camera body.

43. A tracking camera as defined in claim 40, including a source of power for said variable transmission means, selector means for effecting variation of the drive ratio from said source of power to said driven member through said transmission means, and means for rendering said source of power inoperative during operation of said selector means.

44. A tracking camera as defined in claim 40, wherein said motion transmitting means includes variable means for varying the rate of angular movement of said camera body, variable operating means for varying said motion transmitting means, selector means for varying said operating means, and means for rendering said operating means inoperative during operation of said selector means.

45. A camera comprising: a camera body; means supporting said body for movements in a sweep across a photovisual field; means for driving said body through said sweep; means for positioning a film strip in said camera; shutter means for exposing said film strip and for intermittently effecting timed breaks in the exposure of said film strip during movement of said camera; time presentation means; means for illuminating said time presentation means concurrently with a break in the exposure of said film; and means for focusing said time presentation means on said film strip, wherein said time presentation means includes an oscilloscope, means for firing a pip on said oscilloscope, and means for simultaneously illuminating said time presentation means and firing said pip.

46. A tracking camera comprising: a camera body; means supporting said camera for tracking movement in a sweep across a photovisual field; means for driving said camera body through said sweep; means for transporting a film strip through said camera; means for effecting intermittent nodding of said camera in a direction opposite to said tracking movement; gross shutter means for exposing said film strip during said nodding movement; chopper means for forming a break in said exposure of the film strip; time presentation means; and means for exposing said time presentation means to said film strip upon the formation of said break in the exposure of said film strip by said chopper means.

47. A tracking camera as defined in claim 46, wherein the means for exposing said time presentation means includes a light source, and means for energizing said light source in timed relation to operation of said chopper means.

48. A tracking camera as defined in claim 46, including common means for operating said gross shutter means and said chopper means, said means for exposing said time presentation means including a light source and means for energizing said light source in timed relation to the means for operating said shutter means.

49. A camera having means for positioning a film, and compound shutter mechanism for exposing said film and intermittently breaking said exposure to provide a reference point, said shutter mechanism including gross shutter means operable when open to expose said film, a chopper for effecting said break in the exposure of said film, and means for operating said shutter means in timed relation, wherein said operating means includes a variable speed transmission having a gross shutter and chopper gear means driven as a unit, and separate means driven individually by said gear means for driving said gross shutter means and said chopper.

50. Compound shutter mechanism of the class described, comprising: a pair of opposed supports; a housing extended between said supports and having an elongated opening; gross shutter means shiftably carried by said supports for movement to positions alternately blocking and opening said housing opening; chopper means shiftably carried by said supports for movement across said housing opening; actuator means for said gross shutter means for intermittently operating the same; and means for actuating said chopper means.

51. Compound shutter mechanism as defined in claim 50, including means for positioning a film strip in said housing comprising a film back-up member extending between said supports.

52. Compound shutter mechanism as defined in claim 50, wherein said actuator means for said gross shutter means includes a shaft extending between said supports, lever means at the opposite ends of said shaft connected to said gross shutter means for operating the same, and means at one end of said shaft for operating said lever means.

53. Compound shutter mechanism as defined in claim 50, wherein said actuator means for said gross shutter means includes a shaft extending between said supports, lever means at the opposite ends of said shaft connected to said gross shutter means for operating the same, and link means at one end of said shaft carried by one of said supports for operating said lever means.

54. Compound shutter mechanism as defined in claim 50, wherein said actuator means for said gross shutter means includes a shaft extending between said supports, lever means at the opposite ends of said shaft connected to said gross shutter means for operating the same, link means carried by one of said supports including a link connected to said lever means at one end of said shaft, an actuator lever connected to said link means and to said one of the supports, and means for operating said actuator lever.

55. Compound shutter mechanism as defined in claim 50, wherein said actuator means for said gross shutter means includes a shaft extending between said supports, lever means at the opposite ends of said shaft connected to said gross shutter means for operating the same, link means carried by one of said supports including a link connected to said lever means at one end of said shaft, an actuator lever connected to said link means and to said one of the supports, an operating shaft having a cam thereon engageable with said actuator lever upon rotation of said operating shaft, and means for rotating said operating shaft.

56. Compound shutter mechanism as defined in claim 50, wherein said gross shutter means includes a pair of arcuate clamshell members, means supporting said clamshell members at opposite ends of the housing and at opposite sides of the housing opening for pivotal movement into and out of engagement with one another to close and open the housing opening respectively, said supporting means including a hollow shaft extending between said supports, and an inner shaft within said hollow shaft projecting from the opposite ends of said hollow shaft, said hollow shaft being rotatably mounted in said supports, and said inner shaft being rotatably supported in said hollow shaft.

57. Compound shutter mechanism as defined in claim 50, wherein said gross shutter means includes a pair of arcuate clamshell members, means supporting said clamshell members at opposite ends of the housing and at opposite sides of the housing opening for pivotal movement into and out of engagement with one another to close and open the housing opening respectively, said supporting means including a hollow shaft extending between said supports, an inner shaft within said hollow shaft projecting from the opposite ends of said hollow shaft, said hollow shaft being rotatably mounted in said supports, and said inner shaft being rotatably supported in said hollow shaft, a pair of levers connected with the opposite ends of said hollow shaft and one of said clamshell members, and a second pair of levers connected with said inner shaft and the other clamshell member, said actuator means including means connected with one of each of said pairs of levers for effecting relative rotation of said hollow shaft and said inner shaft.

58. Compound shutter mechanism as defined in claim 50, wherein said chopper means includes a blade extending longitudinally between said supports, means supporting said blade at its opposite ends on said supports for movement in a circular path concentric to said housing, and means for driving said blade in said circular path.

59. Compound shutter mechanism as defined in claim 50, wherein said chopper means includes a blade extending longitudinally between said supports, a ring connected at one end of said blade and journalled on one of said supports, and said actuator means including means for driving said ring rotatively.

60. Compoud shutter mechanism as defined in claim 50, wherein one of said actuator means includes a hollow shaft, the other of said actuator means including an internal shaft extending through said hollow shaft.

61. Compound shutter mechanism as defined in claim 50, wherein one of said actuator means includes a hollow shaft, the other of said actuator means including an internal shaft extending through said hollow shaft, and power transmission means including a pair of gears operatively connected to said hollow shaft and said internal shaft.

62. Compound shutter mechanism as defined in claim 50, wherein one of said actuator means includes a hollow shaft, the other of said actuator means including an internal shaft extending through said hollow shaft, power transmission means including a pair of gears operatively connected to said hollow shaft and said internal shaft, and means for functionally driving said pair of gears.

63. Compound shutter mechanism as defined in claim 50, wherein said gross shutter means includes a shutter member, said actuator means for the gross shutter means including means supporting said shutter member for pivotal movement into a position closing said housing opening, means for intermittently moving said shutter member including a drive shaft, said chopper means including a member rotatable relative to said housing, and a blade on said member, and said actuating means for said chopper means including a drive shaft concentrically disposed with relation to the first-mentioned drive shaft, and means for rotating said chopper member responsive to rotation of said chopper drive shaft.

64. Compound shutter mechanism as defined in claim 50, wherein said actuator means each include a drive shaft, variable speed power transmission means for operating the respective drive shafts, said transmission means including an output shaft, a gross shutter drive gear and a chopper drive gear rotatable with said output shaft, a power input shaft, and coengaged selective gear means in said transmission means for varying the rate of rotation of said output shaft.

65. A satellite tracking camera comprising: a camera body having means for transporting a film strip therethrough and shutter means for exposing said film strip; means supporting said body for angular movement in a satellite tracking sweep; drive means for effecting such angular movement; drive means for effecting intermittent nodding movement of said camera body in a direction opposite to said tracking movement; means for operating said shutter means during said nodding movement to expose said film strip; and means for operating said film strip transporting means in timed relation to said nodding movement to shift said film strip while said shutter means is closed.

66. A satellite tracking camera as defined in claim 65, wherein said means for effecting nodding movement includes means for moving said camera body at a uniform velocity during at least a portion of said nodding movement, said means for operating said shutter means being operable to open said shutter means during said movement of said camera body at a uniform velocity.

67. A satellite tracking camera as defined in claim 65, wherein said means for effecting nodding movement includes means for moving said camera body at a uniform velocity during at least a portion of said nodding movement, said means for operating said shutter means being operable to open said shutter means during said movement of said camera body at a uniform velocity, and said shutter means including means for interrupting exposure of said film strip during nodding movement of said camera at a uniform velocity.

68. A satellite tracking camera as defined in claim 65, wherein said means for effecting nodding movement includes means for moving said camera body at a uniform velocity during at least a portion of said nodding movement, said means for operating said shutter means being operable to open said shutter means during said movement of said camera body at a uniform velocity, said shutter means including means for interrupting exposure of said film strip during nodding movement of said camera body at a uniform velocity, said camera body including time presentation means and means for exposing said time presentation means to said film strip during said interruption in the exposure of said film strip.

69. A satellite tracking camera as defined in claim 65, wherein said respective drive means each includes variable speed transmission means for effecting tracking movement of said camera body at a selected rate and for effecting nodding movement of said camera body at a selected rate.

70. A satellite tracking camera comprising: a camera body; means supporting said body for angular tracking movements; means for driving said body to effect said angular movements; means for imposing on said tracking movement cyclic nodding movement of the body in the direction of said body during one phase of the nodding motion and in a direction opposite to said body in a second phase of said nodding movement; means for feeding a film strip through said body; first shutter means for exposing said film strip during each phase of said nodding movement; second shutter means for intermittently breaking the exposure of the film strip during each phase of the nodding movement to provide a reference point on the film strip; and means for providing on said film strip an indication of the time of the formation of said reference point.

71. A satellite tracking camera as defined in claim 70, wherein the means for effecting tracking movement of the camera body includes a uniform speed power source and variable speed transmission means, and the means for imposing said nodding movement on said tracking movement includes means for maintaining the net movement of the camera body at a uniform velocity during exposure of said film strip.

72. A satellite tracking camera as defined in claim 70, wherein said means for imposing nodding movement on said tracking movement includes means for adjusting the amplitude of the nodding movement.

73. A satellite tracking camera as defined in claim 70, wherein said film strip feeding means includes means for varying the rate of feed of the film strip per cycle of the nodding movement of said camera body.

74. A satellite tracking camera comprising: a camera body; a supporting base; means mounting said camera body on said base for angular movement of said camera body about a horizontal axis; drive means for driving said camera body in a sweep about said horizontal axis at a uniform satellite tracking angular velocity; means for effecting intermittent nodding of said camera body at timed intervals during said sweep to reduce said angular satellite tracking velocity; a film feed magazine and a film take-up magazine at opposite sides of said camera body; means for feeding a film strip from said film feed magazine to said film take-up magazine; means including a lens and reflector system for focusing an object on said film strip; first shutter means operable in timed relation to said nodding of the camera body for exposing the film strip during angular tracking movement of said camera body and during nodding movement of said camera body; second shutter means for intermittently interrupting exposure of said film strip by said first shutter means; time indicating means; means for illuminating said time indicating means in timed relation to said second shutter means; and lens means for focusing said time indicating means on said film strip upon interruption of exposure of said film strip by said second shutter means.

75. A satellite tracking camera comprising: a camera body; a supporting base; means mounting said camera body on said base for angular movement of said camera body about a horizontal axis; drive means for driving said camera body in a sweep about said horizontal axis at a uniform satellite tracking angular velocity; means for effecting intermittent nodding of said camera body at timed intervals during said sweep to reduce said angular tracking velocity; a film feed magazine and a film take-up magazine at opposite sides of said camera body; means for feeding a film strip from said film feed magazine to said film take-up magazine; means for operating said feeding means in timed relation to said nodding to selectively advance said film strip a selected number of frames; means including a lens and reflector system for focusing a satellite and the star background on said film strip; first shutter means operable in timed relation to said nodding of the camera body for exposing the film strip during angular tracking movement of said camera body and during nodding movement of said camera body; second shutter means for intermittently interrupting exposure of said film strip by said first shutter means; time indicating means; means for illuminating said time indicating means in timed relation to said second shutter means; and means for recording the time of the interruption of the exposure of said film strip.

76. A satellite tracking camera comprising: a camera body; a supporting base; means mounting said camera body on said base for movement of said camera body about a horizontal axis; drive means for driving said camera body in a sweep about said horizontal axis at a selected uniform angular velocity; means for effecting alternate nodding of said camera body at timed intervals during said sweep to alternately increase said angular velocity to a satellite tracking rate and reduce said angular velocity to a lesser rate and provide alternate satellite and star tracking movements; a film feed magazine and a film take-up magazine at opposite sides of said camera body; means for feeding a film strip from said film feed magazine to said film take-up magazine; means including a lens and reflector system for focusing a satellite and star background on said film strip; first shutter means operable in timed relation to said nodding of the camera body for exposing the film strip during each of the aforesaid nodding movements of said camera body; second shutter means intermittently interrupting exposure of said film strip by said first shutter means to provide reference points on the streaks resulting from exposure of said film strip to the star background during said satellite tracking movement and to provide reference points on the streaks resulting from exposure of said film strip to the satellite during said star tracking movement; and means for recording the time of the interruption of the exposure of said film strip as aforesaid.

77. A satellite tracking camera comprising: a camera body; a supporting base; means mounting said camera body on said base for movement of said camera body about a horizontal axis; drive means for driving said camera body in a sweep about said horizontal axis at a selected uniform angular velocity; means for effecting alternate nodding of said camera body at timed intervals during said sweep to alternately increase said angular velocity to a satellite tracking rate and reduce said angular velocity to a lesser rate and provide alternate satellite and star tracking movements; a film feed magazine and a film take-up magazine at opposite sides of said camera body; means for feeding a film strip from said film feed magazine to said film take-up magazine; means including a lens and reflector system for focusing a satellite and star background on said film strip; first shutter means operable in timed relation to said nodding of the camera body for exposing the film strip during each of the aforesaid nodding movements of said camera body; second shutter means intermittently interrupting exposure of said film strip by said first shutter means to provide reference points on the streaks resulting from exposure of said film strip to the star background during said satellite tracking movement and to provide reference points on the streaks resulting from exposure of said film strip to the satellite during said star tracking movement; time indicating means; means for illuminating said time indicating means in timed relation to said second shutter means; and lens means for focusing said time indicating means on said film strip.

References Cited in the file of this patent

UNITED STATES PATENTS

| | | | |
|---|---|---|---|
| 1,129,327 | Bingham | Feb. 23, | 1915 |
| 1,424,208 | Mobley et al. | Aug. 1, | 1922 |
| 1,586,071 | Cooke | May 25, | 1926 |
| 1,597,944 | Wilson | Aug. 31, | 1926 |
| 1,885,631 | Sapier | Nov. 1, | 1932 |
| 1,966,556 | Mayer | July 17, | 1934 |
| 2,002,074 | Basson | May 21, | 1935 |
| 2,047,983 | Richards | July 21, | 1936 |
| 2,111,516 | Roux | Mar. 15, | 1938 |
| 2,141,884 | Sonnefeld | Dec. 27, | 1938 |
| 2,159,574 | Tchortner | May 23, | 1939 |
| 2,240,827 | Bangert et al. | May 6, | 1941 |
| 2,285,534 | Ryan | June 9, | 1942 |
| 2,287,468 | Cisski | June 23, | 1942 |
| 2,357,158 | Zuber | Aug. 29, | 1944 |
| 2,364,429 | Dougherty | Dec. 5, | 1944 |
| 2,420,339 | Rabinow | May 13, | 1947 |
| 2,427,773 | Fort | Sept. 23, | 1947 |
| 2,500,358 | Jedeka | Mar. 14, | 1950 |
| 2,518,347 | Mandel | Aug. 8, | 1950 |
| 2,571,743 | Meyer | Oct. 16, | 1951 |
| 2,593,189 | Rima et al. | Apr. 15, | 1952 |
| 2,653,507 | Riles et al. | Sept. 29, | 1953 |
| 2,687,337 | Alford | Aug. 24, | 1954 |
| 2,772,941 | Hulcher | Dec. 4, | 1956 |
| 2,773,732 | Roberts et al. | Dec. 11, | 1956 |
| 2,796,317 | Valenti et al. | June 18, | 1957 |
| 2,815,701 | Mack et al. | Dec. 10, | 1957 |
| 2,855,521 | Blackstone | Oct. 7, | 1958 |
| 2,868,064 | Henkel | Jan. 13, | 1959 |
| 2,899,882 | Wylie et al. | Aug. 18, | 1959 |
| 2,926,561 | Keeble | Mar. 1, | 1960 |
| 2,941,459 | Fairbanks et al. | June 21, | 1960 |
| 2,998,599 | Matson et al. | Aug. 21, | 1961 |

FOREIGN PATENTS 145,859   Great Britain _____ June 30, 1920

OTHER REFERENCES

Aviation Week, vol. 67, pp. 123–7, Oct. 28, 1957.